(12) United States Patent
Eggers et al.

(10) Patent No.: US 12,440,194 B2
(45) Date of Patent: Oct. 14, 2025

(54) MINIMALLY INVASIVE DIAGNOSTIC AND THERAPEUTIC EXCISION OF TISSUE

(71) Applicant: Eggers & Associates, LLC, Dublin, OH (US)

(72) Inventors: Philip E. Eggers, Dublin, OH (US); Andrew Eggers, Ostrander, OH (US)

(73) Assignee: Neocision Medical, LLC, Dublin, OH (US)

( * ) Notice: Subject to any disclaimer, the term of this patent is extended or adjusted under 35 U.S.C. 154(b) by 1127 days.

(21) Appl. No.: 17/375,037

(22) Filed: Jul. 14, 2021

(65) Prior Publication Data
US 2022/0211355 A1 Jul. 7, 2022

Related U.S. Application Data

(63) Continuation-in-part of application No. 15/877,830, filed on Jan. 23, 2018, now Pat. No. 10,165,895.

(51) Int. Cl.
*A61B 10/02* (2006.01)

(52) U.S. Cl.
CPC ............... *A61B 10/0266* (2013.01)

(58) Field of Classification Search
CPC ........ A61B 10/0266; A61B 2010/0208; A61B 18/1482; A61B 2018/1861; A61B 2018/00333; A61B 10/02; A61B 17/32; A61B 18/1487; A61B 2018/00208; A61B 2018/144; A61B 2018/00601; A61B 18/1206; A61B 2218/007; A61B 2018/1213; A61B 2018/00875; A61B 2218/008; A61B 2018/1475; F24H 3/0441; B60H 1/2218; B60H 1/2225; H05B 3/44

USPC ................ 392/360, 478–484; 600/562–572; 606/34–45

See application file for complete search history.

(56) References Cited

U.S. PATENT DOCUMENTS

| | | | | |
|---|---|---|---|---|
| 6,277,083 B1* | 8/2001 | Eggers | ............... | A61B 18/1482 600/564 |
| 6,471,659 B2* | 10/2002 | Eggers | ............... | A61B 18/1482 600/564 |
| 6,740,079 B1* | 5/2004 | Eggers | ............... | A61B 18/1206 606/34 |
| 6,955,653 B2* | 10/2005 | Eggers | ............... | A61B 10/0266 600/564 |
| 7,041,101 B2* | 5/2006 | Eggers | ............... | A61B 18/1482 606/41 |

(Continued)

*Primary Examiner* — Eric S Stapleton
(74) *Attorney, Agent, or Firm* — Emerson, Thompson & Bennett, LLC; Roger D. Emerson; Peter R. Detorre

(57) ABSTRACT

The recovery of an intact volume of tissue proceeds with a delivery cannula distal end positioned in confronting adjacency with the volume of tissue to be recovered. A tissue cutting and capture assembly formed of a plurality of metal leafs is deployed from the distal end of the delivery cannula. The tips of these leafs carry a pursing cable assembly, which is electrically excited to electrosurgically cut around and circumscribe the tissue volume. These pursing cables are tensioned to complete the envelopment of the tissue volumes by drawing the leaf tips together. An essential attribute of the disclosed apparatus is the confinement of the path of electrical conduction of constant current required to achieve tissue cutting to only those portions of the deploying and retracting resistively heated portion of the cutting and pursing cable that are in direct contact with tissue.

14 Claims, 24 Drawing Sheets

(56) References Cited

U.S. PATENT DOCUMENTS

| | | | |
|---|---|---|---|
| 7,569,053 B2* | 8/2009 | Eggers | A61B 18/1402 606/41 |
| 2003/0225401 A1* | 12/2003 | Eggers | A61M 19/00 606/39 |
| 2004/0024396 A1* | 2/2004 | Eggers | A61B 18/1482 606/39 |
| 2004/0030328 A1* | 2/2004 | Eggers | A61B 18/1206 606/49 |
| 2005/0027209 A1* | 2/2005 | Eggers | A61B 10/0266 600/564 |
| 2005/0033286 A1* | 2/2005 | Eggers | A61B 18/148 606/45 |
| 2005/0124915 A1* | 6/2005 | Eggers | A61B 10/0266 606/49 |
| 2007/0208338 A1* | 9/2007 | Eggers | A61B 18/1402 606/45 |
| 2017/0095286 A1* | 4/2017 | Vacha | A61B 18/00 |
| 2022/0211355 A1* | 7/2022 | Eggers | A61B 10/0266 |

* cited by examiner

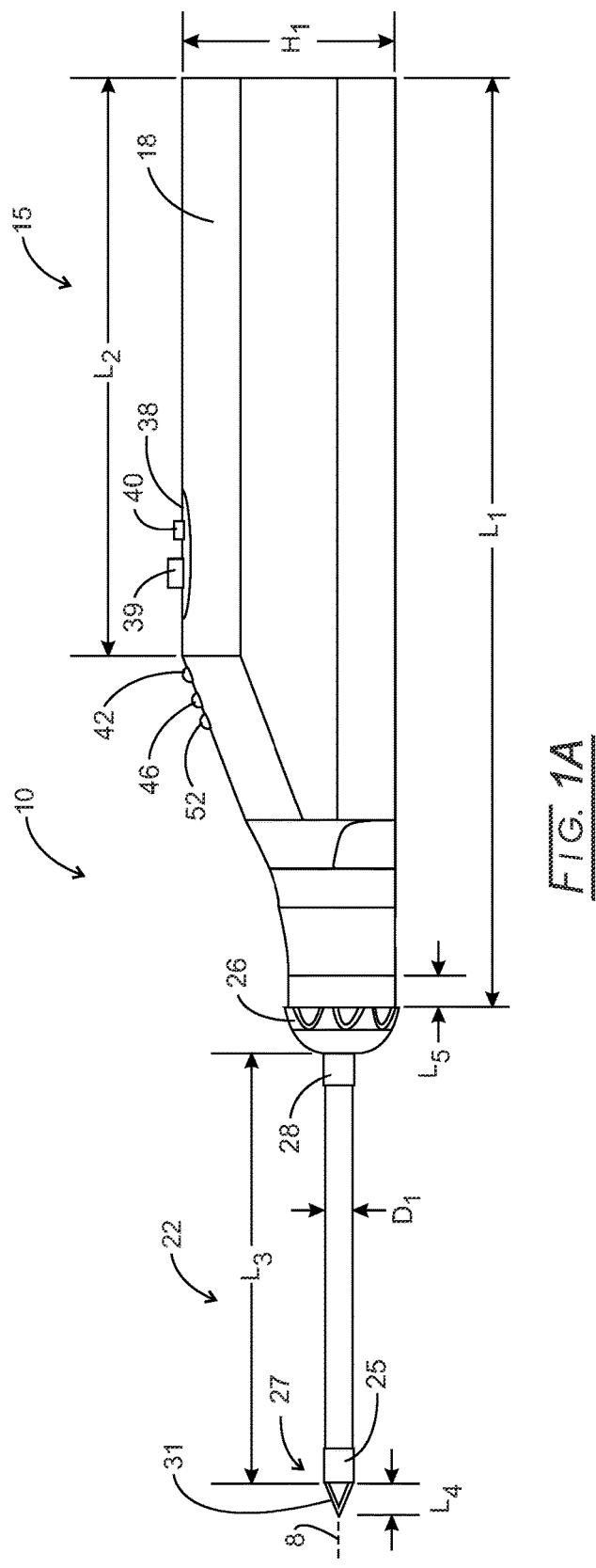
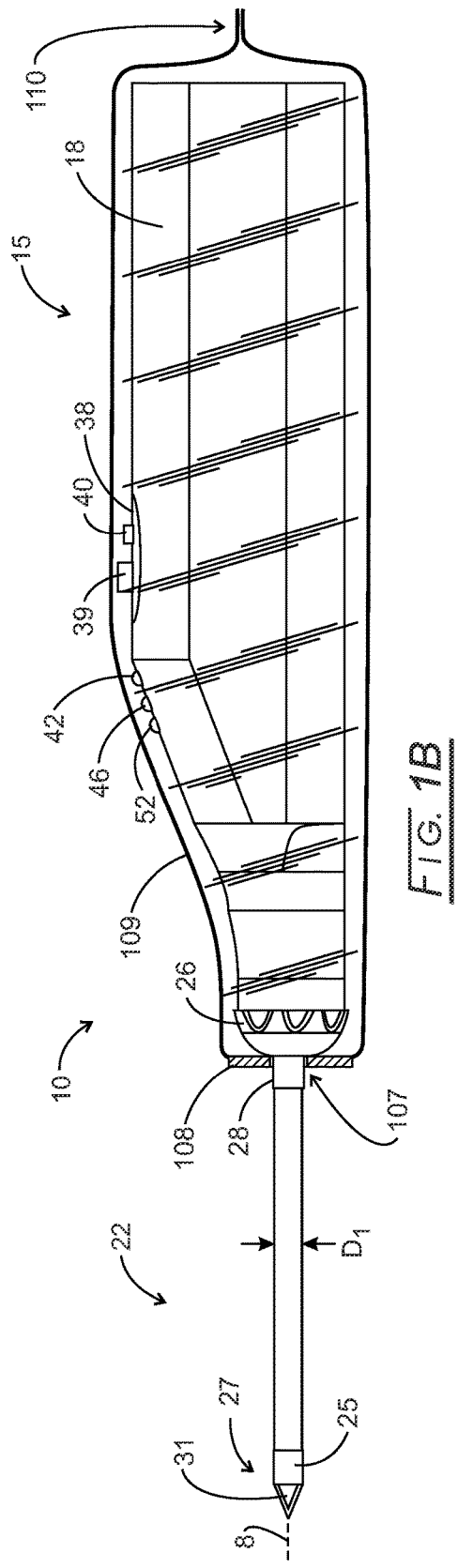

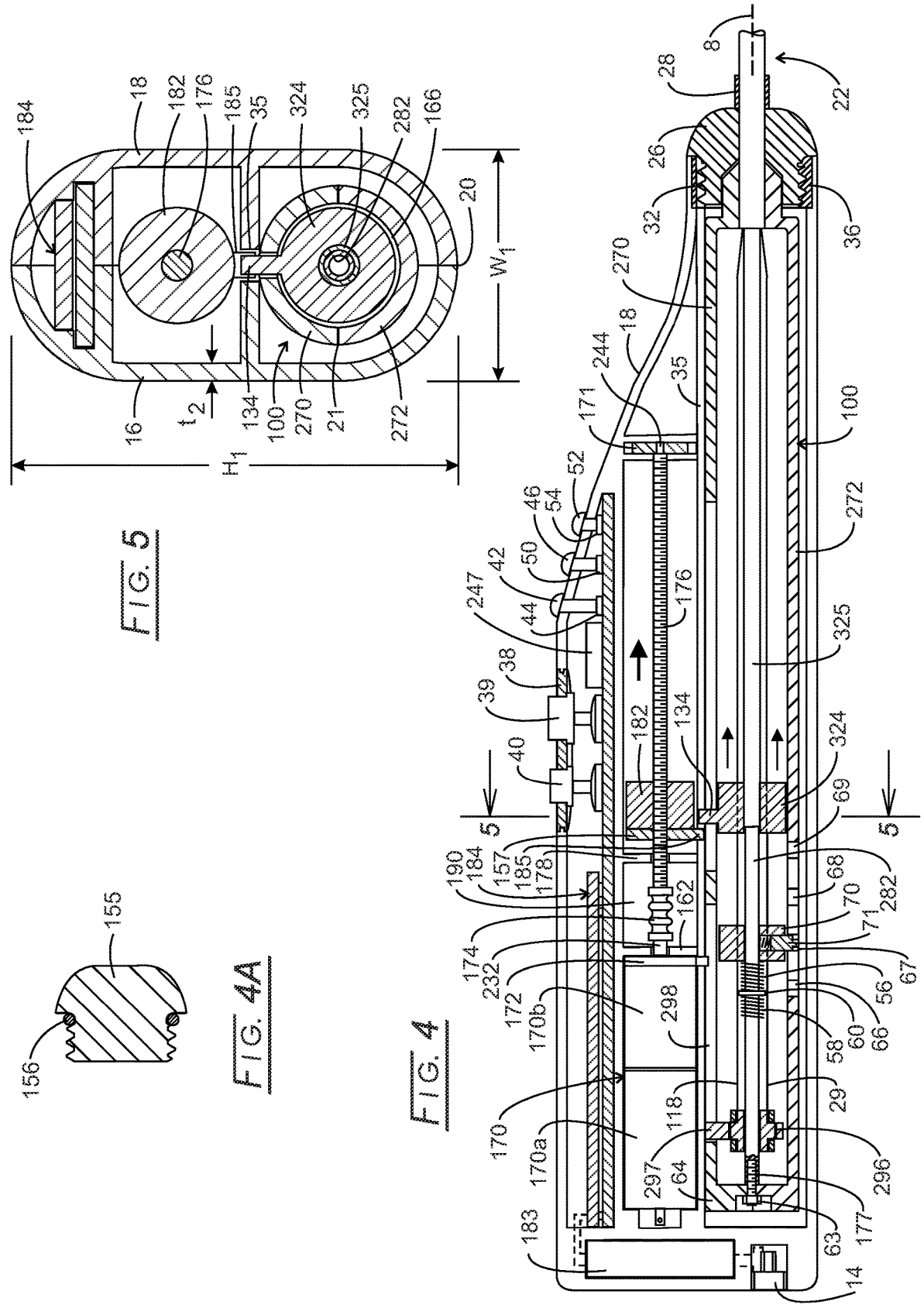

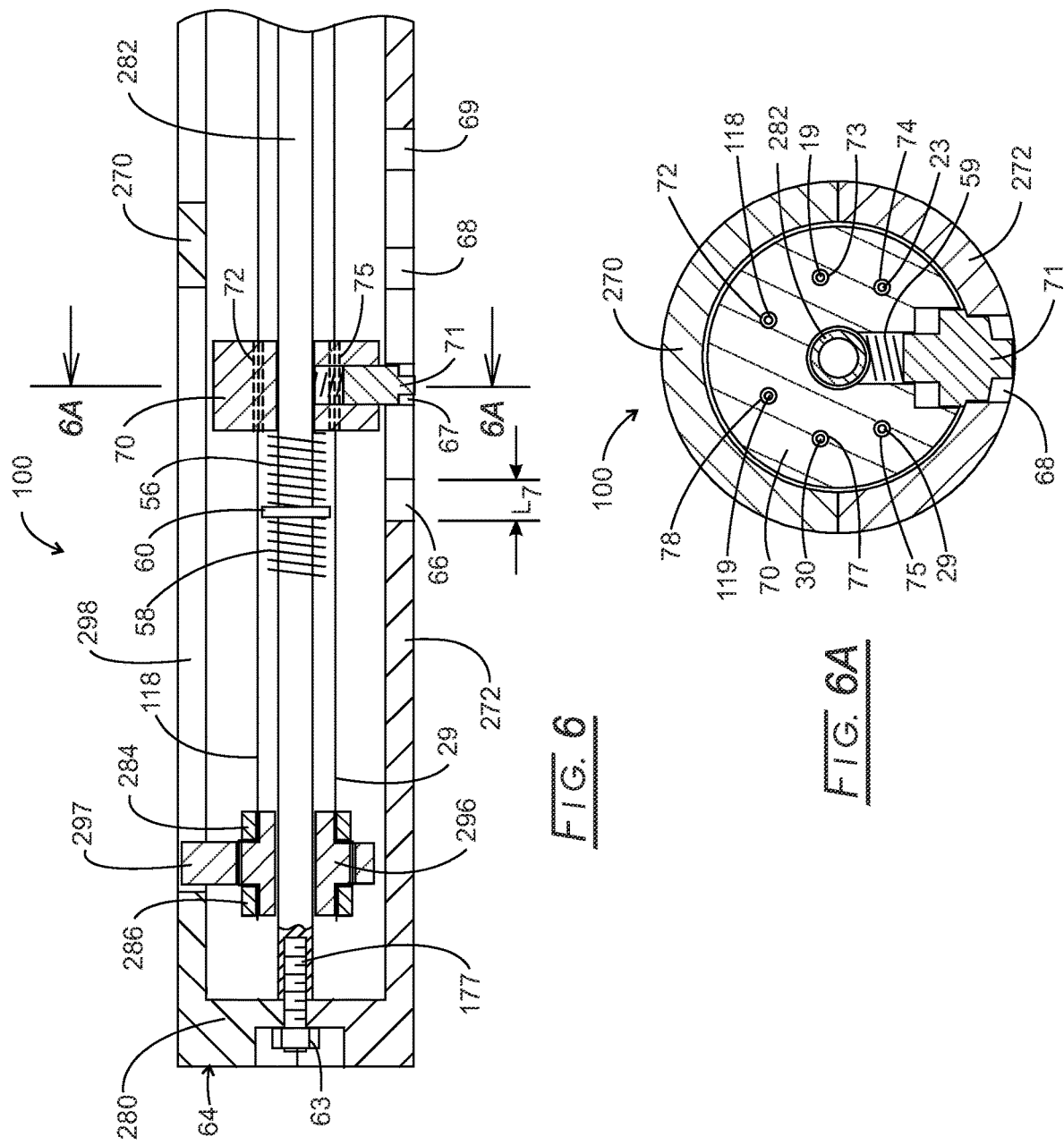

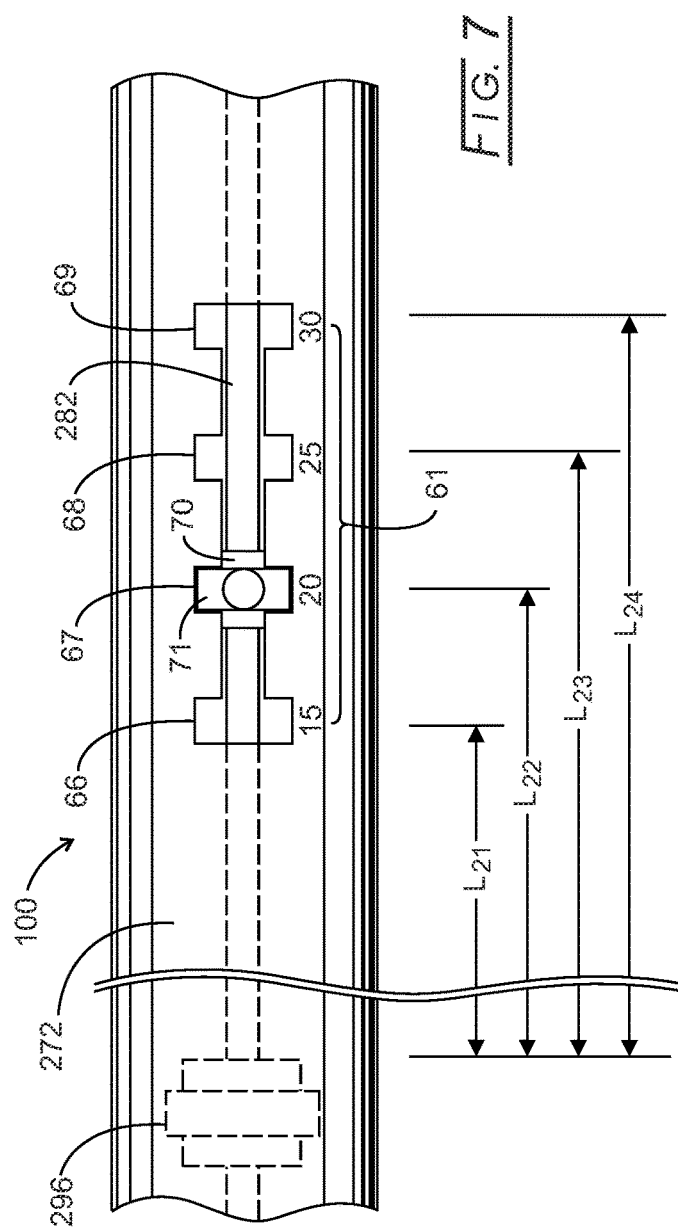
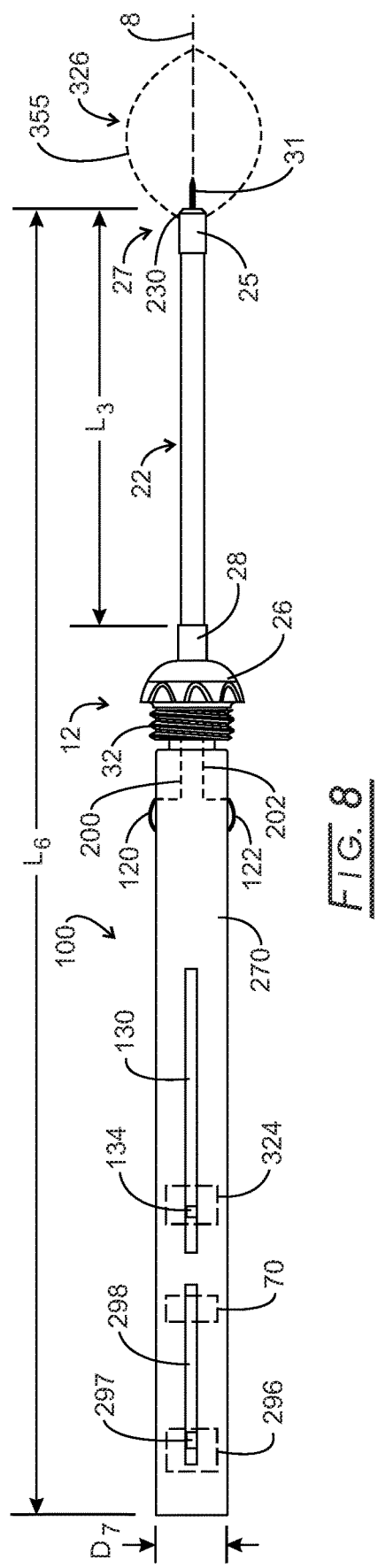
FIG. 7
FIG. 8

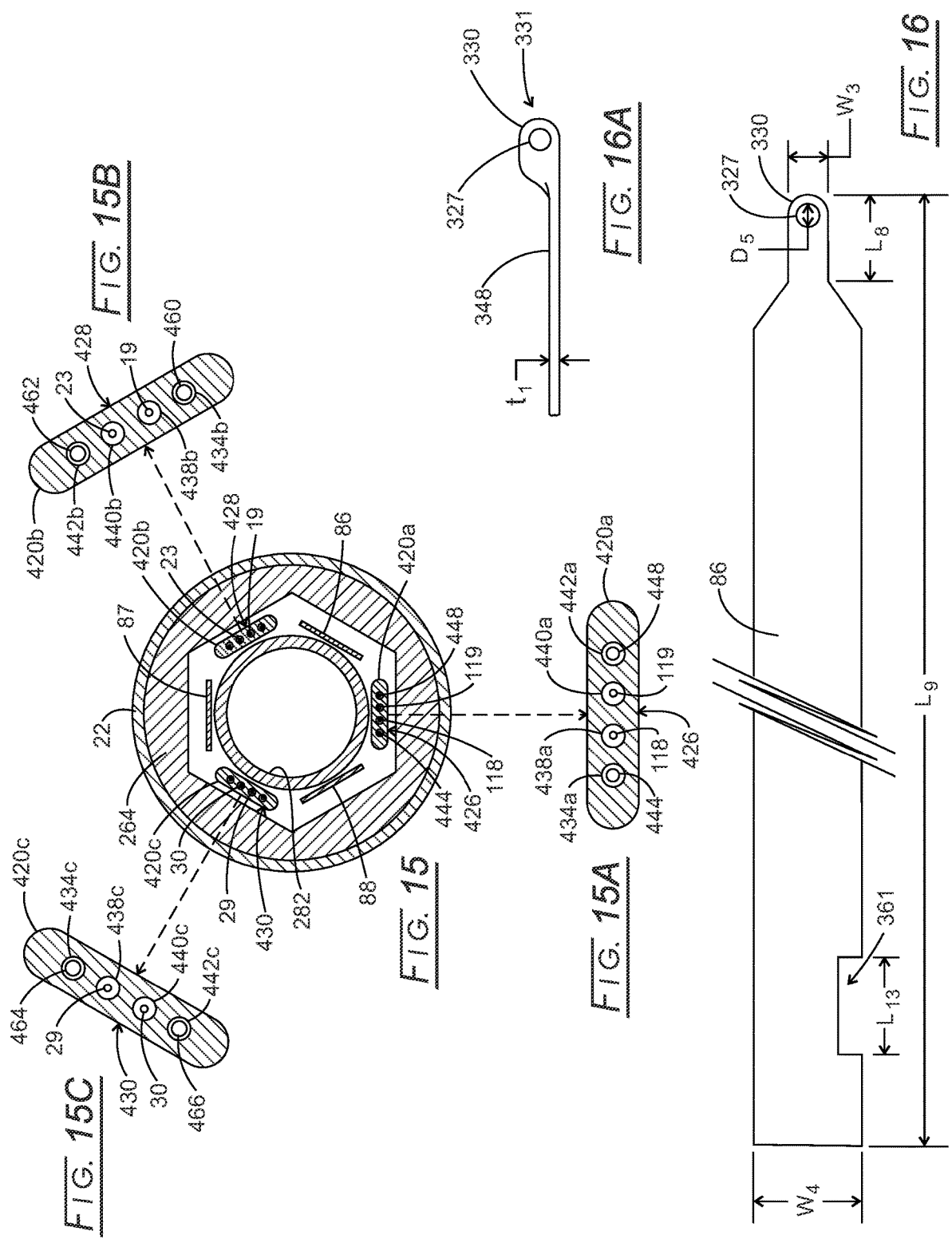

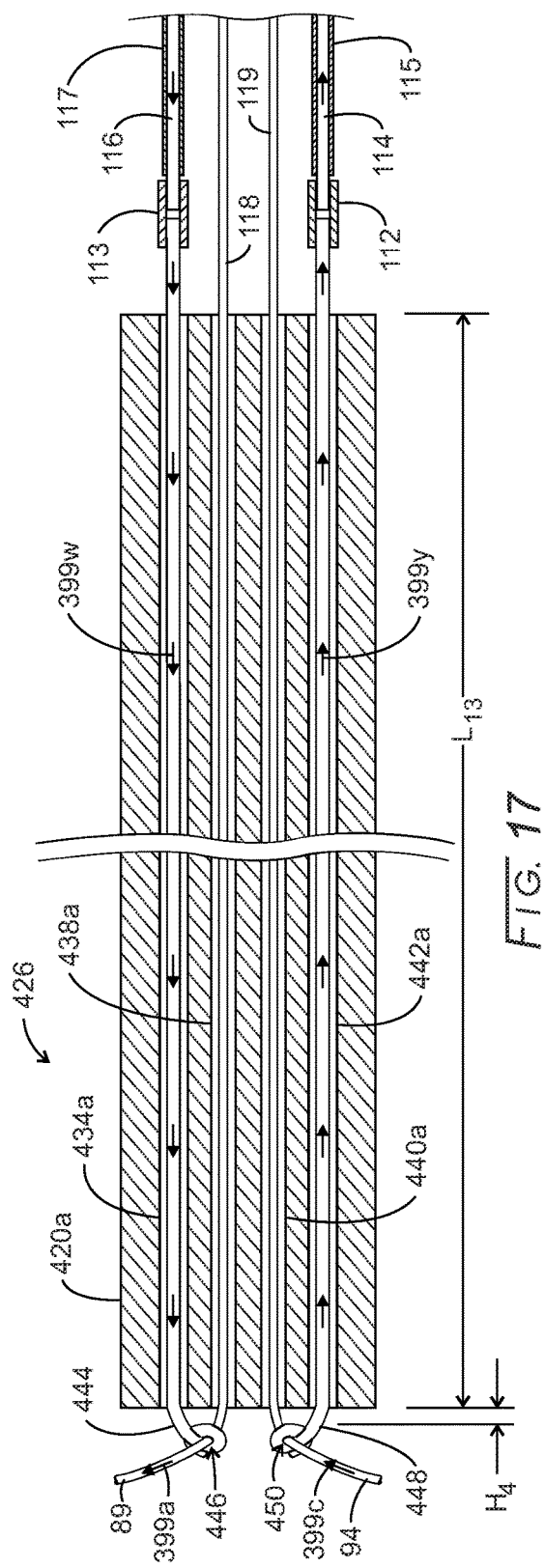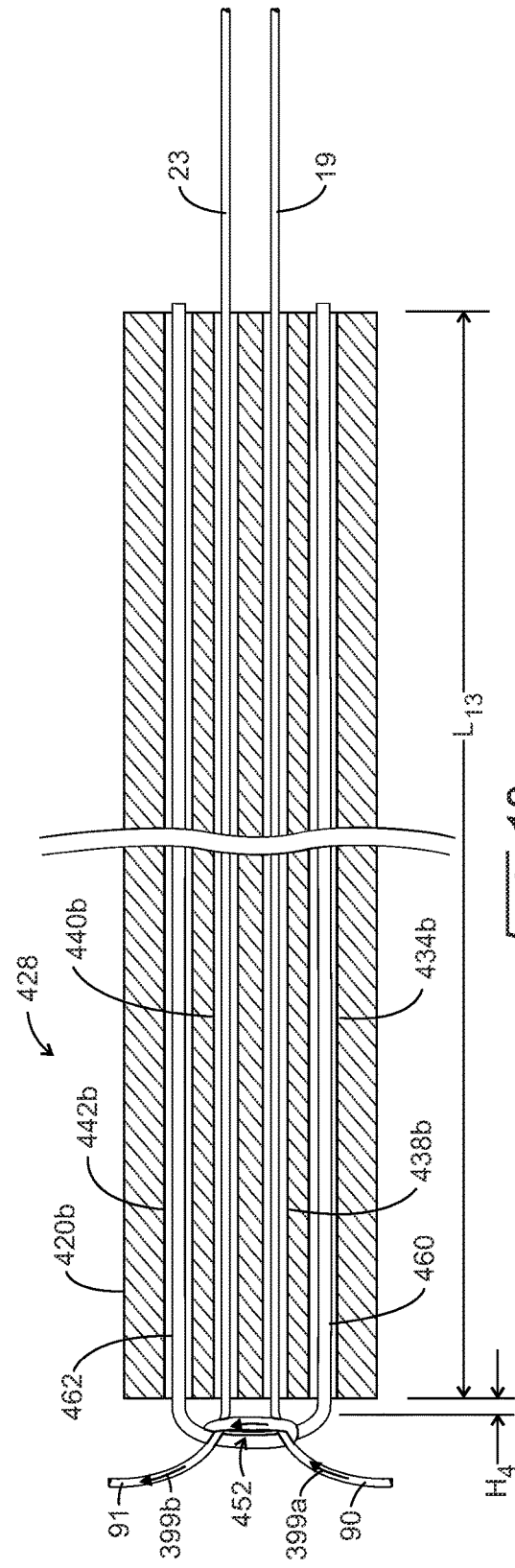

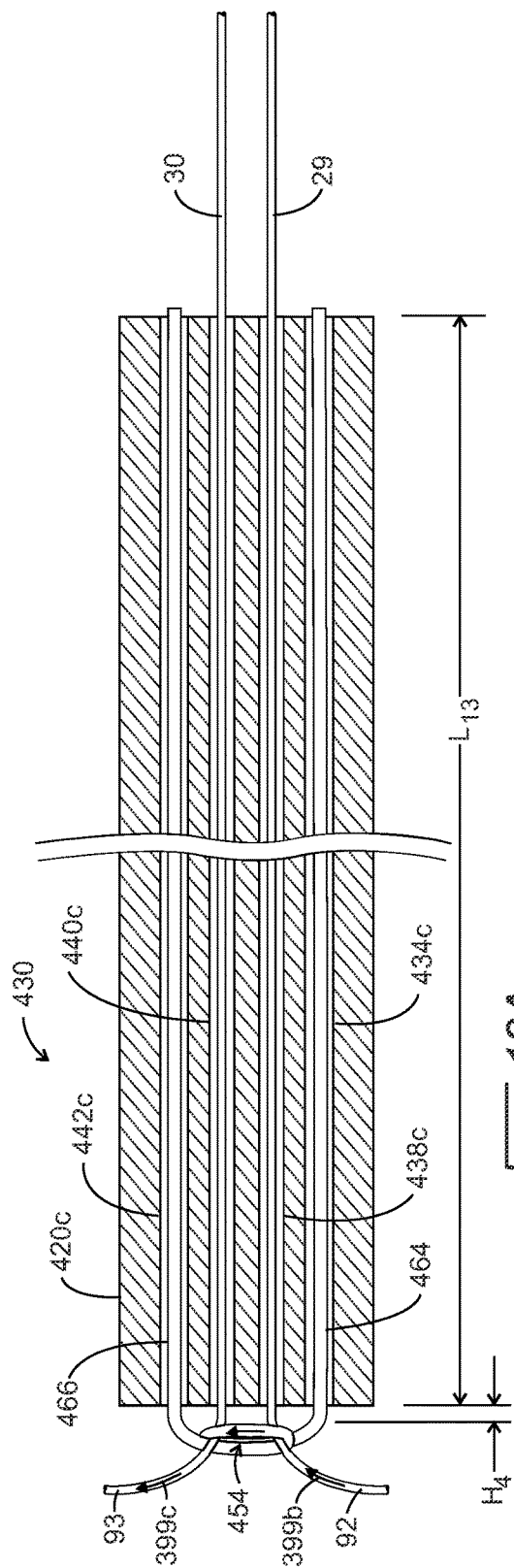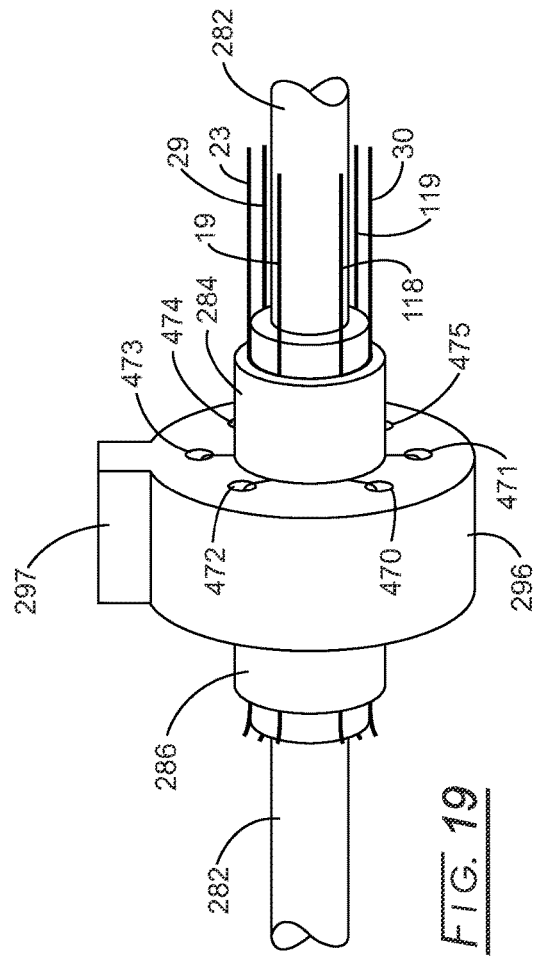

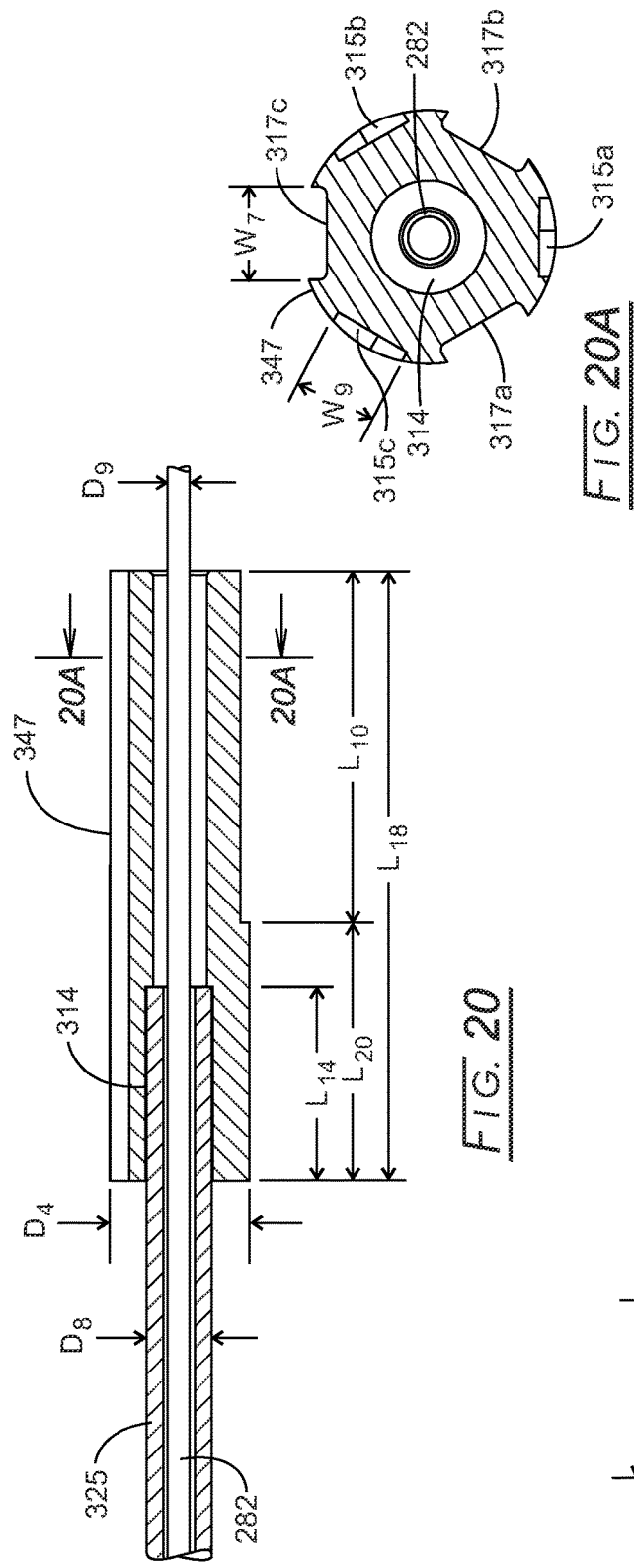
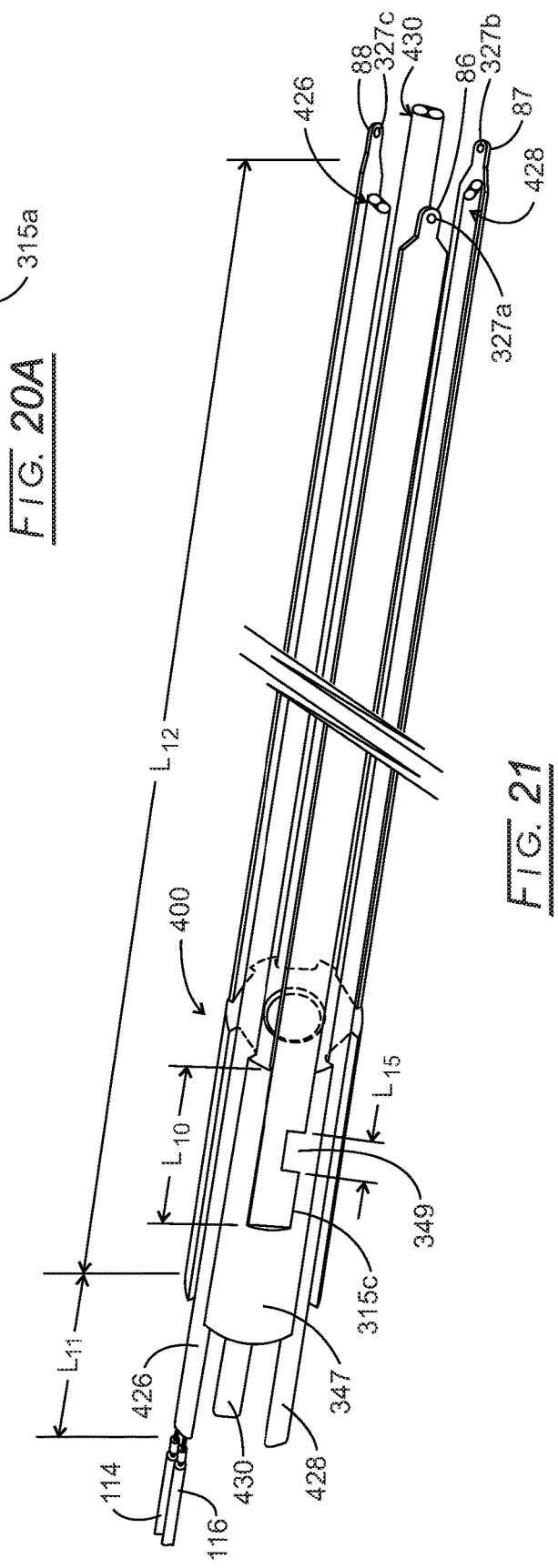

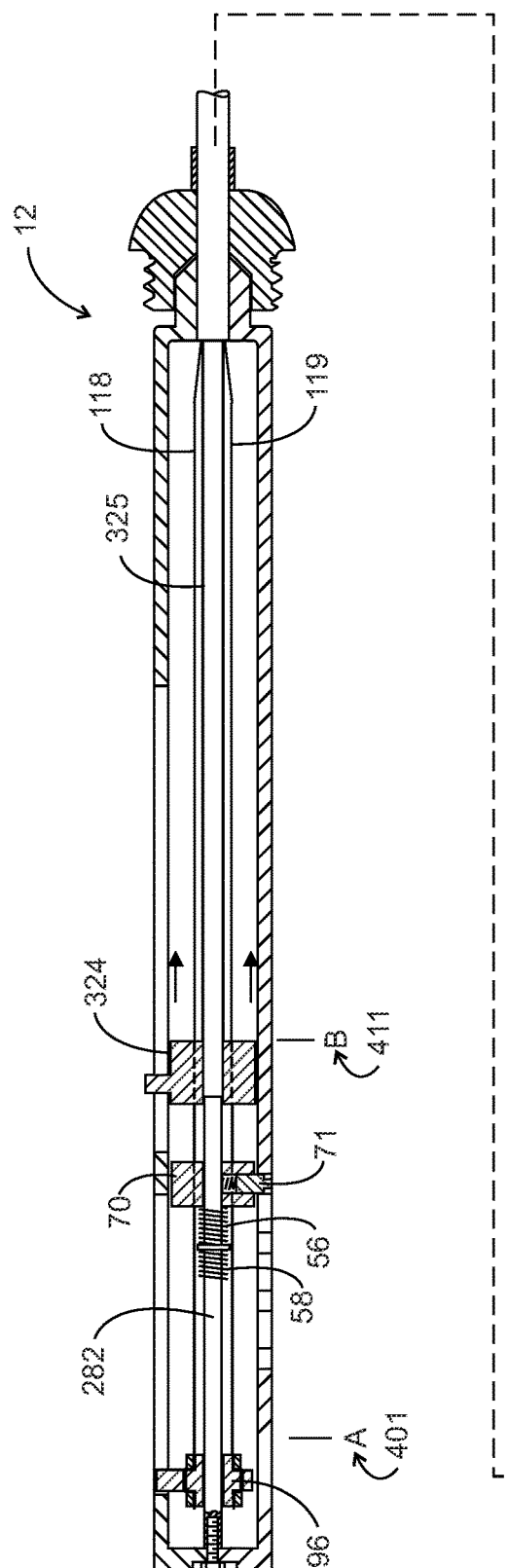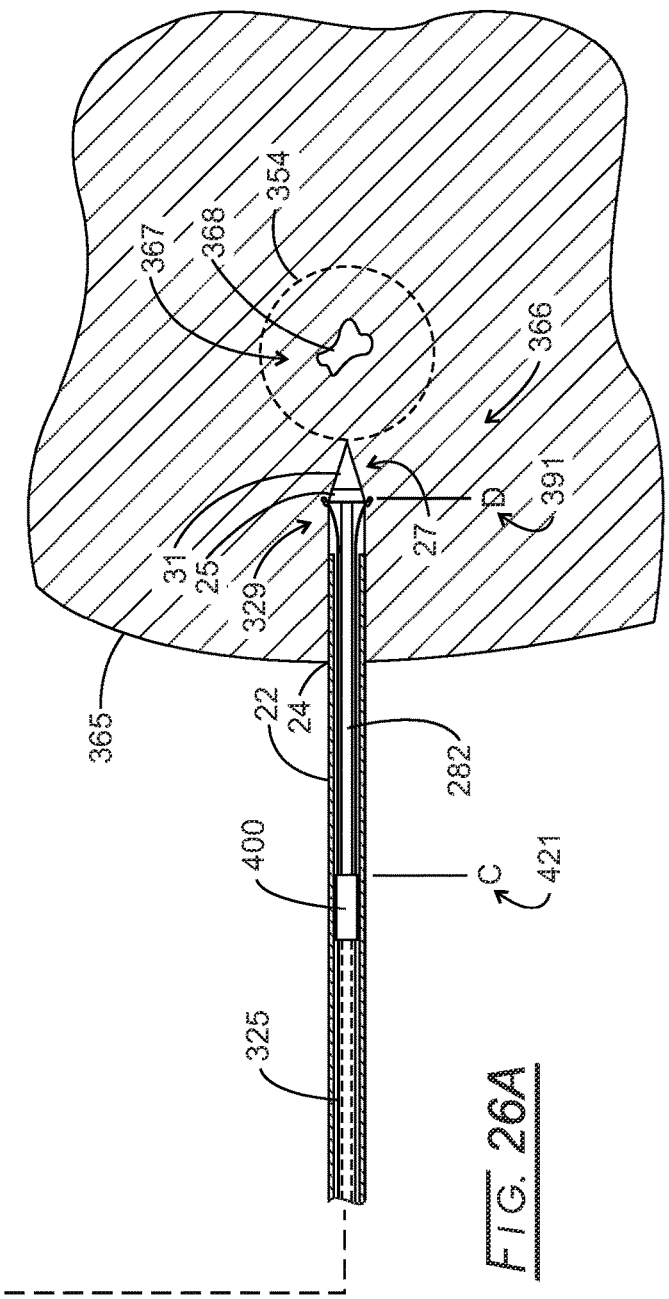
FIG. 26A

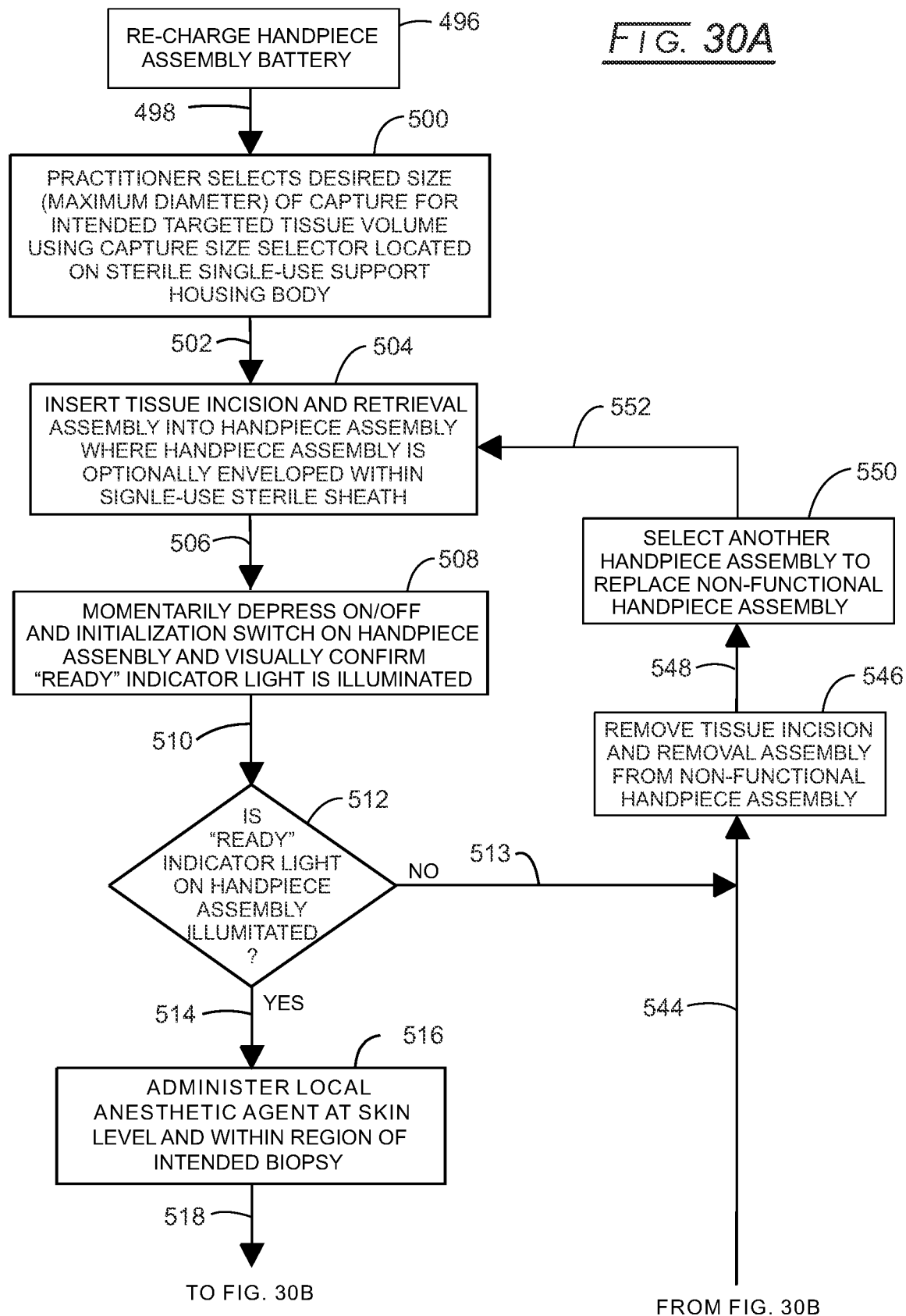

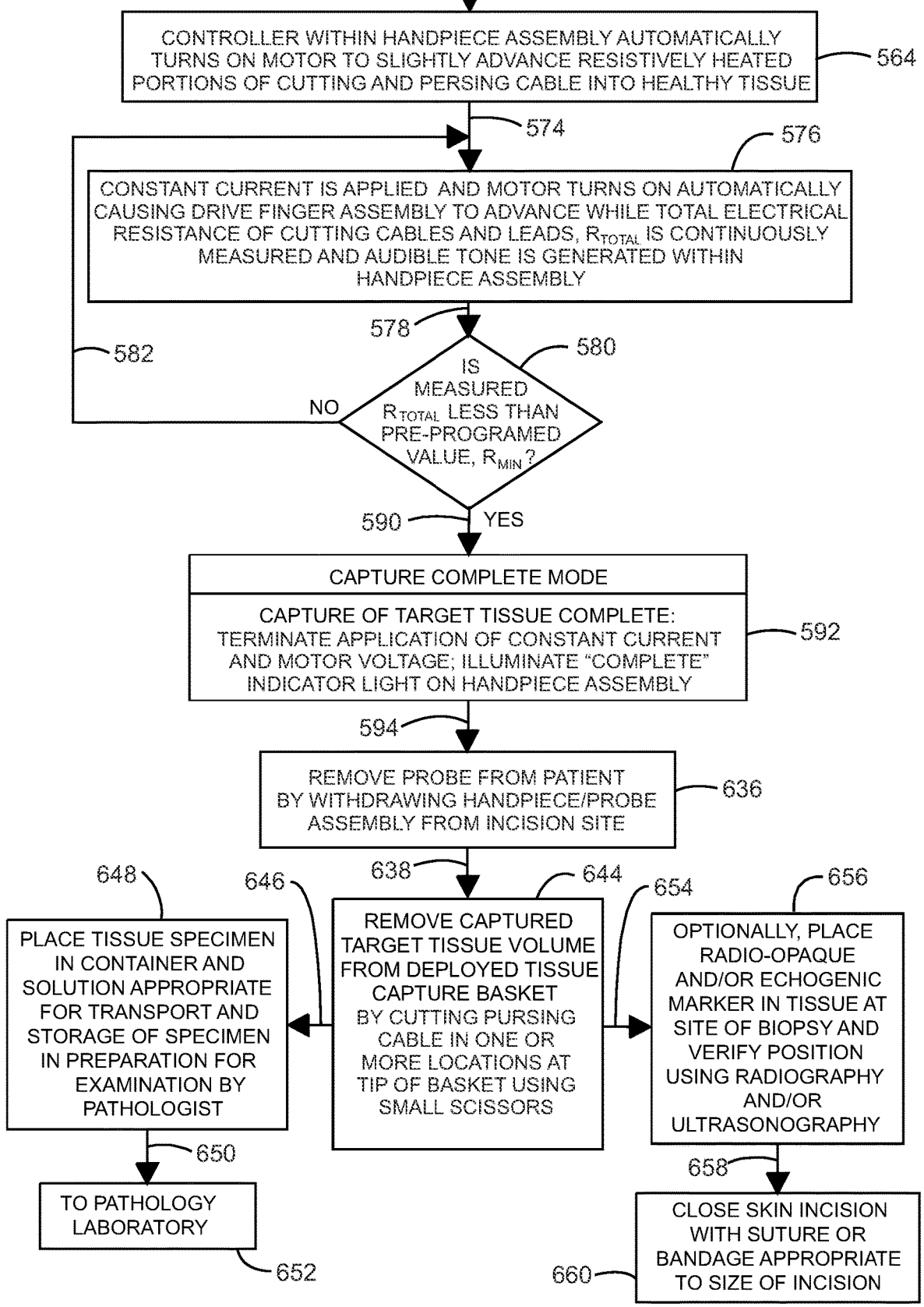

MINIMALLY INVASIVE DIAGNOSTIC AND THERAPEUTIC EXCISION OF TISSUE

CROSS-REFERENCE TO RELATED APPLICATIONS

This application is a continuation-in-part of application Ser. No. 15/877,730, which claimed benefit of provisional application 62/449,161 filed Jan. 23, 2017.

STATEMENT REGARDING FEDERALLY SPONSORED RESEARCH

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

It is estimated that one out of eight women will face breast cancer at some point during their lifetime, and for women age 40-55, breast cancer is the leading cause of death. While methods for detecting and treating breast cancer initially were crude and unsophisticated, advanced instrumentation and procedures now are available which provide more positive outcomes for patients.

In the 1800s the only treatment for breast cancer was removal of the entire breast. Given that the sole method of detection and diagnosis was palpation, treatment was only directed when the breast tumor was well advanced. Modified radical mastectomies are still performed today for patients with invasive cancer, such a procedure involving the removal of the entire breast and some or all of the axillary lymph nodes. Radical or modified radical mastectomies involve serious trauma for the patient during surgery, with the severest cosmetic results after surgery.

Another surgical option upon the discovery of malignant tumor is what is referred to as breast conserving surgery, which also is referred to as lumpectomy, tumorectomy, segmental mastectomy or local excision. Meant to address the cosmetic concerns associated with removal of the breast, only the primary tumor and a margin of surrounding normal breast tissue is removed. Determining the proper amount of tissue to be removed involves balancing the need to take sufficient tissue to prevent recurrence with the desire to take as little tissue as possible to preserve the best cosmetic appearance. A more limited nodal dissection now is performed with the primary purpose being staging rather than therapy. While an improvement over radical mastectomy, breast-conserving surgery still involves the removal of large sections of breast tissue. Risks associated with such surgery include wound infection, seroma formation, mild shoulder dysfunction, loss of sensation in the distribution of the intercostobrachial nerve, and edema of the breast and arm. For more information on invasive tumor therapy, see:

(1) Harris, Jay R., et al. "Cancer of the Breast." *Cancer: Principles and Practices of Oncology, Fourth Edition*. Eds. DeVita, et al. Philadelphia: J.B. Lippincott Co., 1993. 1264-1285.

(2) Jobe, William E. "Historical Perspectives." *Percutaneous Breast Biopsy*. Eds. Parker, et al. New York: Raven Press, 1993. 1-5.

Mastectomies and breast-conserving surgeries generally are procedures utilized for invasive tumors. Advances in tumor detection, however, have radically changed the course of diagnosis and treatment for a tumor. With the advent of imaging devices, such as the mammogram, suspect tumor may be located when it is of relatively small size. Today, tumor detection generally involves both a mammogram and a physical examination, which takes into account a number of risk factors including family history and prior occurrences. Technical improvements in mammogram imaging include better visualization of the breast parenchyma with less exposure to radiation, improvements in film quality and processing, improved techniques for imaging, better guidelines for the diagnosis of cancer and greater availability of well-trained mammographers. With these advances in imaging technology, a suspect tumor may be detected which is 5 mm or smaller. More recently substantial progress has been witnessed in the technical disciplines of magnetic resonance imaging (MRI) and ultrasound imagining. With these advances, the location of a lesion is observable as diagnostic or therapeutic procedures are carried out.

In the past, because a tumor normally was not discovered until it had reached an advanced stage, the issue of whether a tumor was malignant or benign did not need to be addressed. With the ability to locate smaller areas of suspect tumor, this issue becomes of critical importance, particularly in light of the fact that only 20% of small, non-invasive tumors are malignant. Tumors identified as being benign may be left in situ with no excision required, whereas action must be taken to excise suspect tissue confirmed to be malignant. In view of the value of classifying a tumor as malignant or benign, breast biopsy has become a much-utilized technique with over 1 million biopsies being performed annually in the United States. A biopsy procedure involves the two-step process of first locating the tumor then removing part or all of the suspect tissue for examination to establish precise diagnosis.

Improvements in the detection of suspicious lesions in the breast are described in U.S. Patent Publication No. US 2006/0036173 published Feb. 16, 2006. In this patent application ultrasonic scanning and diagnostics for cellular tissue are disclosed. An ultrasonic tissue incision and retrieval assembly is moved across cellular tissue at a rate that is synchronized with the image capture rate of the ultrasonic scanner, to achieve a contiguous and complete set of scan images of the tissue. The tissue incision and retrieval assembly can be held in a single position as it is moved across the tissue, or it can be dynamically adjusted during the scan to provide optimal contact with the scanned tissue. The image data are captured and converted to a format that is easily stored and compatible with a viewer. The viewer allows playback of the scanned images in a manner that is optimized for screening for cancers and other anomalies. A location function allows the user to select a point of interest on an individual scan image, and choose another known reference point, and the function calculates and provides the distance from the reference point to the point of interest in three dimensions. The system can be used for virtually any tissue, but can also be optimized for breast cancer screening. Clinical studies using the method and apparatus described in this patent application have revealed that suspicious and potentially malignant lesions in the human breast can be detected having maximum dimensional extents as small as 2 to 3 mm. This non-invasive diagnostic imaging capability would enable the complete excision of such small lesions surrounded by healthy margins of tissue in volumes as small as 15 to 20 mm using minimally invasive excisional methods.

One biopsy option available upon detection of a suspected tumor is an open surgical biopsy or excisional biopsy. Prior to surgery, a radiologist, using mammography, inserts a wire into the breast to locate the suspected tumor site. Later during surgery, the surgeon makes an incision in the breast and removes a large section of breast tissue, including the suspect tissue and a margin of healthy tissue surrounding the tumor. As with other similar procedures, such as those described above, open surgery may result in high levels of blood loss, scarring at the location of the incision and permanent disfigurement, due to the removal of relatively large amounts of tissue. Because of the critical prognostic significance of tumor size, the greatest advantage of the excisional biopsy is that the entire area of the suspect tumor is removed. After being removed and measured, the specimen is typically transected by a pathologist in a plane that should bisect a suspected tumor and then the margin between tumor and healthy tissue is examined. Microscopic location of carcinoma near the margin provides information for future prognosis. Thus, the pathology laboratory is oriented to the morphological aspect of analysis, i.e. the forms and structures of involved tissue. For information on pathology of breast biopsy tissue, see:

(3) Rosen, Paul Peter. Rosen's Breast Pathology. Philadelphia: Lippincott-Raven Publishers, 1997. 837-858.

Other less invasive options are available which avoid the disadvantages associated with open surgery. One such non-invasive option is that of needle biopsy, which may be either fine needle aspiration or large core. Fine needle aspiration (FNA) is an office procedure in which a fine needle, for example of 21 to 23 gauge, having one of a number of tip configurations, such as the Chiba, Franzeen or Turner, is inserted into the breast and guided to the tumor site by mammography or stereotactic imaging. A vacuum is created and the needle moved up and down along the tumor to assure that it collects targeted cellular material. Generally, three or more passes will be made to assure the collection of a sufficient sample. The needle and the tissue sample are then withdrawn from the breast.

The resulting specimen is subject to a cytological assay, as opposed to the above-noted morphological approach. In this regard, cell structure and related aspects are studied. The resultant analysis has been used to improve or customize the selection of chemotherapeutic agents with respect to a particular patient. While a fine needle aspiration biopsy has the advantages of being a relatively simple and inexpensive office procedure, there are some drawbacks associated with its use. With fine needle aspiration, there is a risk of false-negative results, which most often occurs in cases involving extremely fibrotic tumor. In addition, after the procedure has been performed there may be insufficient specimen material for diagnosis. Finally, with fine needle aspiration alone the entire area of suspect tissue is not removed. Rather, fragmented portions of tissue are withdrawn which do not allow for the same type of pathological investigation as the tissue removed during an open surgery biopsy.

This last limitation also is observed with respect to large core needle biopsies. For a large core needle biopsy, a 14 to 18-gauge needle is inserted in the breast having an inner trocar with a sample notch at the distal end and an outer cutting cannula. Similar to a fine needle aspiration, tissue is drawn through the needle by vacuum suction. These needles have been combined with biopsy guns to provide automated insertion that makes the procedure shorter and partially eliminates location mistakes caused by human error. Once inserted, multiple contiguous tissue samples may be taken.

Samples taken during large core needle biopsies may be anywhere from friable and fragmented to large pieces 20 to 30 mm long. These samples may provide some histological data, unlike fine needle aspiration samples; however, they still do not provide the pathological information available with an open surgical biopsy specimen. Further, as with any mechanical cutting device, excessive bleeding may result during and following the procedure. Needle biopsy procedures are discussed in:

(4) Parker, Steve H. "Needle Selection" and "Stereotactic Large-Core Breast Biopsy." *Percutaneous Breast Biopsy*. Eds. Parker, et al. New York: Raven Press, 1993. 7-14 and 61-79.

A device which is somewhere between a needle biopsy and open surgery is referred to as the Advanced Breast Biopsy Instrumentation (ABBI). With the ABBI procedure, the practitioner, guided by stereotactic imaging, removes a core tissue sample of 5 mm to 20 mm in diameter. While the ABBI has the advantage of providing a large tissue sample, similar to that obtained from an open surgical biopsy, the cylindrical tissue sample is taken from the subcutaneous tissue to an area beyond the suspect tumor. For tumors embedded more deeply within the breast, the amount of tissue removed is considerable. In addition, while less expensive than open surgical biopsy, the ABBI has proven expensive compared to other biopsy techniques, and it has been noted that the patient selection for the ABBI is limited by the size and location of the tumor, as well as by the presence of very dense parenchyma around the tumor. For discussion on the ABBI, see:

(5) Parker, Steve H. "The Advanced Breast Biopsy Instrumentation: Another Trojan Horse?" Am. J. Radiology 1998; 171: 51-53.

(6) D'Angelo, Philip C., et al. "Stereotactic Excisional Breast Biopsies Utilizing the Advanced Breast Biopsy Instrumentation System." Am J Surg. 1997; 174: 297-302.

(7) Ferzli, George S., et al. "Advanced Breast Biopsy Instrumentation: A Critique." J Am Coll Surg 1997; 185: 145-151.

Other biopsy devices have been referred to as the Mammotome and the Minimally Invasive Breast Biopsy (MIBB). These devices carry out a vacuum-assisted core biopsy wherein fragments of suspect tissue are removed with an 11 to 14-gauge needle. While being less invasive, the Mammotome and MIBB yields only a fragmentary specimen for pathological study. These devices therefore are consistent with other breast biopsy devices in that the degree of invasiveness of the procedure necessarily is counterbalanced against the need for obtaining a tissue sample whose size and margins are commensurate with pathology requirements for diagnosis and treatment.

Another excisional biopsy device is described in U.S. Pat. No. 6,022,362, and includes a tubular member having a window near a distal tip thereof; a cutting tool, a distal end of the cutting tool being attached near the distal tip of the tubular member, at least a distal portion of the cutting tool being configured to selectively bow out of the window and to retract within the window; and a tissue collection device externally attached at least to the tubular member, the tissue collection device collecting tissue excised by the cutting tool as the biopsy device is rotated and the cutting tool is bowed. An excisional biopsy method for soft tissue includes the steps of inserting a generally tubular member into the tissue, the tubular member including a cutting tool adapted to selectively bow away from the tubular member and an external tissue collection device near a distal tip of the tubular member; rotating the tubular member; selectively varying a degree of bowing of the cutting tool; collecting tissue severed by the cutting tool in the tissue collection device; and retracting the tubular member from the soft tissue. The tubular member may include an imaging transducer and the method may include the step of displaying information received from the transducer on a display device and the step of varying the degree of bowing of the cutting tool based upon the displayed information from the imaging transducer. Alternatively, the imaging transducer may be disposed within a removable transducer core adapted to fit within the tubular member.

Yet another minimally invasive approach to accessing breast lesions wherein the lesion is partially removed or removed in its entirety for diagnostic as well as therapeutic purposes has been described in U.S. Pat. No. 6,277,083 by Eggers, et al., entitled "Minimally Invasive Intact Recovery of Tissue", issued Aug. 21, 2001. The instrument described includes a tubular delivery cannula of minimum outer diameter, the tip of which is positioned in confronting adjacency with a tissue volume to be removed. Following such positioning, the electrosurgically excited leading edge of an electrically conducting cable supported at the distal ends of leaf members is extended forwardly from the instrument tip to enlarge while the electrosurgically cutting and surrounding or encapsulating a tissue volume, severing it from adjacent tissue. Following such electrosurgical cutting, the instrument and the captured tissue volume are removed through an incision of somewhat limited extent. The electrosurgical cutting requires current flow from the cable to and through the surrounding tissue to maintain an electrical arc between the cables that is achieved by maintaining the cable at an elevated peak-to-peak voltage of at least 1000 volts relative to tissue. In order to enable current flow through the tissue, the elevated voltage must be applied at an alternative current frequency of at least 300 kHz in order to enable current flow from the cable through the surrounding tissue to a return electrode usually attached to the skin surface of the patient in the form of a pad having a surface area of at least 20 square inches. In this prior art, the voltage is maintained at a predetermined constant level (e.g., 1000 volts peak-to-peak), which the current flow from the cable and into the surrounding tissue is variable depending on the electrical resistivity of the surrounding tissue. The current flow from the cable into the surrounding tissue is higher for the case of denser, more fibrous tissue while the current flow from the cable into the surrounding tissue is lower for the case of fatty tissue. Maintaining an adequate current flow into the surrounding tissue to sustain an arc and associated cutting effect requires a sufficiently high voltage to overcome the electrical impedance of adjacent tissue having a very high fat content (e.g., fatty breast tissue).

An improved design for the instrument described in U.S. Pat. No. 6,277,083 is described in U.S. Pat. No. 6,471,659 by Eggers, et al., entitled "Minimally Invasive Intact Recovery of Tissue", issued Oct. 29, 2002. This instrumentation includes a tubular delivery cannula of minimum outer diameter, the tip of which is positioned in confronting adjacency with the target tissue volume to be removed. Such positioning is facilitated through the utilization of a forwardly disposed precursor electrosurgical electrode assembly. Located within the interior channel of this delivery cannula are five relatively elongate thin leaf members mutually interconnected at their base to define a pentagonal cross-sectional configuration. Each of the five leaf members terminates forwardly at a tip with a transversely bent eyelet structure. Slideably extending through each eyelet is a separate electrically conductive electrosurgical cutting and pursing cable, which extends to an attachment with the next adjacent leaf tip. The five separate cables extend rearwardly through five small guide tubes attached to each of the five separate leafs for connection with the slideable cable terminator component of a drive assembly. The drive assembly is driven forwardly by an electric motor through a translation assembly. By adjusting the location of a stop component, which engages the cable terminator component, the size of a captured specimen may be varied. For example, the device can be configured to recover tissue specimens of 10 mm, 15 mm, 20 mm or 25 mm effective maximum diametric extent. As the cable terminator component is pulled by the cable assembly into abutting engagement with the stop component, the cables are tensioned to draw the leaf eyelet structures together in a pursing action.

Cabling involved with the instrument specified in U.S. Pat. No. 6,471,659 must be quite diminutive in size while retaining adequate tensile strength in the temperature environment of an electrosurgical cutting arc. The electrosurgical arc temperature has been reported to be at least 1000 C. Heretofore, cable having a nominal diameter of 0.006 inch has been employed. While this electrosurgical cutting arc is present, the cables further must sustain not only stresses associated with the forward movement of the leafs but also those loads imposed by the pursing activity during which the eyelets are drawn together to complete encapsulation of the tissue sample. For discussion of temperatures associated with electrosurgical arcs, see:

(8) Brown, B. H., et. al., "Medical Physics and Biomedical Engineering". Taylor & Francis Group, New York 1999: 238-239
(9) Woloszko, J., et. al., "Coblation in Otolaryngology". Proceedings of the SPIE 2003; 4949:341-352

The prior art methods other than excision using surgically sharp cutting blades (e.g., open surgery excision for biopsy or lumpectomy, ABBI method) utilize a cutting method known as electrosurgical tissue cutting (or often incorrectly referred to as "electrocautery" tissue cutting). For discussion of tissue cutting with electrosurgical arcs, see:

(10) Pearce, J. A., "Electrosurgery". John Wiley & Sons, New York 1986 (ISBN 0-471-85435-2); 67

In this modality of tissue cutting, a large electrical potential difference is imposed between the cutting member or active electrode (e.g., a flexible wire or multi-wire cable) and a passive or return electrode placed on the surface of the patient's body, typically a voltage difference in the range from 500 to 2000 volts peak-to-peak at a frequency ranging from 250 kHz to 5 MHz. This large potential difference allows the formation of electrical arcs between the cutting member and the adjacent tissue. At the point of impingement of the cutting arcs with the surrounding tissue, highly concentrated Joulean heating within the electrically conductive tissue occurs due to the very high current flux in the tissue at the point of impingement of the arcs with the tissue. This highly localized heating at the point of arc impingement causes the cellular fluid within the tissue cells to vaporize thereby fracturing the cellular walls and effecting the separation of the tissue along the advancing pathway of the electrosurgically induced electrical arcs.

In addition to the very high temperatures associated with the formation of electrical arcs during the process of electrosurgical cutting, which can lead to the failure of thin cutting wire or cable members, methods and apparatus which utilize electrosurgical cutting can also result in aberrant current flow in the tissue beyond the point of impingement by the arcs. As a consequence, electrical currents flowing from the active electrode (e.g., the flexible cutting wire or cable) to the passive electrode (e.g., the return electrode) placed on the surface of the patient's skin can induce unintended thermal damage to both the surrounding, un-excised tissue as well as the circumscribed tissue being excised for the purpose of diagnostic pathological evaluation. Furthermore, the electrical currents flowing from the active electrode (e.g., the flexible cutting wire or cable) to the passive electrode (e.g., the return electrode) placed on the surface of the patient's skin can cause unintended stimulation of nerve tissue beyond the zone of the applied localized anesthesia (e.g., by interstitial injection of agents such as Lidocaine) resulting in significant discomfort to the patient during the electrosurgical cutting procedure. For discussion of the potential for iatrogenic injury to the patient and damage to excised pathology specimens associated with the use with electrosurgery, see:
(11) Miller E., et. al., "Scalpel versus Electrocautery in Modified Radical Mastectomy". American Journal of Surgery 1988; 54:284-286 Mandrekas A. D., et. al., "Fat Necrosis Following Breast Reduction" Br. J. Plastic Surgery 1994; 47:560-562
(12) Rosen, P. P., "Breast Biopsy and Electrocautery" (Letter to the Editor) Annals of Surgery 1986; 204(5):612-613

Also, in addition to the disadvantages described above related to the use of electrosurgery for the cutting and excision of breast tissue as described in U.S. Pat. Nos. 6,277,083 and 6,471,659, another limitation is related to the significant difference in the electrical resistivity of the tissue being cut. As described above, the process of electrosurgical cutting requires the flow of electrical current from the point of impingement of the electrosurgical arc to the return electrode placed on the surface of the patient's skin. However, for the case of excision of breast tissue as described in U.S. Pat. Nos. 6,277,083 and 6,471,659, the electrical resistance of the breast tissue can differ by a factor of almost ten-fold as a result of the electrical properties inherent in regions of highly adipose breast tissue in contrast to very dense breast tissue. As a consequence, electrosurgical cutting may be inadequate in some patients with highly adipose breast tissue. For a discussion of the electrical resistivity or related properties of human tissue, see:
(14) Faes, T. J., et. al., "The Electrical Resistivity of Human Tissues (100 Hz-10 MHz): A Meta-Analysis of Review Studies" Physiological Measurements 1999; 20(4):R1-R10
(15) Geddes, L. A., et. al., "The Specific Resistance of Biological Matter—A Compendium of Data for the Biomedical Engineer and Physiologist" Medical & Biological Engineering 1967; 5:271-293

An objective of the present disclosure is to enable minimally invasive excision of a defined volume of tissue while overcoming or greatly limiting the disadvantageous effects described above which are associated with electrosurgical tissue cutting and excision.

BRIEF SUMMARY OF THE INVENTION

The present disclosure is addressed to apparatus, system and method for retrieving a tissue volume having an intact form utilizing minimally invasive surgical instrumentation. This instrumentation includes a tubular delivery cannula of minimum outer diameter, the tip or distal end of which is positioned in confronting adjacency with the target tumor or tissue volume to be removed. The tubular delivery cannula is disposed at the distal end of a single-use support housing that is inserted into the receiving cavity of a reusable housing or handpiece. Such positioning of the delivery cannula is facilitated through the utilization of a forwardly disposed cutting blade assembly supporting a surgically sharp blade. By way of example and without limitation, located within the interior channel of this delivery cannula are two or more flexible leaf members and two or more polymeric multi-lumen extrusion members. Each leaf member is preferably formed by photochemically etching a thin metallic sheet using a known biocompatible metal having a high modulus of elasticity and yield strength such as full-hard austenitic stainless steel. Each multi-lumen polymeric extrusion members is formed using an electrically insulative, biocompatible extrudable polymer (e.g., nylon or polytetrafluoroethylene).

Each multi-lumen polymeric extrusion member incorporates a multiplicity of conduits, preferably four conduits. The leaf members and multi-lumen polymeric extrusion members are mutually supported at their proximal ends on the perimeter surface of a leaf and multi-lumen polymeric extrusion support member to define a polygonal cross-sectional configuration. By way of example, each of the two or more leaf members terminate forwardly with an eyelet-containing tip. In addition, each leaf member is covered by a thin, electrically insulative coating (e.g., Parylene HT) capable of withstanding temperatures of up to at least 300 C in order to prevent unwanted electrical current flow between the leaf members and also to prevent unwanted electrical current flow between individual leaf members and the surrounding tissue during the conduction of electrical current through the cutting and pursing cable segments that extend between the alternating leaf members and the multi-lumen polymeric extrusion members. Since each multi-lumen polymeric extrusion member is formed using an electrically insulative polymer (e.g., nylon or polytetrafluoroethylene), no electrically insulative coating is required for the exterior of the multi-lumen polymeric extrusion members.

The apparatus for retrieving a tissue volume of given peripheral extent comprises at least three cutting and pursing cables that are electrically conductive and are of fixed length, the length of each cutting and pursing cables having two functional regions. A first functional region is the tensionable portion of the cutting and pursing cable and is that portion of the cutting and pursing cable in which no electrical current is conducted and that is proximal to each electrically and thermally conductive eyelet located at the distal end of a multi-lumen polymeric extrusion assembly. A second functional region is the resistively heated portion of the cutting and pursing cable and is that portion of the cutting and pursing cable in which electrical current is conducted and that is distal to each electrically and thermally conductive eyelet located at the distal end of a multi-lumen polymeric extrusion assembly. The functional transition between the tensionable portion of cutting and pursing cable and the resistively heated portion of cutting and pursing cable is the location of sliding contact between the cutting and pursing cable and the electrically and thermally conductive eyelet. The component lengths of first and second functional regions change as the tissue capture basket increases to a maximum peripheral extent of tissue capture assembly and decreases at completion of pursing down of tissue capture assembly.

Extending between each multi-lumen polymeric extrusion member and each adjacent leaf member is a small-diameter, resistively heated portion of a cutting and pursing cable comprising multiple wires (e.g., 7 to 19 wires) or formed from a single wire of a small-diameter wire. Hereinafter, the term "cutting and pursing cable" will commonly be used but does not exclude the possibility of the alternative use of an electrically conductive single-wire.

By way of example, a first multi-lumen polymeric extrusion assembly comprises a first electrically and thermally conductive lead wire (e.g., high purity silver wire) that extends from a current source through a first lumen and a second electrically and thermally conductive lead wire (e.g., high purity silver wire) that extends from a current source through a fourth lumen, a first tensionable portion of cutting and pursing cable (e.g., a cable comprising seven wires of a cobalt/chrome/tungsten/nickel alloy such as L605) that extends through a second lumen and a second tensionable portion of a cutting and pursing cable (e.g., a cable comprising seven wires of a cobalt/chrome/tungsten/nickel alloy such as L605) that extends through a third lumen. That portion of the distal end of the first electrically and thermally conductive lead wire that extends beyond the distal end of the first multi-lumen polymeric extrusion member forms a first electrically and thermally conductive eyelet through which a first tensionable portion of cutting and pursing cable extends, the first tensionable portion of cutting and pursing cable making sliding electrical contact with first electrically and thermally conductive eyelet located at the distal end of the first electrically and thermally conductive lead wire. Likewise, that portion of the distal end of the second electrically and thermally conductive lead wire that extends beyond the distal end of the first multi-lumen polymeric extrusion member forms a second electrically and thermally conductive eyelet through which a second tensionable portion of cutting and pursing cable extends, the second tensionable portion of cutting and pursing cable making sliding electrical contact with second electrically and thermally conductive eyelet located at the distal end of the second electrically and thermally conductive lead wire. The first and second electrically and thermally conductive lead wires extend rearwardly through first and fourth lumens, respectively, beyond the proximal end of the first multi-lumen polymeric extrusion member. Those portions of the first and second electrically and thermally conductive lead wires that extend beyond the proximal end of the first multi-lumen polymeric extrusion member are connected to first and second single-use housing lead wires, respectively.

Continuing and by way of example, a second multi-lumen polymeric extrusion assembly comprises a first leg and second leg of an electrically conductive wire, two electrically and thermally conductive eyelets formed at the distal ends of the first leg and second leg of an electrically conductive wire and third and fourth tensionable portions of cutting and pursing cable. Alternatively, the two electrically and thermally conductive eyelets can be configured as a single eyelet through which both The first and second legs of an electrically conductive wire (e.g., high purity silver wire) extend rearwardly through second and third lumens, respectively, of the second multi-lumen polymeric extrusion assembly to at least the leaf and multi-lumen polymeric extrusion support member. The first and second legs of an electrically conductive wire that extend from the distal end of the second multi-lumen polymeric extrusion assembly to at least the leaf and multi-lumen polymeric extrusion support member serve to provide additional column strength to the second multi-lumen polymeric extrusion in order to withstand the axial forces associated with the forward advancement of the multi-lumen polymeric extrusion assembly. The third and fourth tensionable portions of cutting and pursing cable extend through the two electrically and thermally conductive eyelets formed at the distal ends of the first leg and second leg of an electrically conductive wire thereby making sliding electrical contact with the two electrically and thermally conductive eyelets that are electrically in communication with each other and that are located at the distal ends of the first leg and second leg of an electrically conductive wire. In this manner, electrical current flowing in second cutting and pursing cable segment continues to flow in third cutting and pursing cable segment due to the sliding electrical contact between the third and fourth tensionable portions of cutting and pursing cable and the two electrically and thermally conductive eyelets that are formed at the distal ends of the first leg and second leg of an electrically conductive wire and that are in direct electrical communication.

Continuing and by way of example, a third multi-lumen polymeric extrusion assembly comprises a third leg and fourth leg of an electrically conductive wire, two electrically and thermally conductive eyelets formed at the distal ends of the third leg and fourth leg of an electrically conductive wire and fifth and sixth tensionable portions of cutting and pursing cable. The third and fourth legs of an electrically conductive wire (e.g., high purity silver wire) extend rearwardly through second and third lumens, respectively, of the third multi-lumen polymeric extrusion assembly to at least the leaf and multi-lumen polymeric extrusion support member. The third and fourth legs of an electrically conductive wire that extend from the distal end of the third multi-lumen polymeric extrusion assembly to at least the leaf and multi-lumen polymeric extrusion support member serve to provide additional column strength to the third multi-lumen polymeric extrusion in order to withstand the axial forces associated with the forward advancement of the multi-lumen polymeric extrusion assembly. The fifth and sixth tensionable portions of cutting and pursing cable extend through the two electrically and thermally conductive eyelets formed at the distal ends of the a third leg and fourth leg of an electrically conductive wire thereby making sliding electrical contact with the two electrically and thermally conductive eyelets that are electrically in communication with each other and that are located at the distal ends of the a third leg and fourth leg of an electrically conductive wire. In this manner, electrical current flowing in fourth cutting and pursing cable segment continues to flow in fifth cutting and pursing cable segment due to the sliding electrical contact between the fifth and sixth tensionable portions of cutting and pursing cable and the two electrically and thermally conductive eyelets that are formed at the distal ends of the third leg and fourth leg of an electrically conductive wire and that are in direct electrical communication.

A tissue cutting and capture assembly forms a circumferential sequence of cutting and pursing cable support members. The tissue cutting and capture assembly comprise, in sequence, a first multi-lumen polymeric extrusion, a first leaf member, a second multi-lumen polymeric extrusion, a second leaf member, a third multi-lumen polymeric extrusion, a third leaf member and six cutting and pursing cables that extend from lumens within the multi-lumen polymeric extrusion and terminate at the eyelet of the leaf member located between each pair of multi-lumen polymeric extrusions. Each of the six cutting and pursing cables extend from a cable mounting hub that is slideably mounted on a support tube and is located at the proximal end of the single-use support housing. Two of the six cutting and pursing cables extend through two of the lumens within each of the multi-lumen polymeric extrusions such that three the multi-lumen polymeric extrusions accommodate the passage of six cutting and pursing cables.

Each of the six cutting and pursing cables slideably extend through a lumen within the multi-lumen polymeric extrusion and continue to one of six electrically and thermally conductive eyelets disposed at the distal ends of the multi-lumen polymeric extrusions as described above. Importantly, electrical current only flows in that portion of each the cutting and pursing cable that extends distally to the multi-lumen polymeric extrusion and beyond the point of sliding electrical contact with electrically and thermally conductive eyelet. In this manner, electrical current only flows in that portion of each the cutting and pursing cable in contact with tissue being incised and does not flow proximally to the electrically and thermally conductive eyelets (e.g., in those portions of one of the cutting and pursing cables that is located within a lumen of a multi-lumen polymeric extrusion). In this manner, electrical current only flows in those portions of the cutting and pursing cables that are in contact with a medium (viz. the tissue at the perimeter of a target tissue volume) that can dissipate the resistive heating generated within the cutting and pursing cable. Preventing the flow of electrical current in those portions of the cutting and pursing cables that are in within the lumens of the multi-lumen polymeric extrusions thereby prevents overheating the cutting and pursing cables as well as the surrounding multi-lumen polymeric extrusions due to the limited ability to dissipate resistive heating within any portions of the cutting and pursing cables that are not in direct contact with the tissue being incised.

By way of example, a hexagonal shaped pattern of six tensionable cutting and pursing cable segments is formed for the case of three multi-lumen polymeric extrusions alternating with three leaf members. Each cutting and pursing cable segment extends between the distal end of one of the three multi-lumen polymeric extrusion members and the nearest adjacent leaf members such that a cutting and pursing cable segment arrives from either side of each leaf member since each leaf member is positioned in between two adjacent multi-lumen polymeric extrusion members. The distal end of each one of the six cutting and pursing cable segments can be secured to an eyelet a leaf member (e.g., by tying the cable in a simple knot at the eyelet-containing tip of leaf member) or can be allowed to pass through the eyelet of a leaf member. Any two cutting and pursing cable segments that are secured to a single leaf member eyelet are in electrical communication with each other. Alternatively, any two cutting and pursing cable segments that pass through the eyelet of a single leaf member are also in electrical communication with each other.

By way of example, electrical communication of the cutting and pursing cable segments is achieved by tying a single continuous cutting and pursing cable length to the eyelet of a leaf member such that the continuous cutting and pursing cable length extends to either side of the leaf member and continues to an adjacent multi-lumen polymeric extrusion member on either side of the leaf member. In this example, the distal ends of two tensionable cutting and pursing cable segments extend from their termination at the eyelet of a leaf member to the electrically and thermally conductive eyelets located at the distal ends of the most adjacent multi-lumen polymeric extrusions on either side of the leaf member. The proximal ends of the two tensionable cutting and pursing cable segments continue rearwardly through lumens within the multi-lumen polymeric extrusions where their proximal ends are securely attached to an electrically insulative cable mounting hub.

In the case of the first multi-lumen polymeric extrusion assembly, the first electrically and thermally conductive lead wire (e.g., high purity silver wire) that extends from a current source through a first lumen is electrically isolated from a second electrically and thermally conductive lead wire (e.g., high purity silver wire) that extends from a current source through a fourth lumen. The only path for electrical current flow from the first multi-lumen polymeric extrusion assembly is electrical conduction through the cutting and pursing cable that continues to and through first, second and third leaf members and alternating second and third multi-lumen polymeric extrusion member assemblies with the path of electrical current flow terminating at the first multi-lumen polymeric extrusion assembly thereby forming a complete circumscribing cutting and pursing cable path.

The first electrically and thermally conductive lead wire and second electrically and thermally conductive lead wire serve three functions. A first function for each first and second electrically and thermally conductive lead wire is to support an electrically and thermally conductive eyelet formed at the distal end of each lead wire. Each electrically and thermally conductive eyelet provides a low-friction pathway for the passage of the cutting and pursing cable as it extends from the orifice of a lumen within a multi-lumen polymeric extrusion member to the eyelet of an adjacent leaf member.

A second function for each first and second electrically and thermally conductive lead wire is to electrically conduct a pre-determined level of constant current from the electrically and thermally conductive eyelet at the distal end of each electrically and thermally conductive lead wire through a low electrical resistance sliding contact between the electrically and thermally conductive eyelet and the cutting and pursing cable as it emerges from each the electrically and thermally conductive eyelet. Accordingly, a pre-determined level of constant current is conducted from a current source located within the handpiece, through a first pair of contacts on the interior of the reusable handpiece and an aligned second pair of contacts on the exterior of the single-use support housing and finally through lead wires within the single-use support housing that extend from the second pair of contacts on the exterior of the single-use support housing to the proximal ends of the first and second electrically and thermally conductive lead wires. In this manner, the supply of a constant level of electric current only flows through low electrical resistance leads, low electrical resistance contacts and low electrical resistance paths along the length of the first and second electrically and thermally conductive lead wires located within lumens in the first multi-lumen polymeric extrusion assembly. The electrical current only commences its flow through the relatively higher resistance cutting and pursing cable as it exits an electrically and thermally conductive eyelet at the distal ends of each of the first and second electrically and thermally conductive lead wires and then into to the cutting and pursing cable.

A third function for each first and second electrically and thermally conductive lead wire contained within lumens extending the length of the first multi-lumen polymeric extrusion assembly is to increase the column strength of a multi-lumen polymeric extrusion formed using elastomeric materials having a low modulus of elasticity such as, by way of example, nylon or fluoropolymer materials. The increased column strength enables the multi-lumen polymeric extrusion formed using elastomeric materials having a low modulus of elasticity to maintain its longitudinal configuration within the delivery cannula during the deployment of the first multi-lumen polymeric extrusion assembly.

The individual lumens within the first multi-lumen polymeric extrusion member are electrically isolated from each other since the polymeric extrusion member is formed of an electrically insulative material such as nylon or polytetrafluorethylene. This electrical isolation of the two lumens through which the first and second electrically and thermally conductive leads extend prevents electrical current flow within the extrusion between the first and second electrically and thermally conductive leads even though the constant current applied to the first and second electrically and thermally conductive leads results in a voltage differential between the first and second electrically and thermally conductive leads of opposite polarity ranging from several volts to several tens of volts.

No significant electrical resistive heating occurs until the applied constant current flow begins within those portions of the relatively high electrical resistance cutting and pursing cable that extend into the surrounding tissue beyond the electrically and thermally conductive eyelets at the distal ends of the first and second electrically and thermally conductive lead wires. Importantly, the distal end of the tissue incision and retrieval assembly that abuts the targeted tissue is configured so that those portions of the cutting and pursing cable that extend beyond the electrically and thermally conductive eyelets at the distal ends of the first and second electrically and thermally conductive lead wires are always in direct thermal contact with soft tissue and/or fluids (e.g., blood). Additionally, the distal end of the tissue incision and retrieval assembly that abuts the targeted tissue may be advanced a short distance without any applied constant current within the resistively heated portion of the cutting and pursing cable to assure thermal contact with the targeted tissue.

In the case of the second multi-lumen polymeric extrusion assembly, a first leg of electrically conductive wire (e.g., high purity silver wire) extends through a second lumen of the second multi-lumen polymeric extrusion assembly and a second leg of electrically conductive wire (e.g., high purity silver wire) extends through a third lumen of the second multi-lumen polymeric extrusion assembly. The first leg of electrically conductive wire and the second leg of electrically conductive wire are in electrical communication so that electrical current can flow from third electrically and thermally conductive eyelet at the distal end of first leg of electrically conductive wire to fourth electrically and thermally conductive eyelet at the distal end of second leg of electrically conductive wire.

Still referring to the second multi-lumen polymeric extrusion assembly, the first leg of electrically conductive wire and second leg of electrically conductive wire serve three functions. A first function for the first leg and second leg of electrically conductive wire is to support the electrically and thermally conductive eyelets formed at the distal ends of the first and second legs of electrically conductive wire. Each electrically and thermally conductive eyelet provides a low-friction pathway for the passage of the cutting and pursing cable as it extends from the orifice of a lumen within a multi-lumen polymeric extrusion member to the eyelet of an adjacent leaf member.

A second function for each first leg and second leg of electrically conductive wire is to form an electrically conductive path between the third electrically and thermally conductive eyelet and the fourth electrically and thermally conductive eyelet so that a continuous electrical current flow path is maintained between the third tensionable portion of cutting and pursing cable and the fourth tensionable portion of cutting and pursing cable. In this manner, a pre-determined level of constant current flows between the electrically and thermally conductive eyelets at the distal ends of the first leg and second leg of each electrically conductive wire through a low electrical resistance sliding contact between the electrically and thermally conductive eyelet and the cutting and pursing cable as it emerges from each the electrically and thermally conductive eyelet. The electrical current only commences its flow through the relatively higher resistance cutting and pursing cable as it exits an electrically and thermally conductive eyelet at the distal ends of each of the first leg and second leg of electrically conductive wire and then into to the cutting and pursing cable.

A third function for each first leg and second leg of electrically conductive wire contained within lumens extending the length of the second multi-lumen polymeric extrusion assembly is to increase the column strength of a multi-lumen polymeric extrusion formed using elastomeric materials having a low modulus of elasticity such as, by way example, nylon or fluoropolymer materials. The increased column strength enables the a multi-lumen polymeric extrusion formed using elastomeric materials having a low modulus of elasticity to maintain its longitudinal configuration within the delivery cannula during the deployment of the second multi-lumen polymeric extrusion assembly.

No significant electrical resistive heating occurs in the electrically resistance cutting and pursing cable until the applied constant current flow begins within those portions of the relatively high electrical resistance cutting and pursing cable that extend into the surrounding tissue beyond the electrically and thermally conductive eyelets at the distal ends of the first leg and second leg of electrically conductive wires. Importantly, the distal end of the tissue incision and retrieval assembly that abuts the targeted tissue is configured so that those portions of the cutting and pursing cable that extend beyond the electrically and thermally conductive eyelets at the distal ends of the first leg and second leg of electrically conductive wires are always in direct thermal contact with soft tissue and/or fluids (e.g., blood).

In the case of the third multi-lumen polymeric extrusion assembly, a third leg of electrically conductive wire (e.g., high purity silver wire) extends through a second lumen of the third multi-lumen polymeric extrusion assembly and a fourth leg of electrically conductive wire (e.g., high purity silver wire) extends through a third lumen of the third multi-lumen polymeric extrusion assembly. The third leg of electrically conductive wire and the fourth leg of electrically conductive wire are in electrical communication so that electrical current can flow from fifth electrically and thermally conductive eyelet at the distal end of third leg of electrically conductive wire to sixth electrically and thermally conductive eyelet at the distal end of fourth leg of electrically conductive wire.

Still referring to the third multi-lumen polymeric extrusion assembly, the third leg of electrically conductive wire and fourth leg of electrically conductive wire serve three functions. A first function for the third leg and fourth leg of electrically conductive wire is to support the electrically and thermally conductive eyelets formed at the distal ends of the third and fourth legs of electrically conductive wire. Each electrically and thermally conductive eyelet provides a low-friction pathway for the passage of the cutting and pursing cable as it extends from the orifice of a lumen within a multi-lumen polymeric extrusion member to the eyelet of an adjacent leaf member.

A second function for each third leg and fourth leg of electrically conductive wire is to form an electrically conductive path between the fifth electrically and thermally conductive eyelet and the sixth electrically and thermally conductive eyelet so that a continuous electrical current flow path is maintained between the fifth tensionable portion of cutting and pursing cable and the sixth tensionable portion of cutting and pursing cable. In this manner, a pre-determined level of constant current flows between the electrically and thermally conductive eyelets at the distal ends of the third leg and fourth leg of each electrically conductive wire through a low electrical resistance sliding contact between the electrically and thermally conductive eyelet and the cutting and pursing cable as it emerges from each the electrically and thermally conductive eyelet. The electrical current only commences its flow through the relatively higher electrical resistance cutting and pursing cable as it exits an electrically and thermally conductive eyelet at the distal ends of each of the third leg and fourth leg of electrically conductive wire and then into the resistively heated portions of the cutting and pursing cable.

A third function for each third leg and fourth leg of electrically conductive wire contained within lumens extending the length of the third multi-lumen polymeric extrusion assembly is to increase the column strength of a multi-lumen polymeric extrusion formed using elastomeric materials having a low modulus of elasticity such as, by way example, nylon or fluoropolymer materials. The increased column strength enables the multi-lumen polymeric extrusion formed using elastomeric materials having a low modulus of elasticity to maintain its longitudinal configuration within the delivery cannula during the deployment of the third multi-lumen polymeric extrusion assembly.

As in the case of the first and second multi-lumen polymeric extrusion assemblies, no significant electrical resistive heating occurs in the third multi-lumen polymeric extrusion assembly until the applied constant current flow begins within those portions of the relatively high electrical resistance cutting and pursing cable that extend into the surrounding tissue beyond the electrically and thermally conductive eyelets at the distal ends of the third leg and fourth leg of electrically conductive wires. Importantly, the distal end of the tissue incision and retrieval assembly that abuts the targeted tissue is configured so that those portions of the cutting and pursing cable that extend beyond the electrically and thermally conductive eyelets at the distal ends of the third leg and fourth leg of electrically conductive wires are in direct thermal contact with soft tissue and/or fluids (e.g., blood).

According to the teachings of a preferred embodiment of this disclosure, a tissue cutting and capture assembly may comprise two or more leaf members, two or more multi-lumen polymeric extrusion assemblies and a resistively heatable cutting and pursing cable that is resistively heatable along those portions of the cutting and pursing cable that are in direct contact with tissue and distal to the eyelets located at the distal ends of the two or more leaf members and two or more multi-lumen polymeric extrusion assemblies. The two or more leaf members and the two or more multi-lumen polymeric extrusion assemblies are supported at their proximal ends by a leaf member and extrusion assembly support member.

The leaf member and extrusion assembly support member is driven forwardly by a motor-actuated drive tube drive member translation assembly that is abuttingly engaged against the leaf member and extrusion assembly support member to actuate the deployment of the tissue cutting and capture assembly. The tissue cutting action is enabled by the passage of electrical current only through those portions of the resistively heated portion of cutting and pursing cable that is in direct contact with tissue or fluids within the body. Hereinafter, references to contact with tissue may include contact with tissue and other fluids within the body. The electrical current passing through only those portions of the resistively heated portion of cutting and pursing cable in direct contact with tissue is of sufficient current flux to induce resistive heating of the cutting and pursing cable to achieve an elevated temperature sufficient to establish a thermally induced cutting effect at the leading edge of the resistively heated portion of cutting and pursing cable. By way of example, the current flux and associated resistance heating is sufficient to maintain the temperature of the resistively heated portion of cutting and pursing cable at a temperature of at least 300 C, under predetermined tissue cutting rates and types of soft tissue medium including, but not limited to, muscle tissue, adipose tissue, tendons, lymphatic tissue as well as transecting blood vessels and exposure to blood.

An essential attribute of the apparatus of the present disclosure is the confinement of the path of electrical conduction of constant current required to achieve tissue cutting to only those portions of the expanding and contracting resistively heated segments of the cutting and pursing cable that are distal to the eyelets of the multi-lumen polymeric extrusion assemblies and that are in direct contact with tissue. The confinement of the path of electrical conduction of constant current to only those portions of the expanding and contracting resistively heated segments of the cutting and pursing cable that are in direct contact with tissue avoids overheating those portions of the tensionable cutting and pursing cable that are located proximal to the eyelets of and within the lumens of the multi-lumen polymeric extrusion assemblies and not in contact with tissue. As a consequence, the rate of heat dissipation from the cutting and pursing cable is negligible in those proximal portions of the cutting a pursing cable that are not distal to the eyelets and that are not in contact with tissue.

The tensionable portions of the cutting and pursing cable extending through and rearwardly within the lumens of the first, second and third multi-lumen polymeric extrusion assemblies enable the application of a mechanical load or tension level required for the pursing down of the tissue capture basket during the process of incising and capturing a target tissue volume. The mechanical load or tension level is uniformly applied to the proximal ends of each of the tensionable portions of the cutting and pursing cable beginning after the basket has reached the pre-selected maximum opening diameter (e.g., 25 mm diameter opening size).

The tensionable portions of the cutting and pursing cable that are not in direct contact with tissue and proximal to the tip of the tissue capture basket are not intended to support the electrical conduction of the constant current required to heat the cable above temperature threshold levels required for the thermal cutting of tissue. Importantly, electrical current flows only within the resistively heated portion of cutting and pursing cable in direct contact with tissue while no electrical current flows into or through the tissue being cut. Advantageously, the prevention of electrical current flow into or through the tissue being cut minimizes necrosis of tissue beyond the immediate surface of the tissue incision thereby assuring a pathology specimen having minimal thermal and electrical current related damage or artifact. In addition, for the case of procedures performed with only local anesthesia, the prevention of electrical current flow into or through the tissue being cut can prevent the induction of pain in the patient's nerve pathways located beyond and more distant from the path of tissue incision and beyond the localized region of induced anesthesia as with the injection of analgesic agents such as Lidocaine.

By way of example, as the two or more leaf members and two or more multi-lumen polymeric extrusion assemblies engaged with the drive assembly drive member are driven forwardly by a motor-actuated drive tube drive member translation assembly, the eyelets disposed at the distal ends of the two or more leaf members and the distal ends of the two or more multi-lumen polymeric extrusion assemblies are likewise driven forwardly. Alternatively, other means for advancement of the drive tube drive member translation assembly may be employed, including, but not limited to, pneumatic or spring-loaded advancement. The eyelets at the distal ends of the leaf members and multi-lumen polymeric extrusion assemblies support the resistively heated portions of the cutting and pursing cable as the cutting and pursing cable is driven forwardly at an attack angle mutually outwardly through a guidance assembly to an extent that the cutting leading edge of the resistively heated portion of the cutting and pursing cable reaches an effective maximum diameter extending about and circumscribing the target tissue volume to be excised and captured. By way of example, a drive finger extending from the motor-actuated drive tube drive member translation assembly may drivably engage the drive assembly drive member to affect its advancement and the supported leaf members and multi-lumen polymeric extrusion assemblies.

The maximum diameter of the volume of tissue to be cut and captured by the disclosed tissue incision and retrieval instrument may be pre-selected by the operator. By way of example, the cable mounting hub stop for a desired tissue capture diameter may be positioned at the time of manufacture of the single-use tissue incision and retrieval assembly with possible tissue capture sizes that range from less than 10 mm to greater than 30 mm. In a preferred embodiment, the single-use tissue incision and retrieval assembly incorporates an operator actuatable capture diameter selection assembly that enables the operator to manually select discrete tissue capture diameter sizes that range, for example, from 15 mm to 30 mm in diameter increments of 5 mm. The operator actuatable capture diameter selection assembly enables the operator to pre-position a cable mounting hub stop at one of the positions that correspond to the maximum tissue diameter being cut and captured.

Upon reaching the juncture at which the deploying leaf members and multi-lumen polymeric extrusion assemblies attain the pre-selected maximum tissue diameter, the cable mounting hub then encounters and is abuttingly engaged against one or more compression springs that are positioned more proximally on a support tube and that abuttingly engage the pre-positioned stationary cable mounting hub stop that is located more distally on the support tube. Once the cable mounting hub encounters and is abuttingly engaged against one or more compression springs that abuttingly engage a pre-positioned stationary cable mounting hub stop, tension begins to increase in the cables secured to the cable mounting hub. The increasing tension in the cables that extend rearwardly from the distal ends of two or more multi-lumen polymeric extrusion assemblies as the motor-actuated drive tube drive member translation assembly continues to drive the leaf members and multi-lumen polymeric extrusion assemblies forward causes the distal ends of the leaf members and multi-lumen polymeric extrusion assemblies to purse down as the tissue cutting continues past the maximum diameter juncture.

In a preferred embodiment, two compression springs may be positioned over a support tube. The support tube also provides support for a cable mounting hub that freely slides along the support tube. An operator-positioned stationary cable mounting hub stop is also located along the path of the support tube and is positioned distal to the cable mounting hub. A first compression spring is selected to have a smaller value of spring force constant and a total compressible length that causes the distal ends of the leaf members and multi-lumen polymeric extrusion assemblies that constitute the cutting and capture basket to purse down by a small amount near the approach to the apex of the basket opening phase to produce a more hemispherical-like shape of the cutting path through tissue as the point of maximum opening or diameter of the cutting and capture basket is reached. The spring force constant and length of the first compression spring is selected so that first compression spring is fully compressed such that each coil member of first spring abuts the next coil member of first spring, the fully compressed length commonly referred to as the solid height of a compression spring. The full (i.e., maximum possible) compression of first compression spring contributes to defining the maximum diameter of the cutting and capture basket and, hence, the maximum diameter of the captured tissue specimen.

Once the maximum diameter of the cutting and capture basket is reached, a second compression spring oriented in line with the first compression spring begins to be compressed as the motor-actuated drive tube drive member translation assembly continues to drive the leaf members and multi-lumen polymeric extrusion assemblies forward and continue, in turn, to advance the cable mounted hub still closer to the pre-positioned cable mounting hub stop. The second compression spring is selected to have a greater value of spring force constant and a total compressible length that causes the distal ends of the leaf members and multi-lumen polymeric extrusion assemblies that constitute the cutting and capture basket to purse down to follow a curvilinear path and to define a steadily decreasing diameter of tissue incision until the pursing down results in the complete excision of the enveloped spherical-shaped tissue volume.

In the pursing down phase of the tissue cutting and capture induced by second compression spring abutting the pre-positioned cable mounting hub stop, the eyelets located at the distal ends of the leaf members and multi-lumen polymeric extrusion assemblies are drawn mutually inwardly to define a hemispherical curvilinear profile to close the leading edge about the tissue volume as the forward movement of the leaf members and pairs of flexible tubular metal conduits continues. The resistively heated portion of the cutting and pursing cable, now under tension and constrained by the interior surfaces of the leaf members and multi-lumen polymeric extrusion assemblies contributes to the structural stability of the resultant tissue capture basket.

The translation of the motor-actuated drive tube drive member translation assembly that advances the leaf members and multi-lumen polymeric extrusion assemblies affects the rate of closure of the tissue capture basket while the spring force constant and length of the second compression spring determines the degree or extent of curvature of the noted curvilinear profile.

In a preferred embodiment, first and second electrical terminals are located on the left and right interior sides of the handpiece and are in slideable electrical contact with corresponding first and second terminals located on the left and right exterior sides of the single-use support housing, respectively. These slideably communicating first and second electrode pairs provide the supply of constant current to the cutting and pursing cable. As a result of the small diameter and high electrical resistivity of the cutting and pursing cable, substantially all of the electrical resistance in the circuit carrying the applied constant current is confined to those portions of the cutting and pursing cable that extend from the eyelets of the two or more leaf members and two or more multi-lumen polymeric extrusion assemblies. As the leaf members and multi-lumen polymeric extrusion assemblies deploy during the incision and capture of the target tissue volume, the length of the resistively heated portion of the cutting and pursing cable increases from an initial starting position until the operator-selected maximum tissue capture diameter is attained.

Once the maximum tissue capture diameter is attained, the cable mounting hub stop induces the pursing down of the distal ends of the leaf members and multi-lumen polymeric extrusion assemblies, thereby causing the length of the resistively heated portion of the cutting and pursing cable to decrease to a minimum length upon the completion of the drawing together or pursing down of the distal ends of the leaf members and multi-lumen polymeric extrusion assemblies. As the length of the of the resistively heated portion of cutting and pursing cable increases to a maximum value during the basket opening phase followed by a decrease to a minimum value during the basket pursing down phase, the electrical resistance of the resistively heated portion of the cutting and pursing cable increases or decreases in proportion to the total length of all of the resistively heated portions of the cutting and pursing cables during the opening and pursing down phases. Since a pre-determined constant current is supplied to the resistively heated portions of the cutting and pursing cables during the tissue incision and capture process, the corresponding applied voltage will increase or decrease proportionately as the electrical resistance of the resistively heated portions of the cutting and pursing cables increases or decreases according to the well-known Ohm's Law. As applied to the present disclosure, Ohm's Law specifies that the voltage differential across the ends of a conductor is proportional to the product of the electrical current flow through a conductor and the electrical resistance of the conductor. Hence, although the level of electrical current supplied to cutting and pursing cable is selected to be substantially constant, the applied voltage level varies throughout the course of the tissue incision and capture process. The pre-determined level of constant current is selected to achieve [a] a sufficient heat generation rate within the portions of the cutting and pursing cable that are distal to the eyelets of the multi-lumen polymeric extrusion assemblies and extend to the adjacent leaf member eyelets to maintain a temperature sufficient to incise tissue (e.g., a temperature of at least 300 C) while [b] maintaining the maximum temperature of the cable, throughout the tissue incision and capture process, below the threshold of mechanical failure (i.e., breaking) of the cable under the applied tensile load or the threshold of melting the cable.

The voltage level applied across the first and second constant current terminals located on the left and right interior sides of the handpiece, which varies according to the length of the deployed resistively heated portions of the cutting and pursing cables as discussed above, is continuously measured throughout the tissue cutting and capture process. In addition, the pre-determined constant current level supplied to the varying length of the resistively heated portions of the cutting and pursing cables that extends beyond the distal ends of the first multi-lumen polymeric extrusion assembly is also continuously measured and controlled throughout the tissue cutting and capture process. Circuitry within the controller located within the handpiece combines the measured varying voltage level and the measured constant current level to continuously derive the effective electrical resistance of the resistively heated cutting and pursing cable, Rcable. When the derived value of Rcable decrease below a pre-determined minimum cable resistance value, Rmin, corresponding the minimum length of deployed cutting and pursing cable that exists upon the completion of the drawing or pursing together of the distal ends of all multi-lumen polymeric extrusion assembly and all leaf members, then the incision and capture process performed to circumscribe the target tissue volume is complete.

Following the completion of the incision and capture of the target tissue volume, the substantially constant current applied to the resistively heated portion of the cutting and pursing cable is discontinued. Also and simultaneously, the voltage applied to the motor-actuated drive tube drive member translation assembly is discontinued. Also and simultaneously, the controller within the handpiece provides a visual cue is activated and the audible cue or tone is discontinued (i.e., the audible cue or tone being issued from the handpiece throughout the incision and capture process) to indicate that the incision and capture process for circumscribing and capturing the target tissue volume is complete. At this point, the delivery cannula is removed from the patient along with a retained volume of captured tissue containing the target tissue volume.

The tissue incision and retrieval instrument of the present disclosure enjoys the capability of providing a range of maximum effective diameters during tissue incision and capture. Accordingly, the maximum effective diameter can be selected by the practitioner just prior to the start of a procedure using a manually adjustable selector button located on the single-use support housing to select the desired tissue capture diameter. By way of example, the practitioner may manually position a selector button on the single-use support housing to a diameter of the incised and captured tissue volume of 15, 20, 25 or 30 mm. Once the diameter of the incised and captured tissue volume is selected by the practitioner, the single-use tissue incision and retrieval assembly is inserted into the handpiece by the practitioner and secured into position using the rotatable locking nut positioned at the distal end of single-use housing.

The relatively straightforward structuring of the delivery cannula, leaf member assembly, multi-lumen polymeric extrusion assembly and drive assembly drive member permits their incorporation within a single-use support housing that is removably insertable within a manually maneuvered handpiece assembly. The motor-actuated drive tube drive member translation assembly within the handpiece assembly may be arranged either in-line along the same longitudinal axis of the delivery cannula, leaf member assembly, multi-lumen polymeric extrusion assembly and drive assembly drive member or may be arranged side-by-side relative to the longitudinal axis of the delivery cannula, leaf member assembly, multi-lumen polymeric extrusion assembly and drive assembly drive member.

Practitioner control over the tissue incision and retrieval instrument of this disclosure is provided in the form of control switches located on the hand-held handpiece assembly. All operator usage and cueing functions are incorporated within the handpiece assembly in combination with a rechargeable battery, thereby eliminating the need for an external control assembly and associated interconnecting cable. If the tissue incision and retrieval procedure is to be performed in a sterile field (e.g., the sterile field of an operating room), then a single-use, thin, transparent and flexible sterile sheath may first be placed over the handpiece assembly, after first inserting pre-sterilized single-use housing assembly, to ensure that the tissue incision and retrieval instrument is effectively sterile or closed within a sterile sheath. By way of example, a single-use sterile sheath suitable for enveloping the handpiece assembly is available from Protek Medical Products, Inc. located in Coralville, Iowa.

In carrying out the tissue incision and retrieval procedure, the distal end of the delivery cannula is positioned in confronting adjacency with the target tissue volume to be removed. The positioning step is achieved through the utilization of a forwardly disposed sharp cutting blade assembly and guided to confronting adjacency with the target tissue volume using stereotactic, ultrasound, MRI or other guidance methods suitable for locating the target tissue volume.

The delivery cannula being thus positioned, the practitioner depresses the start tissue incision and capture switch located on the handpiece assembly to commence the incision and capture of the target tissue volume. Upon momentarily depressing the start tissue incision and capture switch, the internal control system comprising a circuit board assembly within the handpiece assembly enters a capture mode. At the commencement of this capture mode, electrical current is applied exclusively and only through the resistively heated portions of the cutting and pursing cables located at the distal ends of the multi-lumen polymeric extrusion assemblies and leaf members. The electrical current is preferably an electrical current applied at a constant level from a current source located within the handpiece assembly. A pre-determined level of constant current is applied only to the resistively heated portions of the cutting and pursing cables that are in contact with tissue and the current is applied in conjunction with the activation of a motor-actuated drive tube drive member translation assembly such that the cutting and pursing cable is advancing through tissue while electrical current is being applied to the cutting and pursing cable. The constant current source preferably operates at a level of at least 25 kHz and more preferably at a frequency of 100 kHz or greater. The current source preferably delivers a substantially constant current level as an alternating current at an elevated frequency of at least 25 kHz and preferably at a frequency of 100 kHz or greater to minimize the occurrence of electrical stimulation of tissue that is in contact with the resistively heated portion of the cutting and capture cable. However, unlike prior art devices, no electrical current flows through surrounding tissue but only flows through the resistively heated portions of the cutting and pursing cables.

With the simultaneous commencement of the motor-actuated drive tube drive member translation assembly and the delivery of a substantially constant current to the resistively heated portion of cutting and pursing cable that is in contact with tissue, the tissue cutting and capture assembly commences to be deployed from the cannula distal end assembly. The tissue cutting and capture assembly shall include a minimum of three members of which at least one of these members is a multi-lumen polymeric extrusion assembly. Possible configurations of the tissue cutting and capture assembly include [a] one multi-lumen polymeric extrusion assembly and two or more leaf members, [b] two or more multi-lumen polymeric extrusion assemblies and one or more leaf members and [c] three or more multi-lumen polymeric extrusion assemblies. The tissue cutting and capture assembly shall also include resistively heated portions of cutting and pursing cables supported at the distal ends of the members.

The electrical resistance of the resistively heated portions of the cutting and pursing cables, being proportional to the total length of the resistively heated portions of the cutting and pursing cables extending between the distal ends of the multi-lumen polymeric extrusion assemblies and leaf members, is continuously monitored by the internal control system within the handpiece assembly. The electrical resistance of the resistively heated portions of the cutting and pursing cables are monitored throughout the motor-driven advancement of the multi-lumen polymeric extrusion assemblies and leaf members followed by the pursing down of the tissue cutting and capture assembly once the cable mounting hub abuts the operator-positioned cable mounting hub stop. When the measured electrical resistance of the resistively heated portions of the cutting and pursing cables decreases below a predetermined level, the internal control system detects the end of tissue cutting and capture and immediately discontinues the application of constant current to the cutting and capture cable thereby commencing the "capture complete" state. In this capture complete state, the voltage applied to the motor-actuated drive tube drive member translation assembly is also discontinued.

The delivery cannula with captured tissue specimen is next removed from the incision site of the subject. The captured tissue specimen within the enveloping tissue cutting and capture assembly, an assembly that is formed by the leaf members and multi-lumen polymeric extrusion assemblies, is released from the tissue cutting and capture assembly by severing the cutting and capture cable located at the distal end of the captured tissue specimen. By way of example, the cutting and capture cable may be severed using a small surgical scissors such as a tenotomy scissors.

If, during the capture mode, the practitioner wishes to halt the procedure, the start tissue incision and capture switch can be depressed to cause the control assembly to enter a pause mode. In this pause mode, the current applied to the resistively heated portion of cutting and pursing cable as well as the voltage applied to the motor-actuated drive tube drive member translation assembly are suspended. The practitioner carries out the return to the capture mode performance by again depressing the start tissue incision and capture switch.

The current source is preferably configured to deliver a substantially constant current level to the resistively heated portions of cutting and pursing cables. A terminal assembly comprising first and second electrical contacts is provided in the single-use housing assembly in order to provide for connection to the current source at corresponding first and second electrical terminals in the housing assembly. In addition, during the ensuing actuation of the tissue cutting and capture assembly by the motor-actuated drive tube drive member translation assembly, the electrical resistance of the cutting and pursing cable is continuously monitored using Ohms Law by monitoring the applied voltage across the cutting and pursing cable and dividing by the applied level of constant current supplied to the cutting and pursing cable.

A measured total electrical resistance across the deployed cutting and pursing cable that decreases below a pre-determined threshold level indicates the completion of tissue cutting and commencing a capture complete state thereby terminating the application of constant current to the cutting and pursing cable as well as the application of voltage to the motor within the handpiece. A control system includes both a current source, motor drive power source, a cutting and pursing cable resistance measuring circuit and programmed microcomputer to enable response to capture actuation switch disposed on the handpiece, activate the audible tones and display indicator lights and to stop the procedure when capture complete state is attained. The control system also indicates when rechargeable battery within handpiece requires recharging.

A series of bench-top tests were performed to measure the temperature of a constant-current resistively heated wire (viz., solid platinum wire) using resistance thermometry while the wire is cutting and advancing through a sample of ex vivo animal tissue. The diameters of the cutting wires used in these bench-top tests were selected to be similar to the diameters of the constant-current, resistively heated portions of the cutting and pursing cables (e.g., stainless steel 316 or cobalt/tungsten/chromium/nickel alloy L605). Unlike the preferred stainless steel or cobalt-based alloys preferred for the cutting and pursing cable employed in the present invention, platinum was used in these bench-top tests since its significantly larger and well-established temperature coefficient of resistance value enables the use of resistance thermometry to determine the temperature of a heated wire during tissue cutting tests. The results of bench-top tests confirmed that the average temperature of a cutting wire or cable having overall diameters in the range from nominally 0.003 inch to 0.005 inch ranges from about 350 C to 400 C while cutting ex vivo animal tissue at a cutting (i.e., advancement) rate of 2.3 to 3.0 mm/second. In addition, the results of bench-top tests confirmed that the average heat flux required to cut or advance at a rate of 2.3 to 3.0 mm/second through a sample of ex vivo animal tissue ranges from 150 to 220 watts/cm$^2$. Based on the results of the cutting tests in samples of ex vivo animal tissue, the heat flux dissipated from the cutting and pursing wire employed in the tissue incision and retrieval assembly of the present disclosure is preferably at least 150 watts/cm$^2$ and more preferably at least 220 watts/cm$^2$.

Other objects of the present disclosure will be obvious and will, in part, appear hereinafter. The present disclosure, accordingly, comprises the method, system and apparatus possessing the construction, combination of elements, arrangement of parts and steps, which are exemplified in the following detailed description. For a fuller understanding of the nature and objects of the present disclosure, reference should be made to the following detailed description taken in connection with the accompanying drawings.

BRIEF DESCRIPTION OF THE SEVERAL VIEWS OF THE DRAWINGS

FIG. 1A is a side view of the reusable handpiece incorporating the single-use tissue incision and retrieval assembly;

FIG. 1B is a side view of the reusable handpiece incorporating the single-use tissue incision and retrieval assembly enclosed within single-use sterile sheath;

FIG. 4 is a partial sectional view of the reusable, battery-powered handpiece and single-use tissue incision and retrieval assembly shown in FIGS. 1 and 2 with portions broken away;

FIG. 4A is a sectional view end cap with O-ring providing a water-tight seal at distal end opening of handpiece assembly for use during cleaning and disinfection of handpiece assembly between surgical procedures;

FIG. 5 is a sectional view taken through the plane 5-5 shown in FIG. 4;

FIG. 6 is a partial sectional view of tissue incision and retrieval assembly seen in FIG. 2;

FIG. 6A is a sectional view taken through the plane 6A-6A shown in FIG. 6 showing operator actuatable capture size selector;

FIG. 7 is a partial top view of single-use tissue incision and retrieval assembly seen in FIG. 2 showing operator actuatable capture size selector;

FIG. 8 is a bottom view of side of single-use tissue incision and retrieval assembly seen in FIG. 2;

FIG. 15 is an end sectional view of tip region of single-use tissue incision and retrieval assembly taken through the plane 15-15 seen in FIG. 12;

FIG. 15A is a detailed end sectional view of first multi-lumen polymeric extrusion assembly seen in FIG. 15;

FIG. 15B is a detailed end sectional view of second multi-lumen polymeric extrusion assembly seen in FIG. 15;

FIG. 15C is a detailed end sectional view of third multi-lumen polymeric extrusion assembly seen in FIG. 15;

FIG. 16 is a partial plan view of a leaf member employed with the structure shown in FIG. 21 as it appears prior to the bending of its tip portion;

FIG. 16A is a partial view of the leaf shown in FIG. 16 with its tip bent into an operative orientation;

FIG. 17 is a sectional view of first multi-lumen polymeric extrusion assembly seen in FIG. 15 showing first and second electrically and thermally conductive leads with eyelets at their distal ends and first and second tensionable portions of cutting and pursing cables;

FIG. 18 is a sectional view of second multi-lumen polymeric extrusion assembly seen in FIG. 15 showing first and second legs of electrically conductive wires with eyelets at their distal ends and third and fourth tensionable portions of cutting and pursing cables;

FIG. 18A is a sectional view of third multi-lumen polymeric extrusion assembly seen in FIG. 15 showing third and fourth legs of electrically conductive wires with eyelets at their distal ends and fifth and sixth tensionable portions of cutting and pursing cables;

FIG. 19 is a perspective view of cable mounting hub seen in FIG. 6 showing first, second, third, fourth, fifth and sixth tensionable portions of cutting and pursing cables retained by electrically insulative sleeves;

FIG. 20 is a partial side sectional view of leaf member and extrusion assembly support member, drive tube and support tube seen in FIGS. 20A and 21;

FIG. 20A is a sectional view of leaf member and extrusion assembly support member taken through the plane 20A-20A seen in FIG. 20;

FIG. 21 is an assembly view of leaf member and extrusion assembly support member including leaf members and multi-lumen polymeric extrusions;

FIG. 26A is a sectional view of single-use tissue cutting and capture assembly seen in FIG. 2 showing positions of drive block, leaf member and extrusion assembly support member, cable mounting hub and cable mounting hub stop after insertion into tissue of patient adjacent to target tissue volume and prior to deployment of tissue cutting and capture assembly;

FIGS. 30A-30C combine, as labeled thereon, to provide a flow chart describing the methodology of the invention.

Figure 1:
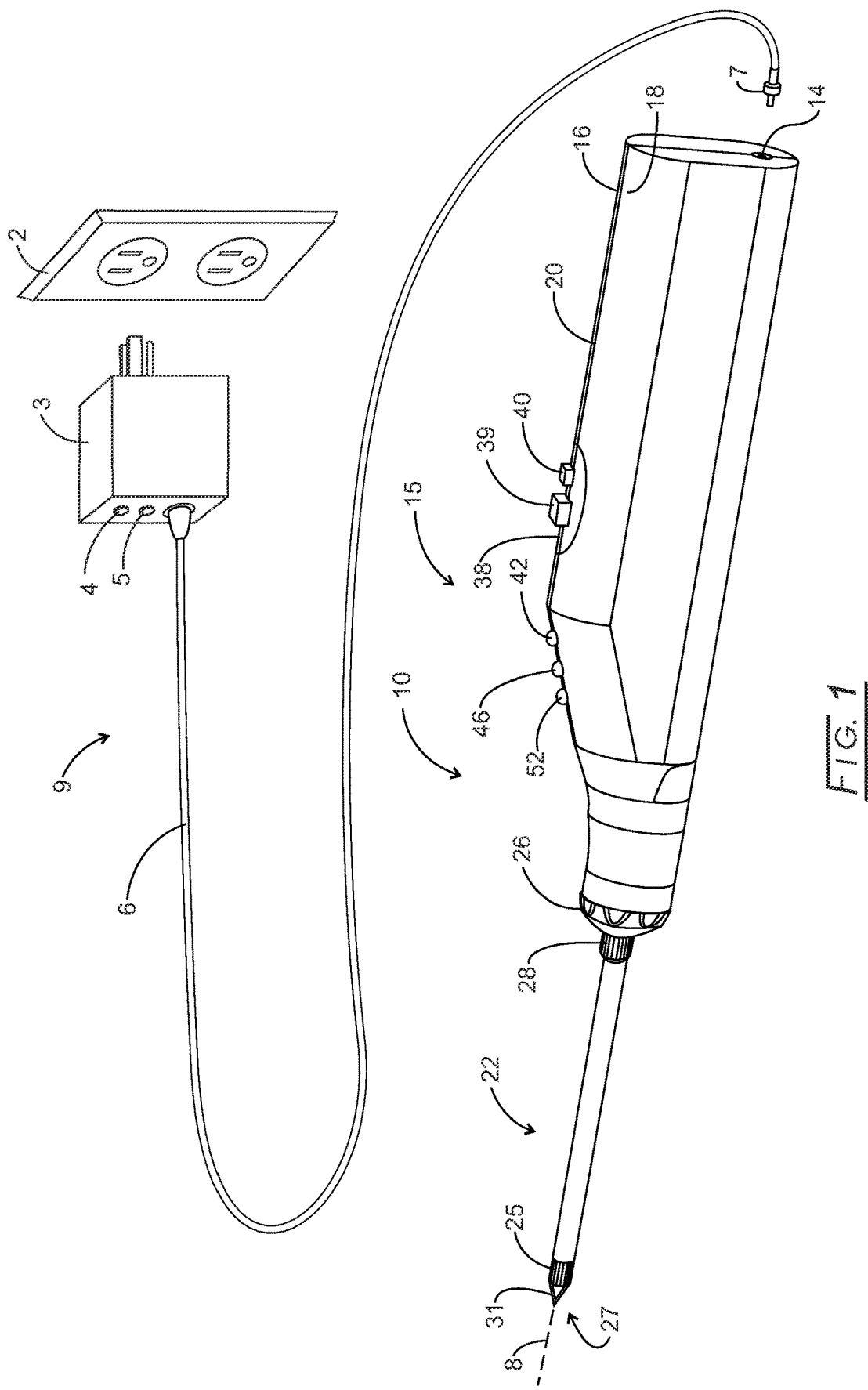
FIG. 1 is a perspective view of the system of the invention showing a reusable, battery-powered handpiece incorporating a control system, single-use tissue incision and retrieval assembly and handpiece battery charger.

The drawings will be described in further detail below.

DETAILED DESCRIPTION OF THE INVENTION

A predominate characteristic of the present disclosure resides in the employment of a single-use tissue incision and retrieval assembly in conjunction with a reusable, battery-powered handpiece. In a preferred embodiment of the detailed description of the present disclosure that follows and by way example, the tissue cutting and capture assembly includes three multi-lumen polymeric extrusion assemblies and three leaf members. This tissue incision and retrieval assembly is configured with a forward portion, which extends to a forwardly disposed cutting leading edge, which incorporates a mechanically sharp cutting blade. Targeted tumor or tissue along with adjacent healthy tissue is circumscribed and encapsulated by a leaf member and multi-lumen polymeric extrusion assembly through the utilization of a resistively heated portion of cutting and pursing cable extending along the distal tip of the leaf member and multi-lumen polymeric extrusion assembly which (a) provides a thermal cutting effect by virtue of being resistively heated and maintained above a temperature threshold and heat flux level sufficient to effect thermal cutting of tissue and (b) constricts the leading edge to, in effect, encapsulate the incised tissue volume defined by the emerging and outwardly expanding tips of the leaf members and multi-lumen polymeric extrusion assemblies followed by their inwardly contracting tips during the pursing down phase of the tissue capture process.

In a preferred embodiment, the leaf member and multi-lumen polymeric extrusion assembly is implemented with the combination of [a] three elongate flexible metal leaf members the tips of which are formed with an eyelet for receiving a single cable of the noted resistively heated portion of cutting and pursing cable assembly and [b] three multi-lumen polymeric extrusion assemblies, which serve as conduits for [i] pairs of electrically and thermally conductive leads with eyelets at their distal ends and [ii] pairs of tensionable cutting and pursing cables. By selecting a component orientation establishing where a pursing or constricting action commences, the maximum leading edge periphery for capture may be elected and, typically, may range, for example, from about a 10 mm to about a 30 mm effective diametric extent. Initial positioning of the delivery cannula tip in confronting adjacency with a tissue volume is facilitated through the utilization of a surgically sharp cutting blade assembly located at the tip. Following appropriate positioning of the tip, a motor-actuated drive tube drive member translation assembly is enabled to actuate the leaf member and multi-lumen polymeric extrusion assembly thus providing an optimized rate of movement of the leading edge of the resistively heated portion of cutting and pursing cable about the target tissue volume. A desirable feature of the system of the present disclosure resides in the incorporation of the delivery cannula and cable-implemented leaf member and multi-lumen polymeric extrusion assembly within a single-use support housing. That single-use support housing is removably mounted within a reusable handpiece assembly containing the motor-actuated drive tube drive member translation assembly and control components. An operator-selectable stop enables a universal tissue excision and retrieval assembly to be used to incise and capture substantially spherical target tissue volumes (e.g., human breast tissue) having maximum diameter extents ranging from 10 to 30 mm. The term "cannula" or "delivery cannula" as used herein is intended to refer to any elongate surgical delivery structure, rigid or flexible, having a capability for deploying resistively heated portion of cutting and pursing cable.

Referring to FIG. 1, a tissue incision and retrieval system according to the present disclosure is represented in general at 10. Tissue incision and retrieval system 10 includes a single-use tissue incision and retrieval assembly having an elongate delivery cannula 22 in combination with a reusable handpiece assembly represented generally at 15. By way of example, reusable handpiece assembly 15 may comprise a housing right side 16 and housing left side 18. Reusable handpiece 15 may be formed of two molded components shown as housing right side 16 and housing left side 18. Housing sides 16 and 18 extend mutually outwardly from a medial plane represented at a joint line 20. An elongate delivery cannula represented at 22 is shown supported from the forward portion of the handpiece assembly 15, which extends along a longitudinal axis 8. A distal end of the delivery cannula 22 extends through a locking nut 26, which is retained in position by a collar 28. The forward region of the cannula 22, as represented at 27 extends to a distal end or tip 25. Distal end or tip 25 also supports a surgically sharp blade 31, which enables the initial advancement and positioning of the distal end of tip 25 of cannula 22 in a confronting relationship with respect to the targeted tissue site (not shown).

Still referring to FIG. 1, operator actuatable on/off and initialization switch 40 and start incision and capture switch 39 are incorporated within a switch housing 38. The on/off and initialization switch 40 and start incision and capture switch 39 are in communication with a control system (not shown) within handpiece assembly 15 via lead wires and/or printed circuit board lead traces. The tissue incision and retrieval system 10 also includes a handpiece battery charger 9 that comprises an alternating current to direct current converter 3, first battery charger indicator light 4 used to provide a visual cue that handpiece battery recharging is in progress, second battery charger indicator light 5 used to provide a visual cue that handpiece battery recharging has been completed, handpiece battery charging cable 6 and handpiece battery charging cable connector 7 removably attachable to charging receptacle 14 on handpiece assembly 15.

Still referring to FIG. 1, upon depressing the on/off and initialization switch 40, the controller (not shown) within the handpiece assembly 15 tests the energy capacity of the rechargeable battery located within handpiece assembly 15. When on/off switch 40 is depressed and the battery energy capacity level is determined to be sufficient for a tissue cutting and capture procedure, a visually accessible on/off and "Ready" indicator light 42 distal to on/off switch 40 on handpiece assembly 15 is illuminated. By way of example, on/off and "Ready" indicator light 42 may be a yellow light emitting diode (LED). If the energy capacity of the rechargeable battery within handpiece assembly 15 is insufficient to perform a tissue cutting and capture procedure, then all three display lights will flash repeatedly until the on/off and initialization switch 40 is again depressed indicating that the recharging of the rechargeable battery within handpiece assembly 15 using handpiece battery charger 9 is required.

Upon illumination of the on/off and "Ready" indicator light 42 indicating sufficient energy stored in rechargeable battery within handpiece assembly 15, the operator may insert the distal end of delivery cannula into tissue of patient's body aided by blade 31 and advance to confronting adjacency to target tissue volume aided, for example, by ultrasound, stereotactic radiography or computer-based robotic guidance methods. Once in confronting adjacency with respect to the target tissue volume, the start tissue incision and capture switch 39 is momentarily depressed. Upon depressing the start tissue incision and capture switch 39, a visually accessible capturing indicator light 46, located distal to the start tissue incision and capture switch 39, on handpiece assembly 15 is singularly illuminated. By way of example, capturing indicator light 46 may be a green light emitting diode (LED). In addition to a visually accessible capturing indicator light 46, an audible cue may be generated within the handpiece assembly 15 that continues throughout the period of tissue incision and capture procedure.

Upon completion of the tissue incision and capture procedure as determined by the controller within the handpiece assembly 15, based on the measured electrical resistance of that portion of the heatable cutting and pursing cable conducting the applied constant current, the capture complete indicator light 52 is singularly illuminated, the applied constant current and the applied voltage to the motor-actuated drive tube drive member translation assembly is suspended and the optional audible cue is suspended. At the completion of the tissue incision and capture procedure, the operator withdraws the distal end portion of delivery cannula 22 from the patient, which includes the captured and substantially spherical tissue volume.

Figure 2:
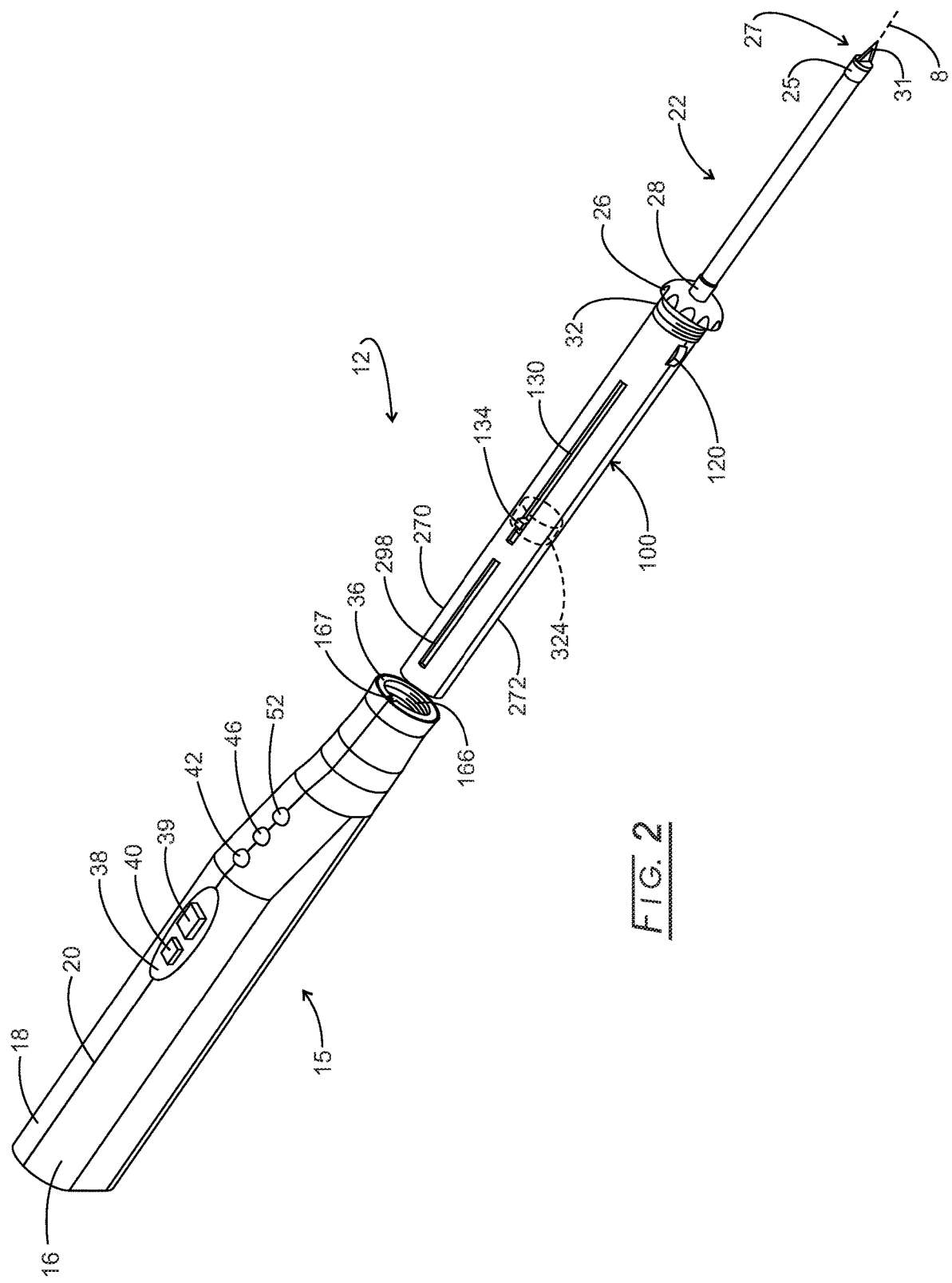
FIG. 2 is a perspective view of several components of the system shown in FIG. 1 with a single-use tissue incision and retrieval assembly being shown removed from a reusable handpiece.

Referring to FIGS. 1 and 2, the single-use tissue incision and retrieval assembly 12 inserted in handpiece assembly 15 is indicated generally at 10. Referring to FIG. 2, single-use tissue incision and retrieval assembly 12 is revealed in an orientation prior to insertion within the reusable housing assembly 15. As seen in FIG. 2, delivery cannula 22 is seen extending forwardly from a cylindrically shaped single-use support housing 100. The forward region of support housing 100 supports locking nut 26. In this regard, it may be observed that locking nut 26 is configured with an external groove and keyway slot that engages with and is secured by distal end of reusable handpiece 15 (not shown in FIG. 2 but seen in FIG. 3).

In the specifications that follow, the electrical current flow path 399 corresponding to the flow of a constant and unvarying current level is designated with distinct letter suffixes to facilitate the narrative description of the constant current flow paths in distinct regions of the handpiece assembly 15 and single-use support housing 100. By way of example, fifth and seventh electrical current flow paths $399x$ and $399z$ refer to the constant current that flows through leads 187 and 189 in handpiece assembly 15 seen in FIG. 3. As the constant current flows within various regions of the single-use support housing 100, the suffix for electrical current flow path 399 will be a distinct and unique letter for each sequential region of the flow of constant current and consistent with the figures and labels thereon. The same constant current level (e.g., 2.00 amps at frequency of 100 kHz) flows in all electrical current flow paths according to the following the series sequence that begins and ends at the constant current source 247. As seen in FIGS. 3, 9, 17, 18 and 18A, the series sequence of electrical current flow paths is 399$x$, 399$w$, 399$a$, 399$b$, 399$c$, 399$y$ and 399$z$, through which a pre-selected constant current flows. The resistively heated portions of the cutting and pursing cables 89-94 comprise high electrical resistance paths (e.g., ranging from about 2 to 3 ohms/cm depending on cable size) corresponding to first, second and third electrical current flow paths 399$a$, 399$b$ and 399$c$, respectively. The fourth, fifth, sixth and seventh electrical current flow paths 399$w$, 399$x$, 399$y$ and 399$z$, respectively, comprise about a thousand-fold lower electrical resistance paths (e.g., copper and silver wires whose electrical resistance ranges from about 0.001 to 0.003 ohms/cm depending on wire size).

Figure 11:
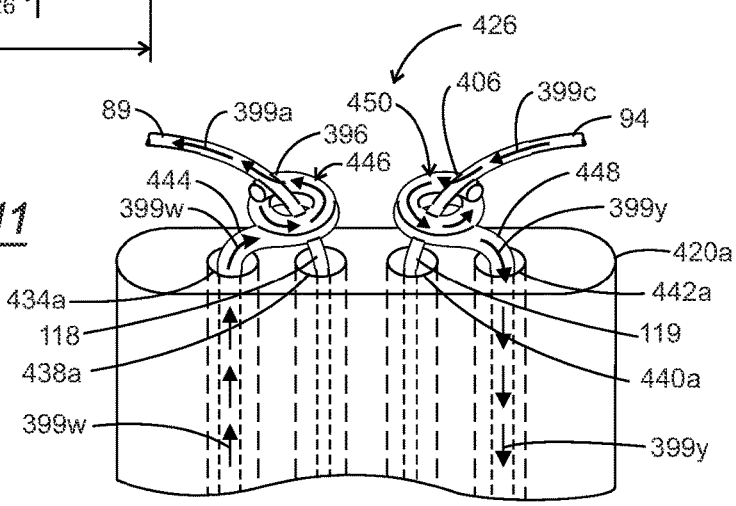
FIG. 11 is a perspective view of the distal end of a first multi-lumen polymeric extrusion, eyelets as well as cutting and pursing cable segments shown in FIG. 9.

Referring now to FIGS. 2, 3, 11 and 17, positioned at the proximal end of support housing 100 are two spaced apart first and second electrical contacts 120 and 122 (seen in FIG. 8) which are oriented to make contact with corresponding first and second electrical terminals 186 and 188 disposed within reusable handpiece 15 upon insertion of single-use support housing 100 within the receiving cavity 166 (seen also in sectional view in FIG. 5). First and second electrical contacts 120 and 122 serve as two electrical poles or electrodes that selectively receive constant current flowing along fourth and sixth electrical current flow paths 399$w$ and 399$y$, the applied constant current preferably being an alternating current having a frequency in the range from 100 kHz to 300 kHz. The constant current is conducted through first and second electrically and thermally conductive leads 444 and 448 to first and second electrically and thermally conductive eyelets 446 and 450, respectively. Sliding electrical contact between [a] first and sixth tensionable portions of cutting and pursing cables 118 and 119 and [b] first and second electrically and thermally conductive eyelets 446 and 450, respectively, conducts the constant current into resistively heated portions of the cutting and pursing cables 89 and 94, respectively, beginning at first and second transition boundaries 396 and 406, respectively, as seen in FIG. 11.

Turning now to FIGS. 4 and 19, the first and sixth tensionable portions of cutting and pursing cables 118 and 119 along with the second and third tensionable portions of cutting and pursing cables 19 and 23 and the fourth and fifth tensionable portions of cutting and pursing cables 29 and 30 extend rearwardly and are secured to cable mounting hub 296 (seen in phantom in FIG. 8) by electrically insulative sleeves 284 and 286, as described in greater detail below.

Referring to FIGS. 4, 6 and 6A, the tensionable portions of cutting and pursing cables 118, 119, 19, 23, 29 and 30 extend rearwardly to cable mounting hub 296 having a protruding stabilizing ear 297 that slideably translates within first elongate stabilization slot 298 arranged in parallel with axis 8.

Referring now to FIGS. 4 and 8, second elongate stabilization slot 130 is found on the same side of the upper half of single-use casing 270 that forms support housing 100. The second elongate stabilization slot 130 is similarly arranged in parallel with axis 8. An outwardly extending drive block advancement ear 134 protrudes from drive assembly drive member 324 through second elongate stabilizer slot 130. The drive block advancement ear 134 is engaged by rearwardly disposed drive finger 185 supported by translation nut 182 as seen in FIG. 4. The driven surface of drive block advancement ear 134 is used to impart forward movement to drive assembly drive member 324 functioning, in turn, to deploy the leaf member and multi-lumen polymeric extrusion assembly 400 from delivery cannula 22 as seen in FIG. 21.

Referring now to FIGS. 2 and 4, when the support housing 100 of single-use tissue incision and retrieval assembly 12 is inserted into the receiving cavity 166 of reusable handpiece assembly 15, drive block advancement ear 134 passes through oppositely disposed alignment key notch 167 in threaded insert 36 and continues along third elongate slot 35 in handpiece assembly 15. The axis of the receiving cavity 166 is coincident with longitudinal axis 8. The figure also reveals that the axis of cannula 22 is coincident with longitudinal axis 8.

Figure 3:
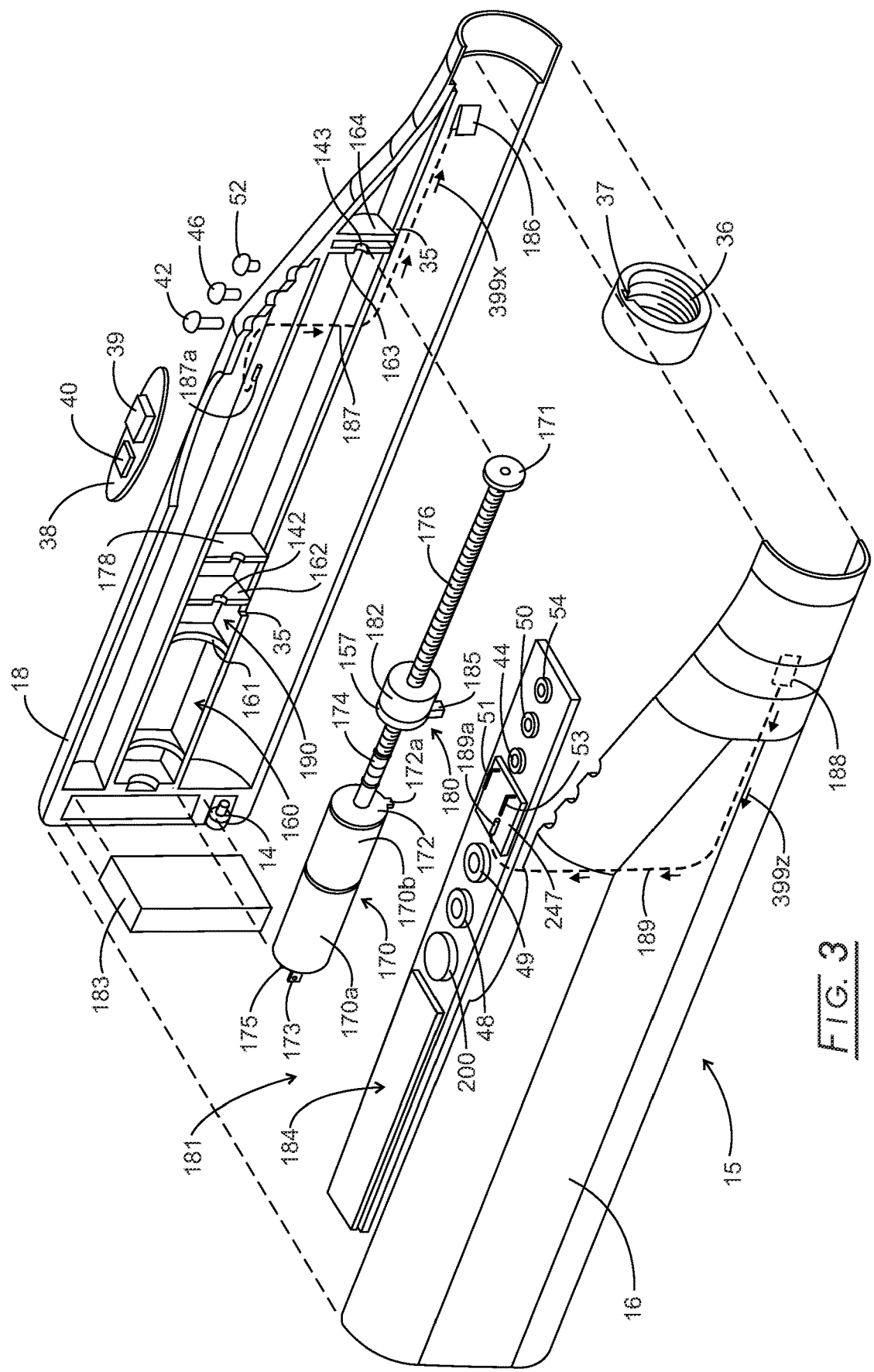
FIG. 3 is an exploded view of the reusable handpiece shown in FIGS. 1 and 2.

Referring to FIG. 3, the assembly of the reusable components of the tissue incision and retrieval system 10 is revealed in exploded fashion. As seen in FIG. 3, the exterior surface of housing right side 16 of reusable handpiece 15 is revealed and the corresponding interior of housing left side 18 is revealed. These two sides are symmetrical and contain the usable components described in greater detail below. The housing right side 16 and housing left side 18 are formed with one half of motor and planetary gear train assembly 170 mount chambers as shown at 160 and 190 in connection with housing left side 18. Positioned just forwardly of the chamber 160 are first and second bulkheads 161 and 162, respectively. The bulkhead 162 defining first circular openings 142 to support the proximal end of rotatable lead screw 176. Third bulkhead 163 defines second circular opening 143, supporting the distal end of rotatable lead screw 176. A forward regions of housing right side 16 and housing left side 18 in the space between the third bulkhead 163 and fourth 164 are each configured with an opening to contain thrust bearing 171 as represented in connection with housing left side 18.

Still referring to FIG. 3, positioned within motor mount chamber 160 is motor and planetary gear assembly represented generally at 170, which incorporates motor component 170$a$ in combination with planetary gear assembly 170$b$. The motor and planetary gear assembly 170 is relatively securely positioned within chamber 160 to the extent that it has limited freedom of rotational movement except for the axial drive pin at the distal end of planetary gear assembly 170$b$ (not shown). In this regard, a torque stop component 172 prohibiting overall motor assembly rotation is coupled to the forward or output end of motor and planetary gear assembly 170.

Referring to FIGS. 3 and 4, the mechanical output from motor and planetary gear assembly 170 is connected through metallic flexible bellows-shaped coupler 174 extending between second bulkhead 162 and fifth bulkhead 178 to connection with lead screw 176 implemented with the threaded elongate rod of a translation nut mechanism arranged in parallel with the longitudinal axis 8 of the tissue incision and retrieval assembly 12. The metallic flexible bellows-shaped coupler bellows 174 provides a torsionally rigid, but axially flexible coupling that reduces the vagaries of elongate mechanical-rotational force transmission. By way of example, bellows coupler as at 174 is marketed under a model designation SC-3 by Servometer Corp. of Cedar Grove, N.J. Alternatively, other flexible coupling components may be used for this purpose including a helical beam coupler marketed by Helical Products Company, Santa Maria, California. By way of example, lead screw as at 176 is marketed under the designation term "lead" by Thomson Linear of Radford, Virginia.

Still referring to FIG. 3, rotatably driven from motor and planetary gear assembly 170 through bellows-shaped coupler 174, the distal end of lead screw 176 is supported and rotatable within thrust bearing 171 located between bulkheads 163 and 164. With this arrangement, a freedom of rotational movement is provided for the entire assembly proximal to second circular opening 143 including bellows-shaped coupler 174 and lead screw 176 permitting the motor and planetary gear assembly 170 to be mounted in self aligning confinement within the motor mount chamber housing 160. Thus, binding or like phenomena are avoided in connection with the motor drive actuator system. The lead screw 176 is threadably engaged with a motor-actuated cable mounting hub translation assembly represented generally at 180 which comprises a translation nut 182 and a drive finger 185 which is configured to extend to a position spaced from but aligned for driven engagement with the drive block advancement ear 134 (as seen in FIGS. 2 and 4) when the support housing 100 is initially inserted in the receiving cavity 166. By way of example, translation nut component as at 182 is marketed under the designation translation nut, ball nut and Supernut by Thomson Linear of Radford, Virginia.

Still referring to FIG. 3, constant current source 247 is integrated within circuit board assembly 184 with first and second leads 187 and 189 extending between [a] first and second constant current source connector pins 51 and 53, respectively and [b] first and second electrical terminals 186 and 188, respectively. First and second electrical terminals 186 and 188 are mounted on the interior surface of housing left side 18 and housing right side 16, respectively, at the distal or forward end of receiving cavity 166 and may, by way of example, be retained in place by an adhesive. The first and second electrical terminals 186 and 188 supply constant current to the mating contact surfaces of corresponding first and second electrical contacts 120 and 122, respectively, located on the single-use support housing 100 (as seen in FIG. 8).

Still referring to FIG. 3, internal energy source and control system 181 is contained within handpiece assembly 15 and includes, by way of example, rechargeable battery 183 and circuit board assembly 184. By way of example, the circuit board assembly 184 comprises [a] microprocessor and programmed logic to control tissue incision and capture functions performed by handpiece assembly 15 (not shown), [b] constant current source 247, [c] constant voltage source (not shown) for energizing motor 170a, [d] first switch sensor 48, [e] second switch sensor 49, [f] first light emitting diode 44, [g] second light emitting diode 50, [h] third light emitting diode 54, [i] first constant current source connector pin 51 and [j] second constant current source connector pin 53. The constant current source 247 supplies constant current to first through sixth resistively heated portions of the cutting and pursing cables 89-94, respectively, as described in greater detail in the specification that follows. Circuit board assembly 184 includes circuitry and logic to respond to first and second sensor switches 48 and 49, circuitry and logic to control illumination of light emitting diodes 44, 50, 54 and circuitry as well as logic to control the start of advancement as well as the termination of advancement of the leaf member and multi-lumen polymeric extrusion assembly 400 (as seen in FIG. 21) during the process of tissue incision and capture. Rechargeable battery 183 provides source of DC voltage and current to the constant current source 247 incorporated in circuit board assembly 184. The rechargeable battery 183 is recharged by attaching an external source of DC power to charging receptacle 14 shown, by way of example, at the proximal end of handpiece assembly 15. Off/on and initialization switch 40 and start tissue incision and capture switch 39 mounted on waterproof switch housing 38 activate first and second sensor switches 48 and 49, respectively, when manually depressed by the operator. Advantageously, all penetrations through the left and right housing sides 16 and 18 including waterproof switch housing 38, light emitting diodes 44, 50, 54 and charging receptacle 14 as well as the joining together of the left and right housing sides 16 and 18 are assembled with water-tight seals. During cleaning and disinfecting operations performed between uses of the reusable handpiece assembly 15, the temporary placement of sealing cap 155 in combination with O-ring 156 (as seen in FIG. 4A) form a water-tight seal at the distal end of handpiece assembly 15.

Referring to FIG. 4, a sectional view is presented illustrating the operative association of the motor drive features with the single-use support housing 100 contained components. As seen in FIGS. 3 and 4, motor and planetary gear assembly 170 is seen to be located within motor mount chamber 160. As noted above, within motor mount chamber 160, motor and planetary gear assembly 170 is permitted some self-aligning movement but is restrained from rotational movement by torque stop component 172. The output from the planetary gear assembly 170b is coupled to the driven input side of bellows-shaped coupler 174 which is seen to extend through coupler cavity 190 defined by oppositely disposed and spaced apart second bulkhead 162. The elongate threaded lead screw 176 is seen extending from first circular opening 142 in second bulkhead 162. Second bulkhead 162 and associated first circular opening 142 provide support against all of the driving forces imposed from the motor and planetary gear assembly 170 as it drives the translation nut 182 along the length of the lead screw 176. The figure reveals that the drive finger 185 engages the drive block advancement ear 134 to urge drive assembly drive member 324 forwardly. As drive assembly drive member 324 is driven forwardly, the drive tube 325 attached to drive assembly drive member 324 is likewise driven forwardly. A seen in FIGS. 4 and 20, the drive tube 325 is attached to leaf member and extrusion assembly support member 347, thereby driving the leaf member and extrusion assembly support member 347 forwardly as drive assembly drive member 324 is driven forwardly by motor-driven drive finger 185.

Returning momentarily to FIG. 2, some details of the forward region 27 of delivery cannula 22 are also revealed. The forward region 27 is depicted as it is utilized for the incision and capture of tissue volumes, for example, encompassed within a diametric extent of about 30 mm. The tip incorporates a surgically sharp blade 31 positioned with the blade tip coincident with longitudinal axis 8.

Referring to FIGS. 3, 4 and 5, the actuator and transfer assemblies, which are mounted within the reusable handpiece 15 are more clearly depicted wherein motor and planetary gear assembly 170 is seen to be comprised of a D.C. motor 170a having, by way of example, a 3.2 watt assigned power rating marketed under the catalog designation 118686 by Maxon Precision Motors Inc., of Burlingame, California. This motor 170a is combined with a planetary gear 170b exhibiting, by way of example, a 29:1 gear reduction ratio and marketed under the catalog designation 118185 by Maxon Precision Motors Inc. (supra). The output drive shaft of the planetary gear 170b is shown at 232 and is seen to extend through the torque stop component 172. Torque stop component 172 is bolted to the forward casing of planetary gear 170b and is configured with a rectangular tab portion 172a that engages a torque stop slot (not shown) within reusable handpiece 15. Motor assembly output drive shaft 232 is fixed by a setscrew into driving relationship with one end of the bellows-shaped coupler 174. The opposite end of bellows-shaped coupler 174 is connected to the proximal circular necked-down shaft of lead screw 176. Fixed connection with lead screw 176 is provided by another setscrew extending within bellows-shaped coupler 174. The distal end of the lead screw 176 is a distal circular necked-down shaft portion 244 that passes through circular opening 143 in third bulkhead 163 and is supported by thrust bearing 171 and rotatable therein.

As seen in FIGS. 3 and 4, the motor-activated drive finger 185 extends upwardly such that it engages the drive block advancement ear 134 extending outwardly from drive assembly drive member 324. By way of example, translation nut 182 may be configured with a threaded portion to provide for secure attachment to support member 157 with integral drive finger 185. When support member 157 and associated translation nut component 182 are seated against surface of drive finger back stop 158, the translation nut component 182 is considered to be in its "home" position, i.e., the most fully proximal position where it may, for example, accept the next new single-use tissue incision and retrieval assembly 12, as described in greater detail below.

Still referring to FIGS. 3 and 4, the motor-activated drive tube member translation assembly 180, which is mounted within the reusable handpiece 15 is more clearly depicted wherein motor and planetary gear assembly 170 is seen to be comprised of a D.C. motor 170a having, by way of example, a 3.2 watt assigned power rating marketed under the catalog designation 118686 by Maxon Precision Motors Inc., of Burlingame, Calif. This motor 170a is combined with a planetary gear 170b exhibiting, by way of example, a 29:1 reduction and marketed under the catalog designation 118185 by Maxon Precision Motors Inc. (supra). Motor assembly output drive shaft 232 is fixed by a setscrew into driving relationship with one end of flexible metallic bellows-shaped coupler 174. The opposite end of metallic flexible bellows-shaped coupler 174 is connected to the proximal circular necked-down shaft portion of lead screw 176. Fixed connection with second lead screw 176 is provided by another set screw extending within flexible metallic bellows-shaped coupler 174. The distal end of lead screw 176 includes a distal circular necked-down shaft portion 244 and is supported by thrust bearing 171 contained in the space between the third bulkhead 163 and fourth bulkhead 164 and is rotatable therein. Translation nut 182 (e.g., Model No. SN6×1M SuperNut supplied by Thomson located in Radford, Virginia) of motor-actuated drive tube drive member translation assembly 180 is shown threadingly engaged with lead screw 176.

A cross-sectional view of the reusable handpiece 15 and single-use support housing 100 are seen in FIGS. 2, 4 and 5. In this cross sectional view, reusable handpiece 15 includes housing left side 16, housing right side 18. Drive finger 185 is seen in the upper portion of FIG. 5, whose distal driving surface is seen positioned behind drive block advancement ears 134. As seen in FIGS. 3, 4 and 5, as motor and planetary gear assembly 170 of motor-actuated drive tube drive member translation assembly 180 causes drive finger 185 to advance toward front of single-use support housing 100, distal driving surface of drive finger 185 will urge drive assembly drive member 324 forward toward the distal end of single-use support housing 100 and, in turn, cause deployment of leaf member and multi-lumen polymeric extrusion assembly 400 within single-use tissue incision and retrieval assembly seen in FIGS. 2 and 4 as described in greater detail in the specification that follows.

Referring now to FIGS. 1, 3, 4 and 5, circuit board assembly 184 enables all of the functions otherwise provided by an external control assembly as seen in FIG. 1 of U.S. Pat. No. 6,471,659, incorporated herein by reference. The circuit board 184 comprises electronic components and circuits that provide [a] source of constant current (e.g., at frequency of 100 kHz) to first, second, third, fourth, fifth and sixth resistively heated portions of cutting and pursing cable 89, 90, 91, 92, 93 and 94 (seen in FIG. 9), respectively, during tissue cutting process, [b] source of constant DC voltage to motor 170a to control motor speed, [c] machine instructions to control timing and level of applied constant current and constant voltage in response to on/off and initialization switch 40 and operator actuated start tissue incision and capture switch 39 located on handpiece assembly 15 and [d] machine instructions to control illumination of display components on handpiece assembly 15 including "Ready" indicator light 42, "Capturing" indicator light 46 and "Capture Complete" indicator light 52.

In a preferred embodiment and referring to FIGS. 3 and 4, rechargeable battery 183 provides the source of electrical power for circuit board 184 to enable all of the powering, display and operator control functions previously provided by the external control assembly in prior art apparatus and systems. Therefore, all of the operator actuation functions, visual cues, audible cues (e.g., the audible cue generated by speaker 200), constant current source, constant voltage source and displays previously incorporated in prior art apparatus and systems, as seen in FIG. 1 of U.S. Pat. No. 6,471,659, are all incorporated within handpiece assembly 15 seen in FIGS. 3 and 4. The preferred embodiment seen in FIGS. 3 and 4 eliminates the need for the costly external control assembly required in prior art apparatus and systems as well as eliminates the need for a connecting multi-lead cable, thereby enabling greater maneuverability of the handpiece assembly 15 by the operator during a surgical procedure. In addition, eliminating the need for a connecting multi-lead cable between the handpiece assembly 15 and an external control assembly, as seen in FIG. 1 of U.S. Pat. No. 6,471,659, enables and facilitates the complete enclosure of handpiece assembly 15 within a commercially available single-use, thin, transparent and flexible sterile sheath 109 as seen in FIG. 1B so that procedures can be performed within the sterile field of an operating room. By way of example and referring to FIG. 1B, distal end of sterile sheath 109 includes an end plate 108 (e.g., circular cardboard disc) with hole 107 to allow passage of delivery cannula 22 and adhesive seal member at proximal end to assure disinfected but non-sterile handpiece assembly 15 remains fully enclosed in sterile sheath 109 during use in the sterile field of the operating room. The sterile sheath 109 that envelops handpiece assembly 15, as seen in FIG. 1B, is commercially available from Protek Medical Products, Inc. in Coralville, Iowa.

Figure 9:
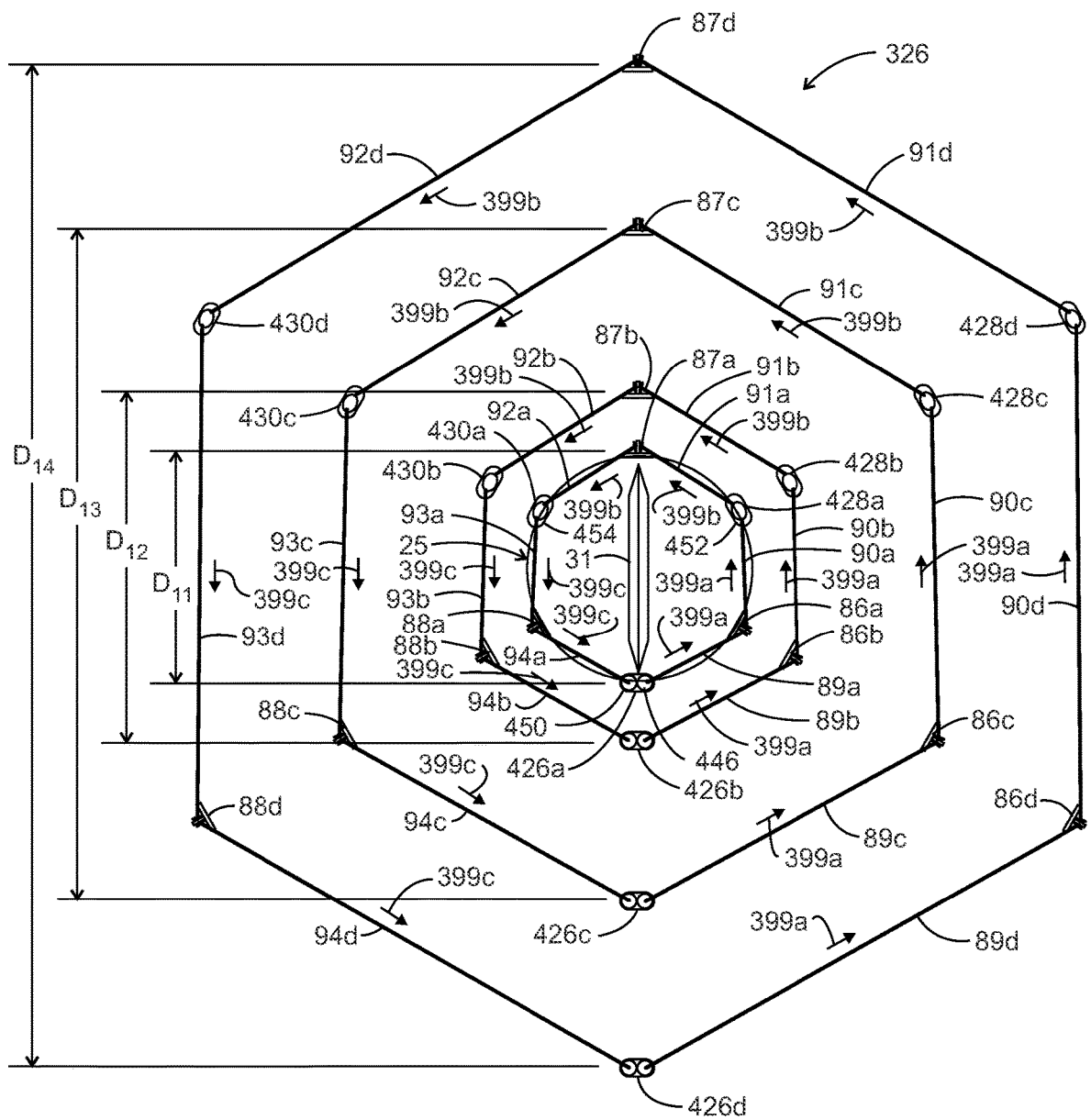
FIG. 9 is a front-end view of the single-use tissue incision and retrieval assembly seen in FIG. 2 at various stages of deployment of leaf members, multi-lumen polymeric extrusion assemblies and cutting and pursing cables.

Referring to FIGS. 1, 2, 3 and 4, during operation of the tissue incision and retrieval assembly 12, the lead screw 176 is rotated by motor and planetary gear train assembly 170 to drive the motor-actuated drive tube drive member translation assembly 180 forwardly to affect a motorized driving of the tissue cutting and capture assembly 329 (not shown) of the tissue incision and retrieval system 10. The forward advancement of the tissue cutting and capture assembly 329 (not shown) is induced by the forward advancement of drive assembly drive member 324 by drive finger 185 of motor-activated drive tube drive assembly translation assembly 180. The advancement of drive assembly drive member 324 induces the corresponding advancement of the leaf member and extrusion assembly support member 347 as a result of the rigid drive tube 325 positioned there between as seen in FIGS. 4, 20 and 21. The advancement of the leaf member and extrusion assembly support member 347, in turn, advances first, second and third leaf members 86, 87 and 88, respectively and first, second and third multi-lumen polymeric extrusion assemblies, 426, 428 and 430, respectively. The motor and planetary gear assembly 170 drives the motor-actuated drive tube drive member translation assembly 180 forwardly, while continuously applying a predetermined level of constant current to the resistively heated portions of cutting and pursing cables 89-94 as seen in FIG. 9. During the application of constant current to the resistively heated portions of cutting and pursing cables 89-94, the combined electrical resistance of all six resistively heated portions of cutting and pursing cables 89-94 is continuously measured in circuitry within the circuit board assembly 184. When the combined electrical resistance of all six resistively heated portions of cutting and pursing cables 89-94 decreases below a predetermined level (e.g., 2.0 ohms), then the circuitry within the circuit board assembly 184 determines that the pursing down of the distal ends of first, second and third leaf members 86, 87 and 88, respectively and first, second and third multi-lumen polymeric extrusion members 426, 428 and 430, respectively, (see FIG. 21) has been completed also known as the "Capture Complete" state. Once the "Capture Complete" state is reached, the applied constant current and applied constant voltage is suspended and the "Capture Complete" indicator light 52 is illuminated.

Figure 22:
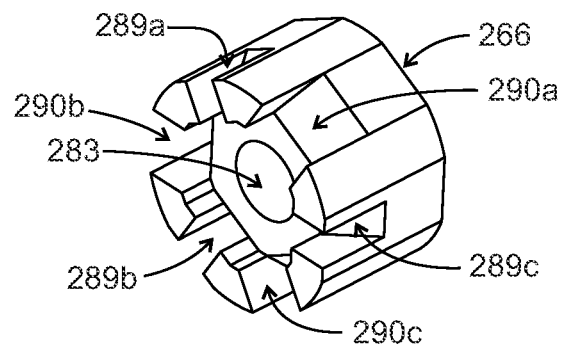
FIG. 22 is a perspective view of the tip component of the single-use tissue cutting and capture assembly seen in FIG. 12.
Figure 23:
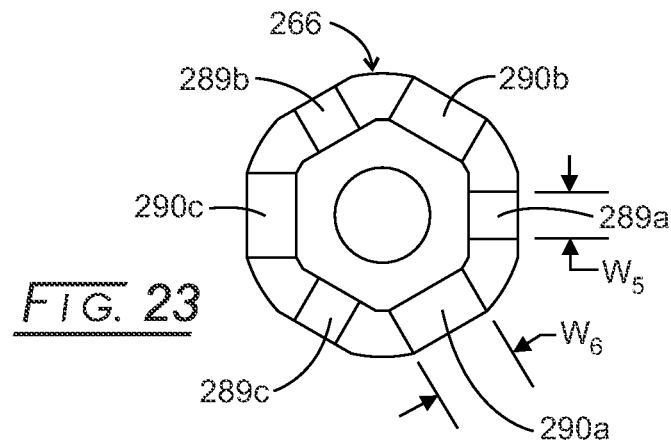
FIG. 23 is a bottom view of the tip component of the single-use tissue cutting and capture assembly seen in FIG. 12.

The single-use tissue incision and retrieval assembly 12 with single-use support housing 100 and delivery cannula 22 is illustrated in detail in connection with FIGS. 1A, 2, 4, 6, 8 and 21. Single-use support housing 100 is formed of two molded housing halves, which are joined together, additionally interconnected with the delivery cannula 22 and threaded locking 26. The embodiment of these figures shows cannula distal end assembly 25 at distal tip of forward region of cannula 27 of the delivery cannula 22 that incorporates tip component 266 (seen in FIG. 22), blade support 230 and blade 31. As seen in FIGS. 22 and 23, tip component 266 provides three deployment ramps for leaf members 289a-289c and three ramp members for the wider multi-lumen polymeric extrusion members 290a-290c. The deployment ramps affect the angle of deployment of first, second and third leaf members 86, 87 and 88, respectively and first, second and third multi-lumen polymeric extrusion members 426, 428 and 430, respectively. A surgically sharp cutting blade 31 is shown in these figures in the manner as described in connection with FIGS. 1A and 2.

Referring to FIG. 5, a sectional view of the support housing 100 is revealed showing its formation from two single-use casings, an upper half 270 and a lower half 272 that are preferably joined together by the application of adhesive (e.g., cyanoacrylate) along the joint line 21 of single-use housing 100. Note that single-use casings 270 and 272 are securely attached to delivery cannula 22 at their forward portions by the application of adhesive (e.g., cyanoacrylate). Cannula 22 is seen to be a hollow tube. As seen in FIGS. 2 and 8 at the opposite sides of upper half of casing 270 and lower half of casing 272, first and second electrical contacts 120 and 122 are positioned near the distal end of single-use support housing 100. By way of example, upper half of casing 270 and lower half of casing 272 may be injection molded using an electrically insulative plastic such as widely available injection moldable polycarbonate resin materials.

Referring now to FIGS. 4, 6, 8 and 20, extending from a rearward bulkhead represented generally at 280 and defined by molded components of support housing 100 single-use casings 270 and 272, there is provided an elongate support tube 282. By way of example, support tube 282 is formed of stainless steel (e.g., stainless steel Type 304 tubing available from Micro Group, Inc., Medway, Massachusetts) and is anchored at the rearward side of rearward bulkhead 280 by threaded rod 177 adhesively and/or mechanically locked into position on support tube 282. The support tube is secured at rearward side of rearward bulkhead 280 by support tube tensioning nut 63 engaged with threaded rod 177 as seen in FIG. 6. Support tube 282 extends symmetrically along longitudinal axis 8 for engagement with cannula distal end assembly 25 at forward end of cannula 27.

Referring to FIGS. 4 and 6, two of the six tensionable portions of the cutting and pursing cables are shown in a cross-sectional view of support housing 100. In the cross-sectional views seen in FIGS. 4 and 6, the proximal ends of first tensionable portion of cutting and pursing cable 118 and fifth tensionable portion of cutting and pursing cable 29 are secured to an electrically insulative cable mounting hub 296 with electrically insulative sleeves 284 and 286. A stabilizing ear 297 extends from the body of the cable mounting hub 296 that slides in first elongate stabilizing slot 298 and prevents unwanted rotation of freely sliding cable mounting hub 296 during transport, handling and use of tissue incision and retrieval assembly 12. By way of example, cable mounting hub 296 with integral stabilizing ear 297 may be an injection molded, electrically insulative plastic using widely available injection moldable polycarbonate resin materials.

The cable mounting hub 296 is seen in greater detail in perspective view shown in FIG. 19 wherein first, second, third, fourth, fifth and sixth tensionable portions of cutting and pursing cables 118, 19, 23, 29, 30 and 119, respectively, are secured to electrically insulative cable mounting hub 296 by first and second electrically insulative sleeves, 284 and 286, respectively. In the preferred embodiment seen in FIG. 19, the first, second, third, fourth, fifth and sixth tensionable portions of cutting and pursing cables 118, 19, 23, 29, 30 and 119, respectively, pass through first, second, third, fourth, fifth and sixth holes 470-475, respectively.

Figure 25:
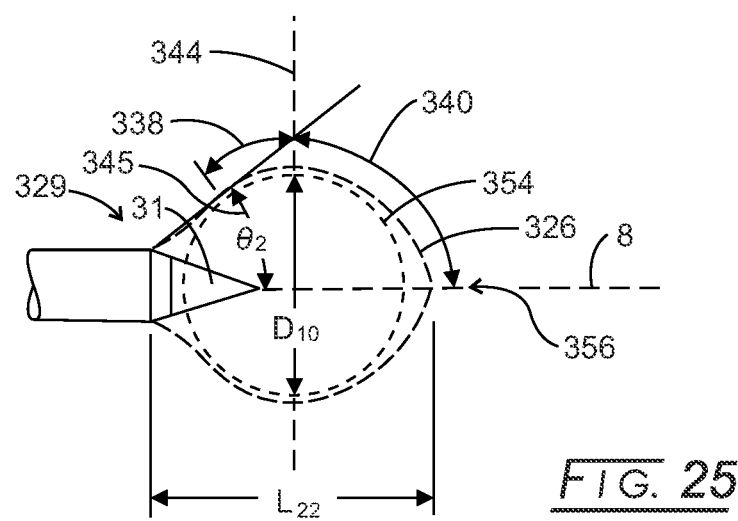
FIG. 25 is a sectional view of the profile of the tissue capture basket with the use of first and second compression springs positioned between the cable mounting hub and the cable mounting hub stop.

Referring now to FIGS. 4. 6, 9, 19 and 21, the cable mounting hub 296 slides forwardly corresponding to the forward advancement of first, second and third leaf members 86, 87 and 88, respectively as well as first, second and third multi-lumen polymeric extrusion assemblies 426, 428 and 430, respectively, since the first through sixth tensionable portions of cutting and pursing cables 118, 19, 23, 29, 30 and 119, respectively, are secured at the cable mounting hub 296 and first through sixth resistively heated portion of cutting and pursing cables, 89-94, respectively, are secured (e.g., knotted) at eyelets 327a-327c. In this arrangement, the cable mounting hub 296 continues to advance forward as the leaf members and polymeric extrusions advance forward until the cable mounting hub 296 abuts cable mounting hub stop 70. In a preferred embodiment, a first compression spring 56 and second compression spring 58 are combined with separating washer 60 as seen in FIGS. 4 and 6. The purpose of compression springs 56 and 58 is to control the rate of pursing down of the distal ends of the tissue capture basket 326. In the first phase of pursing down as the first, second and third leaf members 86, 87 and 88, respectively as well as first, second and third multi-lumen polymeric extrusion assemblies 426, 428 and 430, respectively, approach the maximum opening of the tissue capture basket 326, a first compression spring 56 having a lower spring force constant, $K_1$ causes the leaf members to follow path of tissue cutting and pursing cable 338, as seen in FIG. 25. During the first phase of pursing down of the tissue capture basket 326, first compression spring 56 becomes fully compressed and reaches its solid height or length (i.e., there are no gaps between the coils within first compression spring 56). In the second phase of pursing down as the first, second and third leaf members 86, 87 and 88, respectively as well as first, second and third multi-lumen polymeric extrusion assemblies 426, 428 and 430, respectively, have reached the maximum opening of the tissue capture basket 326, a second compression spring 58 having a greater spring force constant, $K_2$ causes the leaf members to follow path of tissue cutting and pursing cable 340, as seen in FIG. 25. For example, by selecting the preferred length of first compression spring, $LS_1$ and second compression spring, $LS_2$ as well as the preferred spring force constants, $K_1$ and K2, respectively, a fixed-position cable mounting hub stop 70 enables a controlled rate of pursing down of the tissue capture basket to provide a substantially spherical shape of the incised and captured target tissue volume as seen in FIG. 25.

In order to more fully understand the apparatus structure and method of operation, the construction and function of the six cutting and pursing cables are now described in greater detail. A first functional region is that portion of the cutting and pursing cable that is proximal to each electrically and thermally conductive eyelet located at the distal end of each multi-lumen polymeric extrusion assembly. This first functional region is referred to as the tensionable portion of the cutting and pursing cable. This second functional region is referred to as the resistively heated portion of cutting and pursing cable. The first functional region is that is that tensionable portion of the cutting and pursing cable that extends from the cable mounting hub up to an electrically and thermally conductive eyelet located at the distal end of each multi-lumen polymeric extrusion assembly. The second functional region is that resistively heated portion of cutting and pursing cable that is distal to the electrically and thermally conductive eyelets located at the distal end of each multi-lumen polymeric extrusion assembly. Each electrically and thermally conductive eyelet includes a region of sliding electrical contact between the electrically and thermally conductive eyelet and the cutting and pursing cable. The cutting and pursing cable functionally transitions from the tensionable portion to the resistively heated portion at the region of sliding electrical contact. As described in greater detail below, the applied constant current is electrically conducted only through the resistively heated portion of cutting and pursing cable. In addition, while the total length of the cutting and pursing cables remains fixed, the distribution of the total length of the cutting and pursing cables varies between the tensionable portions and resistively heated portions during the course of the tissue cutting and capture procedure.

Figure 11A:
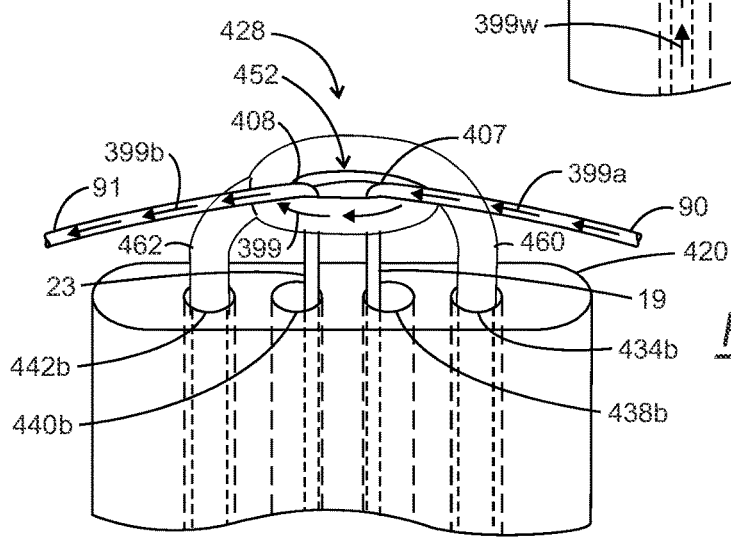
FIG. 11A is a perspective view of the distal end of a second multi-lumen polymeric extrusion, eyelets as well as cutting and pursing cable segments shown in FIG. 9.
Figure 11B:
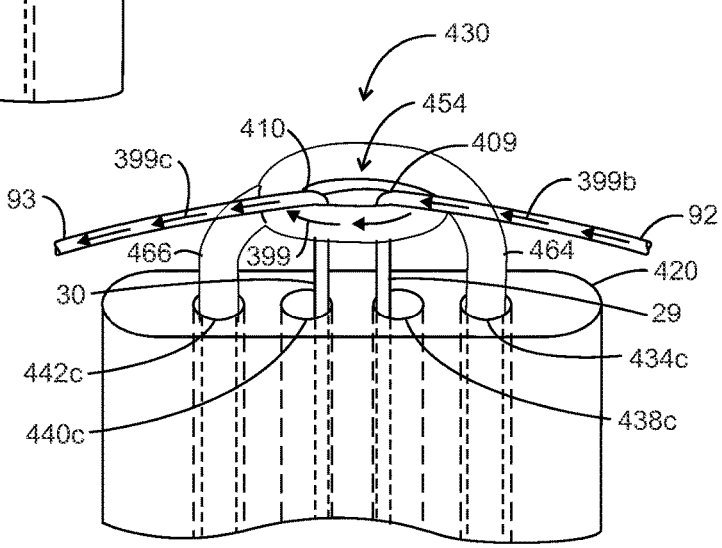
FIG. 11B is a perspective view of the distal end of a third multi-lumen polymeric extrusion, eyelets as well as cutting and pursing cable segments shown in FIG. 9.

By way of illustration, each of the six cutting and pursing cables are comprised of two distinct functional regions, a tensionable portion and a resistively heated portion. The tensionable portions of first through sixth cutting and pursing cables are represented by first through sixth tensionable portions of cutting and pursing cables 118, 19, 23, 29, 30 and 119, respectively, as seen in their distal ends in FIGS. 11, 11A, 11B and in their proximal ends in FIG. 19. The resistively heated portions of first through sixth cutting and pursing cables are represented by first through sixth resistively heated portions of cutting and pursing cables, 89-94, respectively, as seen in their proximal ends in FIGS. 11, 11A and 11B as well as their deployed length and distal ends in FIG. 9. As seen in in FIGS. 11, 11A and 11B, the demarcation or boundary between these two functional regions occurs at the first through fourth electrically and thermally conductive eyelets 446, 450, 452 and 454, respectively, located at the distal ends of the first through third multi-lumen polymeric extrusion assemblies 426, 428 and 430, respectively. As seen in FIG. 11, first and second electrically and thermally conductive eyelets 446 and 450 are located at the distal end of first multi-lumen polymeric extrusion assembly 426. As seen in FIG. 11A, third electrically and thermally conductive eyelets 452 is located at the distal end of second multi-lumen polymeric extrusion assembly 428. As seen in FIG. 11B, fourth electrically and thermally conductive eyelets 454 is located at the distal end of third multi-lumen polymeric extrusion assembly 430.

By way of example, the demarcation between the first and second functional regions of the six cutting and pursing cables at the distal ends of the first, second and third multi-lumen polymeric extrusion assemblies 426, 428 and 430, respectively, is seen in FIGS. 9, 11, 11A and 11B. Referring first to FIGS. 9 and 11, first tensionable portion of cutting and pursing cable 118 extends through and exits the distal end of second lumen 438a of first multi-lumen polymeric extrusion assembly 426 and passes through first electrically and thermally conductive eyelet 446. At the first transition boundary 396 at first electrically and thermally conductive eyelet 446, first tensionable portion of cutting and pursing cable 118 becomes first resistively heated portion of cutting and pursing cable, 89 extending distally from first electrically and thermally conductive eyelet 446.

Referring next to FIGS. 9 and 11A, second tensionable portion of cutting and pursing cable 19 extends through and exits the distal end of second lumen 438b of second multi-lumen polymeric extrusion assembly 428 and passes through third electrically and thermally conductive eyelet 452. At the third transition boundary 407 at third electrically and thermally conductive eyelet 452, second tensionable portion of cutting and pursing cable 19 becomes second resistively heated portion of cutting and pursing cable, 90 extending distally from first electrically and thermally conductive eyelet 452.

Still referring to FIGS. 9 and 11A, third tensionable portion of cutting and pursing cable 23 extends through and exits the distal end of third lumen 440b of second multi-lumen polymeric extrusion assembly 428 and passes through third electrically and thermally conductive eyelet 452. At the fourth transition boundary 408 at third electrically and thermally conductive eyelet 452, third tensionable portion of cutting and pursing cable 23 becomes third resistively heated portion of cutting and pursing cable, 91 extending distally from third electrically and thermally conductive eyelet 452.

Referring next to FIGS. 9 and 11B, fourth tensionable portion of cutting and pursing cable 29 extends through and exits the distal end of second lumen 438c of third multi-lumen polymeric extrusion assembly 430 and passes through fourth electrically and thermally conductive eyelet 454. At the fifth transition boundary 409 at fourth electrically and thermally conductive eyelet 454, fourth tensionable portion of cutting and pursing cable 29 becomes fourth resistively heated portion of cutting and pursing cable, 92 extending distally from fourth electrically and thermally conductive eyelet 454.

Still referring to FIGS. 9 and 11B, fifth tensionable portion of cutting and pursing cable 30 extends through and exits the distal end of third lumen 440c of third multi-lumen polymeric extrusion assembly 430 and passes through fourth electrically and thermally conductive eyelet 454. At the sixth transition boundary 410 at fourth electrically and thermally conductive eyelet 454, fifth tensionable portion of cutting and pursing cable 30 becomes fifth resistively heated portion of cutting and pursing cable, 93 extending distally from fourth electrically and thermally conductive eyelet 454.

Returning to FIGS. 9 and 11, sixth tensionable portion of cutting and pursing cable 119 extends through and exits the distal end of third lumen 440*a* of first multi-lumen polymeric extrusion assembly 426 and passes through second electrically and thermally conductive eyelet 450. At the second transition boundary 406 at second electrically and thermally conductive eyelet 450, sixth tensionable portion of cutting and pursing cable 119 becomes sixth resistively heated portion of cutting and pursing cable, 94 extending distally from second electrically and thermally conductive eyelet 450.

Referring now to FIGS. 3, 4, 9 and 11, a constant current is generated by a constant current source 247 located at circuit board assembly 184 and is supplied to first and second electrically and thermally conductive eyelets 446 and 450 by first and second electrically and thermally conductive leads 444 and 448, respectively. The electrical connections between constant current source 247 and the first and second electrically and thermally conductive eyelets 446 and 450 are subsequently described in greater detail in the specification that follows.

Referring to FIG. 9, the electrical current flow path 399 is seen as it sequentially progresses through first, second, third, fourth, fifth and sixth resistively heated portion of cutting and pursing cables 89-94, respectively. As seen in FIG. 11, the electrical current flow path 399*a* in first resistively heated portion of cutting and pursing cable 89 begins at first transition boundary 396 at first electrically and thermally conductive eyelet 446. The current flowing in first electrically and thermally conductive eyelet 446 arrives from first electrically and thermally conductive lead 444 and is designated electrical current flow path 399*w*. As seen in FIG. 9, first, second and third current flow paths 399*a*, 399*b* and 399*c*, respectively, proceed sequentially through first through sixth resistively heated portion of cutting and pursing cables 89-94, respectively. The first and third electrical current flow paths 399*a* and 399*c* continue through the first through sixth resistively heated portions of cutting and pursing cables 89 through 94, respectively, by providing electrically conductive paths between adjacent resistively heated portions of the cutting and pursing cables, as described in greater detail below. Returning to FIG. 11, the electrical current flow path 399*c* in sixth resistively heated portion of cutting and pursing cable 94 begins at first transition boundary 406 at second electrically and thermally conductive eyelet 450. The current flowing in second electrically and thermally conductive eyelet 450 arrives from second electrically and thermally conductive lead 448 and is designated electrical current flow path 399*y*.

A frontal view of the cannula distal end assembly 25 is illustrated in FIG. 9 and represents the distal ends of the first, second and third leaf members 86, 87 and 88, respectively and the distal ends of the first, second and third multi-lumen polymeric extrusion assemblies 426, 428 and 430, respectively, at four stages of deployment up to the position of maximum opening of the tissue capture basket 326 as also seen in cross-sectional view in FIG. 25. As seen in FIG. 9 at the initial stage prior to the start of deployment, current flow path 399*a* continues from the first electrically and thermally conductive eyelet 446 of first multi-lumen polymeric extrusion assembly 426*a* through first resistively heated portion of cutting and pursing cable 89*a* until it reaches first leaf member 86*a*. Once first resistively heated portion of cutting and pursing cable 89*a* reaches first leaf member 86*a*, it passes through eyelet 327*a* at distal end of first leaf member 86*a* as seen in FIG. 21 where a knot is preferably formed in cable to secure cable to eyelet 327*a*.

Still referring to FIG. 9 at the initial stage of deployment as well as FIGS. 11A and 21, current flow path 399*a* continues through eyelet 327*a* at distal end of leaf member 86*a* through second resistively heated portion of cutting and pursing cable 90*a* until it reaches third electrically and thermally conductive eyelet 452 of second multi-lumen polymeric extrusion assembly 428*a*. Sliding electrical contact between second resistively heated portion of cutting and pursing cable 90*a* and third electrically and thermally conductive eyelet 452 forms third transition boundary 407 between the second resistively heated portion of cutting and pursing cable 90*a* and second tensionable portion of cutting and pursing cable 19 as seen in FIG. 11A. As seen in FIGS. 11A and 21, current flow path 399 continues through third electrically and thermally conductive eyelet 452 located at the distal end of second multi-lumen polymeric extrusion assembly 428*a* and into third resistively heated portion of cutting and pursing cable 91*a*. The third resistively heated portion of cutting and pursing cable 91*a* forms a sliding electrical contact with third electrically and thermally conductive eyelet 452 and second electrical current path 399*b* begins at the fourth transition boundary 408.

As seen in FIGS. 9, 11A and 21 at the initial stage of deployment, second current flow path 399*b* continues from the third electrically and thermally conductive eyelet 452 located at the distal end of second multi-lumen polymeric extrusion assembly 428*a* through third resistively heated portion of cutting and pursing cable 91*a* until it reaches second leaf member 87*a*. Once third resistively heated portion of cutting and pursing cable 91*a* reaches second leaf member 87*a*, it passes through eyelet 327*b* at distal end of second leaf member 87*a* as seen in FIG. 21 where a knot is preferably formed in cable to secure cable to eyelet 327*b*.

Still referring to FIG. 9 at the initial stage of deployment as well as FIGS. 11B and 21, current flow path 399*b* continues from eyelet 327*b* at distal end of second leaf member 87*a* through fourth resistively heated portion of cutting and pursing cable 92*a* until it reaches fourth electrically and thermally conductive eyelet 454 of third multi-lumen polymeric extrusion assembly 430*a*. Sliding electrical contact between fourth resistively heated portion of cutting and pursing cable 92*a* and fourth electrically and thermally conductive eyelet 454 forms fifth transition boundary 409 between the fourth resistively heated portion of cutting and pursing cable 92*a* and fourth tensionable portion of cutting and pursing cable 29 as seen in FIG. 11B. As seen in FIG. 11B, current flow path 399 continues through fourth electrically and thermally conductive eyelet 454 and into fifth resistively heated portion of cutting and pursing cable 93*a* that forms a sliding electrical contact between the fourth electrically and thermally conductive eyelet 454 and fifth resistively heated portion of cutting and pursing cable 93*a* at sixth transition boundary 410.

As seen in FIGS. 9, 11B and 21 at the initial stage of deployment, current flow path 399*c* continues from the fourth electrically and thermally conductive eyelet 454 at the distal end of third multi-lumen polymeric extrusion assembly 430*a* through fifth resistively heated portion of cutting and pursing cable 93*a* until it reaches third leaf member 88*a*. Once fifth resistively heated portion of cutting and pursing cable 93*a* reaches second leaf member 88*a*, it passes through eyelet 327c at distal end of third leaf member 88a as seen in FIG. 21 where a knot is preferably formed in cable to secure cable to eyelet 327c.

Still referring to FIG. 9 at the initial stage of deployment as well as returning to FIG. 11, current flow path 399c continues from eyelet 327c at distal end of third leaf member 88a through sixth resistively heated portion of cutting and pursing cable 94a until it reaches second electrically and thermally conductive eyelet 450 of first multi-lumen polymeric extrusion assembly 426a. Sliding electrical contact between sixth resistively heated portion of cutting and pursing cable 94a and second electrically and thermally conductive eyelet 450 forms second transition boundary 406 between the sixth resistively heated portion of cutting and pursing cable 94a and sixth tensionable portion of cutting and pursing cable 119 as seen in FIG. 11. As seen in FIG. 11, sixth electrical current flow path 399y continues within second electrically and thermally conductive lead 448. The sixth electrical current flow path 399y continues from sixth resistively heated portion of cutting and pursing cable 94a to second electrically and thermally conductive lead 448 as a result of the sliding electrical contact. Electrically and thermally conductive lead 448 continues proximally to second lead wire 114 that terminates at second electrical contact 122 located on left side of single-use support housing 100 as seen FIGS. 2 and 17. As seen in FIGS. 3, 4 and 8, second electrical contact 122 located on left side of single-use support housing 100 is in electrical communication with corresponding second electrical contact terminal 188 located on inner wall of handpiece assembly 15 when single-use support housing 100 is fully inserted into handpiece assembly 15 and the proper orientation of single-use support housing 100 within handpiece assembly 15 is maintained by the extension of drive block advancement ear 134 into third elongate slot 35 located within handpiece assembly 15. As seen in FIG. 3, the seventh electrical current flow path 399z continues along second lead 189 that is in electrical communication with and located between second electrical contact terminal 188 and second constant current source connector 189a. The second constant current source connector 189a completes electrical current path 399z to constant current source 247 at second constant current source connector pin 53.

Referring now to FIGS. 9, 22, 23 and 25, the progressive advancement of first, second and leaf members 86, 87 and 88 through ramps 289a, 289b and 289c, respectively in combination with slightly wider first, second and third multi-lumen polymeric extrusion members 426, 428 and 430 through slightly wider ramps 290a, 290b and 290c, the ramps being formed in tip component 266 located at distal end of delivery cannula 22, causes the tissue capture basket 326 to expand into an increasingly larger circumscribing extent. By way of example, four stages of progressive advancement of leaf members 86, 87 and 88 and multi-lumen polymeric extrusion members 426, 428 and 430 are illustrated in FIG. 9 wherein the lengths of the six resistively heated portions of cutting and pursing cables 89 through 94 are seen to increase in correspondence with the progressive advancement of the leaf members and multi-lumen polymeric extrusion members. The four stages of advancement of the tissue capture basket 326 are designated by the letter suffix a, b, c or d appended to the number references for the leaf members 86-88, multi-lumen polymeric extrusion members 426, 428 and 430 as well as resistively heated portions of cutting and pursing cables 89-94.

As seen in FIG. 9, the maximum diameter extent of the tissue capture basket 326 is designated $D_{11}$, $D_{12}$, $D_{13}$ and $D_{14}$ corresponding to the first (initial), second, third and fourth stages of the progressive advancement of the leaf members and multi-lumen polymeric extrusion members. By way of further example in FIG. 9, the fourth stage of the progressive advancement of the leaf members 86d-88d and the multi-lumen polymeric extrusion members 426d, 428d and 430d results in the first through sixth resistively heated portions of cutting and pursing cables 89d-94d having a maximum diameter extent of $D_{14}$ corresponds to the maximum diameter, $D_{10}$ of the target tissue volume 354 seen in FIG. 25.

As described in the foregoing specification, each of the six cutting and pursing cables is partitioned into two discrete functional regions. A first functional region is the tensioning portion of each cutting and pursing cable wherein no electrical current flows. The tensioning portion of each cutting and pursing cable is that portion of the cutting and pursing cable that is in sliding electrical contact with electrically and thermally conductive eyelets that serve as electrodes for the conduction of constant current between the electrically and thermally conductive eyelets and the cutting and pursing cables wherein electrical current is conducted at the location of the sliding electrical contact. A second functional region is the resistively heated portion of each cutting and pursing cable wherein constant current begins to flow within the resistively heated portion of the cutting and pursing cable at the location sliding electrical contact and distal to the electrically and thermally conductive eyelet. The confinement of constant current flow within only those portions of the cutting and pursing cables that are in contact with and distal to the electrically and thermally conductive eyelets corresponds to the confinement of constant current flow only within those portions of the cutting and pursing cable that are in direct thermal contact with and dissipating heat into the tissue being incised. The confinement of constant current flow within only those portions of the cutting and pursing cables that are in direct thermal contact with the tissue is essential for the controlled thermal incision of tissue by the cutting cable without overheating and melting or fracturing the cutting and pursing cable.

Figure 9A:
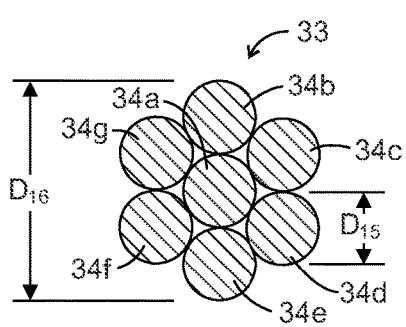
FIG. 9A is a cross-sectional view of a cable construction comprising seven individual wires.

The essential requirement that constant current be confined to flow within only those portions of the cutting and pursing cables that are in contact with and distal to the electrically and thermally conductive eyelets as well as the confinement of the flow of constant current within only those portions of the cutting and pursing cables that are in direct thermal contact with tissue is more fully understood by examining the rate of power dissipation and corresponding temperature of the cutting cable that is required to incise tissue. In this regard and referring to FIG. 29, an experimental ex vivo tissue cutting apparatus 242 was designed to accurately measure the electrical resistance of a platinum wire 250 suspended between two silver tubular supports 249a and 249b while applying a known constant current level. A small-diameter solid platinum wire 250 was selected to simulate the resistively heated portions of the cutting and pursing cables 89-94 that that preferably are constructed in the form of a highly flexible cable 33 having a multiplicity of small wires as seen in FIG. 9A. The diameter of each wire comprising cable 33 is about 0.0010 to 0.0013 inch with a preferred cable construction having seven wires and an overall diameter of preferably 0.0030 to 0.0039 inch as seen in FIG. 9A. The cable preferably comprises multiple wires of a cobalt/chromium/tungsten/nickel alloy (commonly referred to as L605 alloy or Haynes 25 alloy) and is commercially available from Fort Wayne Metals, Inc. in Fort Wayne, Indiana. Alternatively, the cable may comprise multiple wires of stainless steel Type 304 or 316 and is commercially available from Jersey Wire & Cable, Inc. in Phillipsburg, New Jersey.

Figure 29:
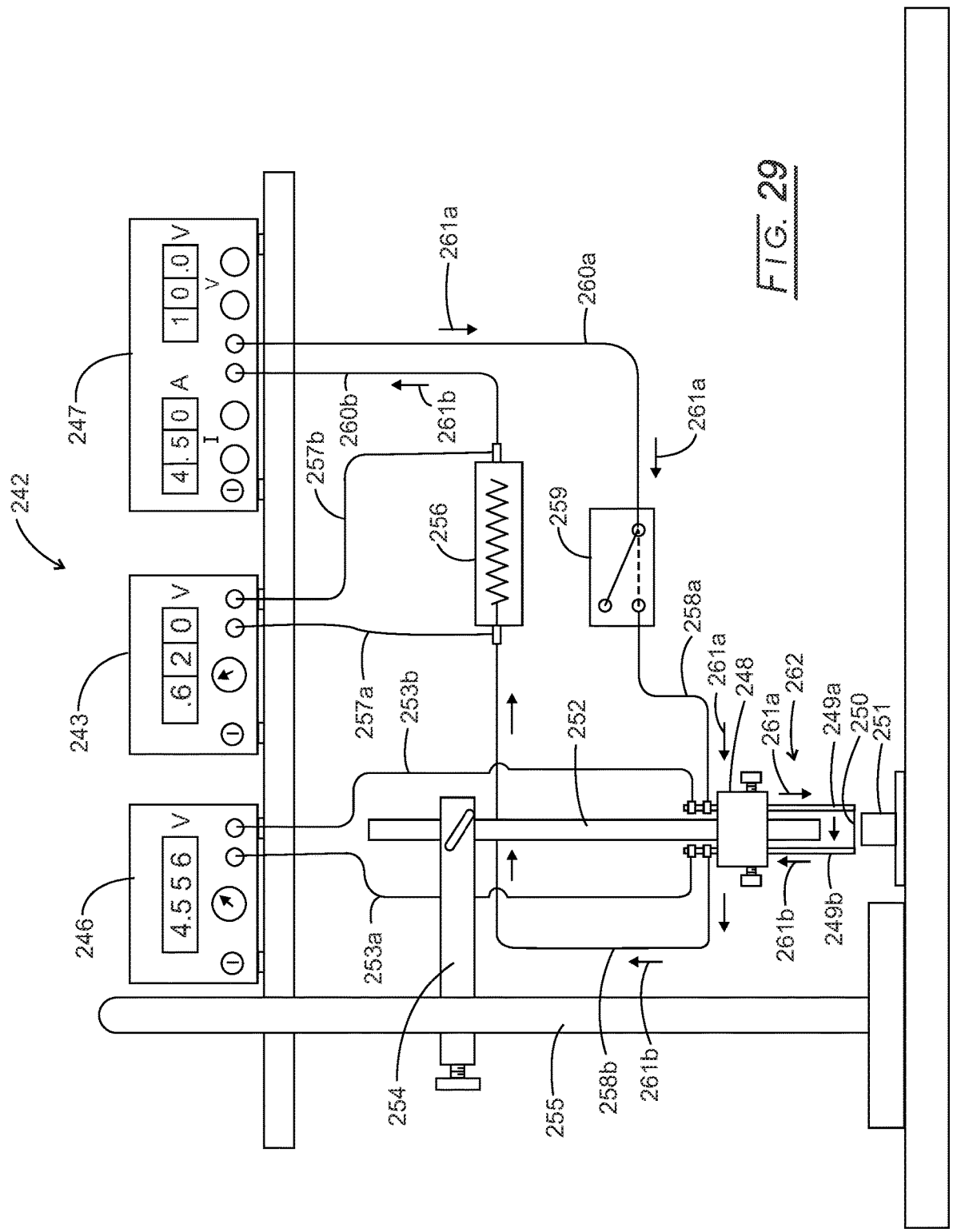
FIG. 29 provides a schematic of a an ex vivo tissue cutting apparatus used to measure the temperature using resistance thermometry as well as calculate the heat flux dissipated from a constant-current heated wire during the cutting of a sample of ex vivo animal tissue.

Based on the preferred range of diameters for the cutting and pursing cable, the two diameters of the substantially pure platinum wire used in the bench-top cutting of samples of ex vivo animal tissue 251 (e.g., steak tissue) using the test fixture schematic seen in FIG. 29 were either 0.003 inch or 0.005 inch. A platinum wire 250 wire of the selected diameter was inserted into the ends of two silver tubes 249a and 249b, each tube having an outside diameter of 0.040 inch and inside diameter of 0.020 inch and an overall length of about 2.5 inch. The two silver tubes 249a and 249b were separated by a distance of nominally 0.8 inch by an electrically insulative silver tube holder 248 as seen in FIG. 29. The platinum wire 250 of the selected wire diameter was soldered into the ends of the silver tubes using 60% tin/40% lead solder having a melting point of 188 C. The soldered joint assures that the contact resistances between the platinum wire 250 and the supporting silver tubes 249a and 249b are negligible. Also, the total resistance of the two silver tubes 249a and 249b supporting the platinum wire 250 only adds about 0.003 ohms of electrical resistance to the measurement of the platinum wire electrical resistance which represents only about 0.2% to 0.6% of the resistance of the platinum wire 250 during the heating of the platinum wire 250 by the application of a known constant current level. Vertical slideable assembly 262 comprises electrically insulative silver tube holder 248, silver tubes 249a, 249b and platinum wire 250 soldered across the distal ends of the silver tubes.

The two selected diameters of platinum wire 250 in the experimental ex vivo tissue cutting apparatus 242 seen in FIG. 29 were selected to closely approximate the range of diameters of the cable used in the cutting and capture assembly 329 as seen in FIG. 25. Accordingly, the heat flux levels and range of cutting wire temperatures measured using the experimental arrangement seen in FIG. 29 are equivalent to the heat flux levels and range of cutting wire temperatures that are attained by the flexible, multi-wire cutting and pursing cable used in the cutting and capture assembly 329 of the present disclosure.

The silver tubes 249a and 249b are supported in an electrically insulative silver tube holder 248 that maintains the length of the heatable platinum wire 250 during each cutting test on sample of ex vivo animal tissue 251 as seen in FIG. 29. As state above, the length of the heatable platinum wire 250 during each cutting test was about 0.8 inch. The weight of the silver tube holder 248 provides the force required to advance the heated platinum wire 250 through the sample of ex vivo animal tissue 251 when the pre-selected level of sufficient constant current is applied since the silver tube holder 248 slides vertically and freely on guide rod 252 maintained in a vertical orientation by guide rod support 254 attached to ring stand 255 as seen in FIG. 29. A constant current source 247 (e.g., a regulated DC power supply) provided a source of constant current 261 at pre-selected constant current levels flowing in first constant current lead segment 260a, second constant current lead segment 260b, third constant current lead segment 258a and fourth constant current lead segment 258b as seen in FIG. 29. The actual level of the applied constant current is determined by measuring the voltage difference between the ends of current shunt 256. During the cutting tests on sample of ex vivo animal tissue 251, the maximum power dissipated in the current shunt 256 is only about 6 watts and well within the 25-watt design limit for its use for current measurement.

The width of the sample of ex vivo animal tissue 251 during cutting with the heated platinum wire 250 is slightly less than the spacing between the inside boundary surfaces of the two silver tubes 249a and 249b so that the silver tubes 249a and 249b slide freely over the outside faces of the sample of ex vivo animal tissue 251 as seen in FIG. 29. A ruler with 1 mm divisions is placed in the field of view so that the rate of tissue cutting can be estimated using the video recorded images of the movement of the silver tube holder 248 and recording speed as the basis for calculating cutting speed.

Still referring to FIG. 29, the measurement procedure used to derive the platinum wire temperature during tissue cutting comprises the following steps:

1. Record the measured voltage levels obtained with first digital voltmeter 243 and second digital voltmeter 246 using a nominal 1.5 volt primary battery and a nominal 9.0 volt primary battery.
2. Measure the fixed length of the platinum wire 250 suspended between the distal ends of the silver tubes 249a and 249b while mounted in the silver tube holder 248 using a digital caliper; measure the diameter of the platinum wire 250 using a digital micrometer.
3. Place a water-saturated paper towel segment (not shown) over the full length of the platinum wire 250 while it is suspended above the sample of ex vivo animal tissue 251 and apply a low level of constant current (e.g., 0.2 to 0.3 amps) using constant current source 247 while measuring the voltage difference across the current shunt 256 using first and second voltage sense leads 257a, 257b and the voltage difference across the two silver tubes 249a and 249b using third and fourth voltage sense leads 253a, 253b as shown schematically in FIG. 29. These two voltage measurements are next used to calculate the electrical resistance of the platinum wire at nominally 20 C. The water-saturated paper towel positioned over the length of silver wire 250 minimizes any unwanted heating of the platinum wire 250 substantially above 20 C during the room-temperature resistance measurement of platinum wire 250.
4. Remove third and fourth constant current lead segments 258a and 258b, respectively, between the constant current source 247 and the silver tubes 249a and 249b and briefly connect the constant current source 247 to a power resistor (not shown) of nominally 1.0 ohm and capable of dissipating 50 watts without significant temperature rise. This step is performed to adjust the constant current level of constant current source 247 for use in a particular test (e.g., 2.7 amps for one of the tests using 0.0030 inch diameter platinum wire) wherein the sample of ex vivo animal tissue 251 is cut with the heated platinum wire. After adjusting the constant current level of constant current source 247 to the pre-selected level, open the on/off switch 259 so that the on/off switch 259 is in the "off" position (i.e., open circuit condition).
5. Reconnect the third and fourth constant current lead segments 258a and 258b, respectively, between the constant current source 247 and the silver tubes 249a and 249b in preparation for the cutting of the sample of ex vivo animal tissue 251.
6. Start the video recording with the camera (not shown) with the video camera adjusted so that all of the meters, silver tube holder, silver tubes, sample of ex vivo animal tissue 251 and ruler (not shown) are in view.

7. Close the position of the on/off switch 259 to the "on" position so that the pre-selected constant current 261 is flowing through the platinum wire 250.
8. Open the on/off switch position before the cutting wire advances through the full thickness of the sample of ex vivo animal tissue 251.
9. View video recording of cutting test to observe and document the digital meter readings and the rate of tissue cutting.

The electrical resistance of the nominal 0.003-inch diameter platinum wire 250 and the nominal 0.005-inch diameter platinum wire 250 used in cutting tests was determined at room temperature (nominally 20 C) with auxiliary cooling of the platinum wire during the application of a constant test current of about 0.2 to 0.3 amps. The resistance of each platinum wire 250 was calculated using Ohms Law, wherein the electrical resistance, R (in unit of ohms) is equal to the voltage difference across an electrical conductor, V (in unit of volts) divided by the electrical current flowing through the conductor, I (in units of amperes). Likewise, during a tissue cutting test, a pre-selected constant current level 261 was applied to the platinum wire while it is in direct contact with the ex vivo animal tissue 251 as seen in FIG. 29. The constant current levels selected for the cutting of a sample of ex vivo animal tissue 251 provided the basis for selecting the range of resistive heating flux levels to be selected for subsequent in vivo cutting and capture of human tissue specimens using a stainless steel 316 cable or a cobalt/chromium/tungsten/nickel (e.g., L605) cable having a nominal overall cable diameter ranging from 0.0030 to 0.0039 inch.

The test procedure specified above was used to perform cutting tests performed on samples of ex vivo animal tissue 251 using a solid platinum wire 250 having a nominal diameter of 0.003 inch or 0.005 inch. The first step in the test protocol was to compare the voltage levels for two battery voltage sources, viz., a nominal 1.5-volt primary battery (not shown) and a nominal 9.0 volt primary battery (not shown). The measured voltage values using the second digital voltmeter 246 (used for measuring the voltage difference across the platinum wire support posts) and the first digital voltmeter 243 (used for measuring the voltage difference across the current shunt resistor) were within 0.05% and 0.07% for the nominal 1.5-volt and 9.0-volt battery sources, respectively. The confirmed close agreement between the two voltage measuring instruments, upon calibration in the voltage range to be used for the subsequent tests, assured the accuracy of the measurements of the resistance of the platinum wire 250 at 20 C and subsequently the resistance of the platinum wire 250 at an elevated temperature during the period in which a constant current 261 is flowing in the platinum wire 250. In addition, since the electrical resistance of the platinum wire 250 under various applied constant current levels is calculated based on the ratio of the voltages measured using first digital voltmeter 243 and second digital voltmeter 246 during the cutting of each sample of ex vivo animal tissue 251, any bias in the closely agreeing voltage meters would effectively be cancelled out as a result of the ratiometric analysis.

Still referring to FIG. 29, once the electrical resistance of the platinum wire 250 was measured at nominally 20 C and the constant current source 247 adjusted to deliver the pre-selected constant current level, then the platinum wire 250 was positioned so that the platinum wire rests on and is in direct contact with the surface of the sample of ex vivo animal tissue 251 while the silver tubes 249a and 249b are positioned adjacent to and just outside the vertical boundaries of the sample of ex vivo animal tissue 251 such that the downward movement of the silver tubes 249a and 249b are unimpeded by the sample of ex vivo animal tissue 251 and the heated platinum wire 250 advances through the sample of ex vivo animal tissue 251 at a rate impeded only by the rate of cutting of the sample of ex vivo animal tissue 251 by the heated platinum wire 250. Each test for a pre-selected constant current level was initiated by closing the on/off switch 259 to immediately commence the flow of constant current 261 through the platinum wire 250 as it begins to thermally cut through the sample of ex vivo animal tissue 251. In this regard, the cutting of tissue is properly defined as thermal cutting since [a] an insufficiently heated wire was demonstrated to be incapable of cutting the sample of ex vivo animal tissue 251 and [b] the heated cutting wire achieves a linear heat flux (i.e., watts/cm length) and associated operating temperature that is capable of inducing the vaporization of liquid filled cellular components within the tissue, thereby causing the fracturing of cell membranes and effecting the incision or parting of the tissue.

The rate of cutting by the heated platinum wire 250 through the sample of ex vivo animal tissue 251 was determined primarily by the pre-selected constant current level. The higher the constant current level, the greater the heating rate generated within the platinum wire 250 and the greater the heat flux dissipated at the surface of the platinum wire 250 and, correspondingly, the higher rate of cutting of the sample of ex vivo animal tissue 251. In addition and correspondingly, the higher the constant current level, the higher the temperature of the platinum wire 250 during the thermal cutting through the sample of ex vivo animal tissue 251.

For the case of the nominal 0.005-inch diameter platinum wire, an acceptably fast cutting rate through the ex vivo animal tissue 251 was achieved at a constant current level of 4.859 amps (see Test No. 1 in Table 1). An even faster rate of cutting rate through the ex vivo animal tissue 251 was achieved at a constant current level of 5.335 amps but significantly exceeded the actual cutting rate intended for the deployment of the cutting and capture assembly 329 through in vivo tissue tests in actual incision and capture of en bloc tissue samples within the body of human patients. For the case of an actual applied constant current level of 4.859 amps, the measured cutting rate was 2.3 mm/sec which is the same as the preferred rate of advancement of the cutting and capture assembly 329 being driven by the motor activated drive tube drive member translation assembly 180 as seen in FIG. 3. These test results suggest that a nominal constant current level of 4.9 amps for a 0.005-inch diameter platinum heating wire provides a comparable rate of cutting as the preferred rate of advancement of the cutting and capture assembly 329 comprising three multi-lumen polymeric extrusion assemblies and three leaf members supporting six resistively heated portions of cutting and pursing cables 89-94 as described above with regard to FIG. 9

For the case of the nominal 0.003-inch diameter platinum wire 250, an acceptably fast cutting rate through the sample of ex vivo animal tissue 251 was achieved at a constant current level of 2.709 amps as seen in Test Nos. 5 and 6 of Table 1. For the case of an applied constant current level of 2.709 amps, the measured cutting rate was 2.8 to 2.9 mm/sec, which is slightly greater the intended rate of advancement of the cutting and capture assembly 329 and may enable the completion of the incision and capture of an en bloc tissue specimen within a patient during a shorter period of power application.

The calculated resistances of the heatable platinum wire at 20 C and during the period of heating using an applied constant that provides an adequate cutting rate (e.g., 2.7 amps for the nominal 0.003-inch diameter platinum wire) were used in conjunction with the known temperature coefficient of resistance of platinum (viz., 3927 ppm/C) to calculate the temperature of the heated platinum wire during the application of a known constant current level. The video recording of the voltage values displayed by the first digital voltmeter 243 and second digital voltmeter 247 during the brief period (e.g., 2 to 3 seconds) that the platinum wire 250 traverses the sample of ex vivo animal tissue 251 was used to determine the average of the voltage differences between the two silver tubes 249a and 249b measured by the second digital voltmeter 246 and, hence, across the platinum wire 250 during the application of a constant current 261.

The electrical resistance, $R_T$ of a conductor (in Ohms) at an elevated temperature, T (in degrees Celsius) is given by the relationship:

$$R_T = R_0(1 + \alpha(T - T_0)) \quad \{\text{Equation 1}\}$$

where $R_0$ is the measured electrical resistance of the conductor at a known temperature, $T_0$ (in degrees Celsius) and a is the known temperature coefficient of electrical resistance of the conductor (in ppm per degree Celsius). For the case of a pure platinum conductor, the term a is equal to 3927 ppm/C or 0.003927 per degree C. Rearranging the terms of Equation 1 to express the unknown temperature, T as a function of the known and measured quantities gives the relationship:

$$T = ((R_T/R_0) - 1)/\alpha + T_0 \quad \{\text{Equation 2}\}$$

The above Equation 2 was used to calculate the temperature of the platinum heating wire 250 during the period in which a constant current 261 is applied to heat the platinum wire 250 and enable the cutting of sample of ex vivo animal tissue. The average of the calculated temperatures of the platinum wires 250 having nominal diameters of 0.003 inch and 0.005 inch for various levels of applied constant current are presented in Table 1.

As seen in Table 1 for Test No. 3, based on a heated 0.0048-inch diameter platinum wire 250 while cutting a sample of ex vivo animal tissue that is initially at room temperature (i.e., nominally 20 C) and achieving a cutting rate that is comparable to the cutting rate using the motor-driven tissue cutting and capture assembly 329, the average calculated temperature of the platinum wire 250 is 373 C. By comparison, as seen in Table 1 for Test Nos. 5 and 6 based on a heated 0.0029-inch diameter platinum wire 250 while cutting a sample of ex vivo animal tissue 251 that is initially at room temperature (i.e., nominally 20 C) and achieving a cutting rate that is comparable to the cutting rate using the motor-driven tissue cutting and capture assembly 329, the average calculated temperatures of the platinum wire temperature ranges from 358 C to 363 C.

TABLE 1

Measured Heat Flux, Platinum Wire Temperature and Rate of Cutting of Ex Vivo Animal Tissue

| Test Number | Platinum Wire Diameter (in) | Constant Current Level (amps) | Average Heat Flux Dissipated from Wire (watts/cm$^2$) | Average Platinum Wire Temperature (watts/cm$^2$) | Cutting Rate in Animal Tissue (mm/sec) |
|---|---|---|---|---|---|
| 1 | 0.0048 | 3.932 | 86 | 298 | 1.0 |
| 2 | 0.0048 | 4.368 | 109 | 312 | 1.6 |
| 3 | 0.0048 | 4.859 | 150 | 373 | 2.3 |
| 4 | 0.0048 | 5.335 | 191 | 408 | 3.0 |
| 5 | 0.0029 | 2.709 | 220 | 363 | 2.8 |
| 6 | 0.0029 | 2.709 | 218 | 358 | 2.9 |
| 7 | 0.0029 | 3.010 | 284 | 393 | 5.4 |

Based on the results of the cutting tests in samples of ex vivo animal tissue 251 using the ex vivo animal tissue cutting apparatus 242 seen in FIG. 29, the heat flux dissipated from the cutting and pursing wire employed in the tissue incision and retrieval assembly 12 of the present disclosure is at least 150 watts/cm$^2$ and preferably 220 watts/cm$^2$. The temperature of the constant-current heated cutting and pursing wire employed in the tissue incision and retrieval assembly 12 of the present disclosure during the cutting of tissue is preferably in the range from about 350 C to 400 C.

The cutting tests in samples of ex vivo animal tissue 251 using the ex vivo animal tissue cutting apparatus 242, as seen in FIG. 29, determined that the thermal cutting of tissue at a preferred cutting rate ranging from 2.3 to 2.7 mm/second with small-diameter platinum wires ranging in diameter from 0.0030 to 0.0050 inch and heated to about 400 C requires a wire or cable heat flux (i.e., heat generated per unit surface area of the cutting wire or cable) of at least 150 watts/cm$^2$ and preferably 220 watts/cm$^2$. As described above, the preferred heat flux required rate of thermal cutting of ex vivo animal tissue was determined using a solid platinum wire so that its measured resistance during thermal cutting could be used to determine the temperature of the platinum wire during the preferred rate of the thermal cutting of ex vivo animal tissue.

Based on the established preferred heat flux from the multi-wire cutting cable (viz., at least 150 watts/cm$^2$ and preferably 220 watts/cm$^2$), the level of constant current that needs to conducted through the resistively heated portions of the cutting cables 89-94 can be derived using the Joule-Lenz Law (also known as Joule's First Law combined with Ohm's Law). According to the Joule-Lenz Law, the power or the heating, P (also known as Joulean heating) can be expressed as the product of the square of the current, I and the resistance of the conductor, R as seen below in Equation 3:

$$P = I^2 \times R \quad \{\text{Equation 3}\}$$

The minimum and preferred heat fluxes (i.e., heating power, P dissipated per unit surface area, A of the cutting wire or cable) of 150 watts/cm$^2$ and 220 watts/cm$^2$, respectively, can be converted into the unit of heating power per unit length, L of the resistively heated portions of cutting and pursing cables 89-94 by dividing the preferred heat flux by the circumference, C of the assumed-round resistively heated portions of cutting and pursing cables 89-94. Recall that the surface area, A of a length, L of a round wire or cable having a diameter, $D_{cable}$ is given by the equation:

$$A_{cable} = C_{cable} \times L = 3.1416 \times D_{cable} \times L \quad \{\text{Equation 4}\}$$

The cross-section of an individual cable 33, representative of each of the set of six cables within the tissue incision and retrieval assembly 12, is seen in FIG. 9A. The complete length of each individual cable 33 comprises two functional regions, viz., the tensional portions of the cutting and pursing cable and the resistively heated portion of the cutting and pursing cable. As described above, the first through sixth tensionable portions of cutting and pursing cables 118, 19, 23, 29, 30 and 119, combine with the first through sixth resistively heated portions of cutting and pursing cables 89-94, respectively, to form the complete lengths of the set of six individual cables 33. As seen in cross-sectional view FIG. 9A, cable 33 comprises seven individual round wires 34a-34g of equal diameter, $D_{15}$ in which central wire 34a is symmetrically surrounded by six wires 34b-34g to form a cable having an effective diameter of $D^{16}$ as seen in FIG. 9A. Each of the seven wires 34a-34g is manufactured using a biocompatible, high-strength alloy in full-hard temper such as austenitic stainless steel 316 or cobalt/chromium/tungsten/nickel alloy L605.

By way of example and still referring to FIG. 9A, a first preferred construction for cable 33 is manufactured by Fort Wayne Metals, Inc. (Fort Wayne, Indiana) and comprises seven individual cobalt/chromium/tungsten/nickel alloy L605 wires 34a-34g in full-hard temper, each wire 34 having a diameter, $D_{15}$ of 0.0010 inch to produce an overall nominal diameter, $D_{16}$ for cable 33 of 0.0030 inch (0.00762 cm). The electrical resistance of this first preferred construction for cable 33 was determined by measuring a known length of cable (e.g., 60 cm) at a room temperature of about 20 C using a digital ohmmeter. The cable resistance per centimeter length was determined by dividing the measured resistance (in units of ohms) by the length of cable included in the resistance measurement. Using the above resistance measurement method, the resistance per unit length, R/L at 20 C for the first preferred construction of cable 33 was determined to be 2.76 ohms/cm. Based on measurements performed within the testing laboratory of the cable manufacturer, Fort Wayne Metals, the cable break strength at 20 C for the first preferred cable construction was determined to be 1.87 pounds (force).

By way of another example, a second preferred construction for cable 33 is manufactured by Fort Wayne Metals, Inc. (Fort Wayne, Indiana) and comprises seven individual cobalt/chromium/tungsten/nickel alloy L605 wires 34a-34g in full-hard temper, each wire 34 having a diameter, $D_{15}$ of 0.0013 inch to produce an overall nominal diameter, $D_{16}$ for cable 33 of 0.0039 inch (0.00991 cm). The electrical resistance of this second preferred construction for cable 33 was determined by measuring a known length of cable (e.g., 60 cm) at a room temperature of about 20 C using a digital ohmmeter. The cable resistance per centimeter length was determined by dividing the measured resistance (in units of ohms) by the length of cable included in the resistance measurement. Using the above resistance measurement method, the resistance per unit length, R/L at 20 C for the second preferred construction of cable 33 was determined to be 1.63 ohms/cm. Based on measurements performed within the testing laboratory of the cable manufacturer, Fort Wayne Metals, the cable break strength at 20 C for the second preferred cable construction was determined to be 3.18 pounds (force).

Referring now to Equation 4, the peripheral surface area of a unit length of cable 33 of one centimeter is equal to the product of 3.1416 and the diameter, $D_{16}$ of cable 33. For the case of the first preferred cable design having a nominal cable diameter of 0.0030 inch (0.00762 cm), the surface area of cable 33 per unit (centimeter) length is 0.0226 $cm^2$. Based on the established minimum and preferred heat flux emanating from the surface of the multi-wire cutting cable of 150 and 220 watts/$cm^2$, respectively, the amount of resistive heating power (i.e., Joulean heating) required per centimeter of cable length, P/L to generate the minimum heat flux of 150 watts/$cm^2$ and preferred heat flux of 220 watts/$cm^2$ can be derived by the product of the required minimum and preferred heat fluxes (viz., 150 and 220 watts/$cm^2$, respectively) and the surface area of a unit cable length of one centimeter (0.0226 $cm^2$), the products computed to be 3.39 and 4.97 watts per centimeter length, respectively. For the case of the second preferred cable design having a nominal cable diameter of 0.00991 cm, the surface area of cable 33 per unit (centimeter) length is 3.1416×0.00991 cm×1.0 cm or 0.0311 $cm^2$. Based on the established minimum heat flux of 150 watts/$cm^2$ and preferred heat flux of 220 watts/$cm^2$ emanating from the surface of the multi-wire cutting cable, the amount of resistive heating power (i.e., Joulean heating) required per centimeter of cable length, P/L to generate the minimum heat flux of 150 watts/$cm^2$ and preferred heat flux of 220 watts/$cm^2$ can be derived by the product of the required minimum and preferred heat fluxes (viz., 150 and 220 watts/$cm^2$, respectively) and the surface area of a unit cable length of one centimeter (0.0331 $cm^2$), the products computed to be 4.97 and 7.28 watts per centimeter length, respectively.

As described above, the minimum and preferred heat fluxes of 150 and 220 watts/$cm^2$, respectively, were experimentally determined based on the severing of ex vivo animal tissue with resistively heated platinum wires having diameters of 0.0030 and 0.0050 inches. It is hypothesized that the tissue cutting mechanism is due to the fracturing the cellular structures as a result of the vaporization of the contained liquid within each cell. Based on the minimum and preferred heat fluxes of 150 and 220 watts/$cm^2$, respectively, and the dimensions as well as the electrical resistance of the resistively heated portion of cutting and pursing cables 89-94 at 400 C, the actual amount of resistively generated power (i.e., power generated as a result of electrical current flowing through the inherent electrical resistance of the cable) that is dissipated per unit length of the resistively heated portion of cutting and pursing cables 89-94 is 3.39 and 4.97 watts/cm, respectively, for a cable diameter of 0.0030 and is 4.97 and 7.28 watts/cm, respectively, for a cable diameter of 0.0039 inches.

The power dissipation rates per unit length for cable 33 having a diameters of 0.0030 and 0.0039 inch were derived above based on measurements of the power, cutting wire temperature and heat fluxes required for the cutting of ex vivo animal tissue at a known cutting rates. These derived power dissipation rates per unit length for cable 33 are next compared with the theoretical power dissipation rates per unit length of resistively heated portion of cutting and pursing cable derived based on the assumption of "thermal cutting" of tissue. As used herein, the term "thermal cutting" refers to a cutting mechanism wherein the incision of tissue is the result of the vaporization of liquid contained in the cells of tissue and consequent mechanical fracturing of the cell walls as a result of the volumetrically expanding vapor phase of liquid being vaporized. It is well known that cells in human or animal tissue contain about 70% water (see Cooper, G., The Cell: A Molecular Approach. 2000; Sinaeur Associates, Inc., Sunderland, Massachusetts). Assuming a preferred cutting rate of 2.5 mm/second, the volume of tissue whose water content is vaporized within a unit cut length, $L_{cut}$ of 1.0 cm is the product of the width of the incision and the length of the incision. The width of the incision, $W_{incision}$ is assumed to be 10% larger than the diameter, $D_{cable}$ of any one of the resistively heated portion of cutting and pursing cables 89-94 due to the combination of conduction and radiation heat transfer into the tissue on either side of the traversing cable and the unit length of the incision is assumed to be 1.0 cm for the volume of tissue being analyzed. Since water comprises 70% of the volume of tissue, the volume, $V_{water}$ and, equivalently, the mass, $m_{water}$ of water vaporized per unit length of 1.0 cm tissue that is cut is given by the equation:

$$m_{water}=(D_{cable}\times1.1)\times L_{cut}\times70\% \quad \{\text{Equation 5}\}$$

By way of example, for the case of a first preferred design for the cable 33 seen in FIG. 9A, the diameter, $D_{cable}$ of the cable 33 is 0.0030 inch (0.00762 cm). Based on Equation 5, the mass, $m_{water}$ of water vaporized for a cut width, $W_{incision}$ of $D_{cable}\times1.1$ and cut length, $L_{cut}$ of 1.0 cm is 0.00586 grams. The amount thermal energy, $Q_{cut}$ required to vaporize this mass of water for each cut length of 1.0 cm can be quantified by the addition of the sensible heat, $Q_{sensible}$ (i.e., the heat required to heat water from an initial core body temperature of 37 C to the boiling point of water of 100 C) and the latent heat of vaporization, $L_{water}$ of water, $Q_{latent}$ as specified in the following equations:

$$Q_{cut}=Q_{sensible}+Q_{latent} \quad \{\text{Equation 6}\}$$

$$Q_{sensible}=m_{water}\times c_{water}\times \Delta T \quad \{\text{Equation 7}\}$$

$$Q_{latent}=m_{water}\times L_{water} \quad \{\text{Equation 8}\}$$

where $c_{water}$ is the well-known specific heat of water (viz., 1 calorie/gram-C), $\Delta T$ is the temperature rise of cellular at normal body temperature of 37 C to the boiling point of water of 100 C and $L_{water}$ is the well-known latent heat of vaporization of water of 540 calories/gram to the energy required to convert the liquid phase of corresponding water at 100 C to the vapor phase of water at 100 C. Substituting these known values into Equations 6 through 8 corresponding to the assumed thermal cutting of tissue by vaporization of cellular water yields the following amounts of thermal energy per unit length of cut of 1.0 cm for the case of a cable 33 having a diameter of 0.0030 inch:

$$Q_{sensible}=0.00586 \text{ grams}\times1.0 \text{ calorie/gram-}C\times(100-37)=0.37 \text{ calories}$$

$$Q_{latent}=0.00586 \text{ grams}\times540 \text{ calories/gram}=3.17 \text{ calories}$$

$$Q_{cut}=0.37+3.17=3.54 \text{ calories}$$

At a cutting rate of 2.5 mm/second, a tissue cut length of 1.0 cm requires 4.0 seconds. The calculated total energy required to cut a tissue length of 1.0 cm can be converted into a value of power dissipation, P by dividing the total energy (in calories) required per cut length of 1.0 cm by the duration of cut of 4.0 seconds and multiplying this quotient by 4.186 to convert the unit of calories/second into the unit of watts. Hence, the amount of power required to cut 1.0 cm length of tissue with a resistively heater cutting and pursing cable having a diameter of 0.00300 inch is 3.70 watts per centimeter of cut length. It is noteworthy that the theoretical value of 3.70 watts derived based on only the thermo-physical properties of water, cellular content of water, the cable diameter and cutting rate is in good agreement and within about 8% of the minimum power required per 1.0 centimeter length of the resistively heated portion of cutting and pursing cables (viz., 3.39 watts) derived based on actual cutting tests in ex vivo animal tissue at the minimum required heat flux of 150 watts/cm².

By way of example, for the case of a second preferred design for the cable 33 seen in FIG. 9A, the diameter, $D_{cable}$ of the cable 33 is 0.0039 inch (0.00990 cm). Based on Equation 5, the mass, $m_{water}$ of water vaporized for a cut width, $W_{incision}$ of $D_{cable}\times1.1$ and cut length, $L_{cut}$ of 1.0 cm is 0.00762 grams. The amount thermal energy, $Q_{cut}$ required to vaporize this mass of water for each cut length of 1.0 cm can be quantified by the addition of the sensible heat, $Q_{sensible}$ (i.e., the heat required to heat water from an initial core body temperature of 37 C to the boiling point of 100 C) and the latent heat of vaporization, $L_{water}$ of water, $Q_{latent}$ as specified Equations 6 through 8. As before and referring to Equations 6 through 8, $c_{water}$ is the well-known specific temperature heat of water (viz., 1 calorie/gram-C), $\Delta T$ is the rise of cellular at normal body temperature of 37 C to the boiling point of water of 100 C and $L_{water}$ is the well-known latent heat of vaporization of water of 540 calories/gram corresponding to the energy required to convert the liquid phase of water at 100 C to the vapor phase of water at 100 C. Substituting these known values into Equations 6 through 8 corresponding to the assumed thermal cutting of tissue by vaporization of cellular water yields the following amounts of thermal energy per unit length of cut of 1.0 cm for the case of a cable 33 having a diameter of 0.0039 inch:

$$Q_{sensible}=0.00762 \text{ grams}\times1.0 \text{ calorie/gram-}C\times(100-37)=0.48 \text{ calories}$$

$$Q_{latent}=0.00762 \text{ grams}\times540 \text{ calories/gram}=4.11 \text{ calories}$$

$$Q_{cut}=0.48+4.11=4.59 \text{ calories}$$

At a cutting rate of 2.5 mm/second, a tissue cut length of 1.0 cm requires 4.0 seconds. The calculated total energy required to cut a tissue length of 1.0 cm can be converted in a value of power dissipation, P by dividing the total energy required per cut length of 1.0 cm by the duration of cut of 4.0 seconds and multiplying this quotient by 4.186 to convert unit of calories/second into the unit of watts. Hence, the amount of power required to cut 1.0 cm length of tissue with a resistively heater cutting and pursing cable having a diameter of 0.0039 inch is 4.80 watts per centimeter of cut length. It is noteworthy that the theoretical value of 4.80 watts derived based on only the thermo-physical properties of water, cellular content of water, the cable diameter and cutting rate is in reasonable agreement and is within about 4% of the minimum power required per 1.0 centimeter length of the resistively heated portion of cutting and pursing cables (viz., 4.97 watts) derived based on actual cutting tests in ex vivo animal tissue at the minimum required heat flux of 150 watts/cm².

As discussed above, the mechanism of thermal cutting of tissue is the advancement of a resistively heated cable, operating at a temperature of about 400 C, through soft tissue. The confinement of electric current to flow only within the cable, the cable having an electrical resistance orders of magnitude lower than the surrounding soft tissue, effectively avoids the flow of any electrical current into the adjacent tissue. Hence, the thermal cutting of tissue involves only the conduction of heat into the adjacent tissue during tissue cutting. Consequently, due to small diameter of the cutting cable (e.g., 0.0030 to 0.0039 inch) and the rate at which the cable is advanced through the tissue, the small cable surface area in contact with tissue combined with the brief contact period results in a depth of thermal injury at the surface of the captured tissue specimen that is limited to less than about 0.001" to 0.002". As a consequence of the very thin layer of thermal injury on the surface of the captured tissue specimen, as defined by the circumscribing tissue capture basket seen in FIG. 25, essentially all of the captured tissue specimen is suitable for post-excision examination by a pathologist and, importantly, the assessment of the extent of malignancy-free (i.e., "clear" or healthy) margins around any identified malignant lesion.

In contrast, electrosurgical cutting of tissue with a wire or cable in prior art devices requires the flow of electrical current from the wire or cable into and through the tissue being incised wherein an electrical arc is formed in the gap between the wire or cable and the tissue as a result of application of a high voltage difference between the wire or cable and the tissue, typically at a level of greater than 1000 volts (peak-to-peak) at a frequency of at least 300 kHz. In the case of electrosurgical cutting to excise and capture a volume of tissue, as specified in U.S. Pat. No. 6,471,659 and incorporated in its entirety herein by reference, the essential flow of electrical current into and through adjacent tissue to achieve tissue cutting may cause unwanted heating of adjacent tissue well beyond the path of tissue cutting that can result in significant thermal damage to portions the excised volume of captured tissue. The thermal damage to portions of the excised volume of captured tissue is disadvantageous in that the damaged portions of the captured tissue specimen, intended for subsequent examination by a pathologist, are compromised and limit the available portions of the capture tissue specimen suitable for such examination by a pathologist (e.g., assessment of the boundary between malignant and healthy tissue).

The test procedure described above to perform cutting tests performed on samples of ex vivo animal tissue 251 using a solid platinum wire 250, having a nominal diameter of 0.003 inch or 0.005 inch, enabled the estimation of the temperature of a cutting wire or cable during the thermal cutting of tissue at a preferred rate of 2.3 to 2.7 mm/second. Based on the above-described thermal cutting tests in ex vivo animal tissue, the temperature of the cutting wire or cable was calculated to be in the range of 350 C to 400 C. The resistance per unit length of the resistively heated portions of the cutting and pursing cables 89-94 can next be estimated assuming a cutting cable temperature at the upper end of this range, viz., at 400 C. According to Page 8 of the technical data brochure (Catalog H-3057G available from Haynes International, Kokomo, Indiana) for the cobalt/chromium/tungsten/nickel alloy known as Haynes 25 or L605, the measured electrical resistivity values for Haynes 25 (also known as L605) at 20 C and 400 C are 88.6 and 98.5×10$^{-6}$ ohm-cm, respectively. The electrical resistivity values indicate that the resistance of an L605 cable exhibits a temperature associated coefficient of 1.11 that results in a cable resistance that is 1.11× higher at 400 C than at 20 C (i.e., room temperature).

As stated above, the measured electrical resistance per unit centimeter length for the first preferred design for cable 33 having a nominal diameter of 0.0030 inch is 2.76 ohm/cm at 20 C. Using the manufacturer supplied electrical resistivity values for L605 at 20 C and 400 C, the electrical resistance per unit centimeter length, R/L measured at 20 C can be estimated for the cable operating at a temperature of 400 C (i.e., the expected cable temperature during thermal cutting of tissue) by the product of the electrical resistance at 20 C (viz., 2.76 ohms/cm) and the temperature associated coefficient of 1.11 resulting in an estimated electrical resistance per unit centimeter length, R/L for the first preferred design for cable 33 of 3.06 ohms/cm at an operating temperature of 400 C.

Likewise, as stated above, the measured electrical resistance per unit centimeter length for the second preferred design for cable 33 having a nominal diameter of 0.0039 inch is 1.63 ohm/cm at 20 C. Using the manufacturer supplied electrical resistivity values for L605 at 20 C and 400 C, the electrical resistance per unit centimeter length measured at 20 C can be estimated for the cable operating at a temperature of 400 C (i.e., the expected cable temperature during thermal cutting of tissue) by the product of the electrical resistance at 20 C (viz., 1.63 ohms/cm) and the temperature associated coefficient of 1.11 resulting in an estimated electrical resistance per unit centimeter length for the first preferred design for cable 33 of 1.81 ohms/cm at an operating temperature of 400 C.

The required level of the constant current flowing in the resistively heated portions of the cutting and pursing cables 89-94 to achieve thermal cutting of tissue at a rate of 2.3 to 2.7 mm/second can now be estimated. The estimated required constant current level is based on the above measured and derived properties of cable 33 in combination with the experimentally determined level of the preferred heat flux of 220 watts/cm$^2$ emanating from cable 33 during the thermal cutting of tissue. The required level of constant current required for thermal cutting of tissue can be estimated based the Joule-Lenz Law in combination with the above derived values for the required resistive heating power per unit length, P/L and the electrical resistance per unit length, R/L of the resistively heated portions of the cutting and pursing cables 89-94. The above Equation 3 can be revised to express the required constant current, $I_{constant}$ in terms of the required power dissipation per unit 1.0 cm length, P/L at the preferred heat flux of 220 watts/cm$^2$ and the measured electrical resistance adjusted to an operating temperature of 400 C.

$$I_{constant}=[(P/L)/(R/L)]^{1/2} \quad \text{\{Equation 9\}}$$

For the case of the first preferred design for cable 33 having a nominal diameter of 0.0030 inch and operating at the preferred heat flux of 220 watts/cm$^2$, the resistive heater power per unit centimeter length of the resistively heated portion of cutting and pursing cables 89-94 was determined to be 4.97 watts/cm based on cutting tests at constant current in ex vivo animal tissue, as discussed above. Also, as discussed above, the calculated electrical resistance per unit centimeter length, R/L of the resistively heated portion of cutting and pursing cables 89-94 was determined to be 3.06 ohms/cm at an operating temperature of 400 C. Based on Equation 9, the required level of constant current, $I_{current}$ to generate a preferred heat flux of 220 watts/cm$^2$ within cable 33 having a nominal diameter of 0.0030 inch and operating at a temperature of 400 C is 1.27 amps.

For the case of the second preferred design for cable 33 having a nominal diameter of 0.0039 inch and operating at the preferred heat flux of 220 watts/cm$^2$, the resistive heater power per unit centimeter length of the resistively heated portion of cutting and pursing cables 89-94 was determined to be 7.28 watts/cm based on cutting tests at constant current in ex vivo animal tissue, as discussed above. Also, as discussed above, the calculated electrical resistance per unit centimeter length, R/L of the resistively heated portion of cutting and pursing cables 89-94 was determined to be 1.81 ohms/cm at an operating temperature of 400 C. Based on Equation 9, the required level of constant current, $I_{current}$ to generate a preferred heat flux of 220 watts/cm$^2$ within a cable 33 having a nominal diameter of 0.0030 inch and operating at a temperature of 400 C is 2.01 amps.

Returning to FIGS. 9, 9A, 11, 11A and 11B, the required level of constant current, $I_{current}$ derived above for the first and second preferred designs for cable 33, having diameters of 0.0030 and 0.0039 inch, respectively, confirms the essential requirement for partitioning cable 33 in two functional regions. As discussed earlier, a first functional region is the portion of each cable 33 that is proximal to one of the electrically and thermally conductive eyelets 446, 450, 452, and 454 located at the distal end of the multi-lumen polymeric extrusion assemblies 426, 428 and 430. This first functional region corresponds to the first through sixth tensionable portions of the cutting and pursing cables 118, 19, 23, 29, 30 and 119, respectively. A second functional region is that portion of each cable 33 that is immediately distal to the electrically and thermally conductive eyelets, 446, 450, 452 and 454 located at the distal ends of the multi-lumen polymeric extrusion assemblies 426, 428 and 430. This second functional region is referred to as the first through sixth resistively heated portions of the cutting and pursing cables 89-94, respectively. Returning to FIGS. 11, 11A and 11B, the demarcation or boundary between these two functional regions, as seen at first through sixth transition boundaries 396, 406, 407, 408, 409 and 410, respectively, occurs at the electrically and thermally conductive eyelets 446, 450, 452, and 454 located at the distal end of the multi-lumen polymeric extrusion assemblies 426, 428 and 430. Accordingly, the applied constant current is electrically conducted only through those portions of the first through sixth resistively heated portion of cutting and pursing cables 89-94, respectively that are distal their point of sliding electrical contact with electrically conducting eyelets that serve as electrodes. Consequently, electrical current is conducted only into the first through sixth resistively heated portions of cutting and pursing cables 89-94, respectively, beginning at first through sixth transition boundaries 396, 407, 408, 409, 410 and 406, respectively, and flows only in those portions of the first through sixth resistively heated portion of cutting and pursing cables 89-94 that are distal to eyelets 446, 450, 452, and 454 and in direct contact with tissue. The Joulean heating generated within each of the first through sixth resistively heated portions of the cutting and pursing cables 89-94 is dissipated into the tissue being incised, primarily through the process of the vaporization of the water contained within and comprising about 70% of the mass of each cell as discussed above. As a consequence of the water vaporization-based heat dissipation mechanism associated with the cutting of tissue by the passage of a constant current flowing through the first through sixth resistively heated portions of cutting and pursing cables 89-94, the temperature of the first through sixth resistively heated portions of cutting and pursing cables 89-94 increases to a maximum of only about 400 C even though the Joulean heating with the resistively heated portions of cutting and pursing cables ranges from about 3.39 to 7.28 watts per centimeter of length.

The levels of constant current required for the thermal cutting of tissue by the resistively heated portions of cutting and pursing cables 89-94 in direct contact tissue would however, result in very high temperatures if the constant current levels were required to flow in the first through sixth tensionable portions of the cutting and pursing cables 118, 19, 23, 29, 30 and 119, respectively, since these tensionable portions of cable 33 are not in contact with tissue but are surrounded by a thermally insulative layer of air. Due to the low thermal conductivity of the air that surrounds the first through sixth tensionable portions of the cutting and pursing cables 118, 19, 23, 29, 30 and 119, respectively, the largest portion of the heat dissipation from the surface of the cable 33 in the tensionable portions of the cutting and pursing cables would be heat dissipation by radiation heat transfer. According to the Stefan-Boltzmann Law, assuming the maximum radiation emittance of 1.0 from the surface of cable 33 (i.e., also known as black body radiation), radiated heat flux, $W_{radiation}$ can be expressed as the fourth power of absolute temperature, $T_{absolute}$ as seen below in Equation 10 (McAdams, W., Heat Transmission. 1954; McGraw-Hill Book Company, New York: 59-60).

$$W_{radiation} = \sigma \times T^4_{absolute} \quad \text{\{Equation 10\}}$$

where σ is the Stefan-Boltzmann constant equal to 5.67× $10^{-12}$ watts/cm²-K⁻⁴ and the absolute temperature is the temperature in units of degrees K or temperature in degrees C. plus 273 K. Since the preferred heat flux of 220 watts/cm² has been established based on cutting tests in ex vivo animal tissue, as described above, and the associated constant current levels required to achieve the preferred heat flux for the two preferred diameters of cable 33, Equation 10 can solved for the estimated cable temperature if the same heat flux of 220 watts/cm² is required to be dissipated for the case in which the cable 33 is in air and not in contact with tissue.

$$T_{absolute} = [W_{radiation}/\sigma]^{1/4} \quad \text{\{Equation 11\}}$$

Based on operation at a constant current level sufficient to generate the preferred heat flux required for thermal cutting of tissue, the calculated temperature assuming black body radiation (i.e., the maximum achievable radiation heat transfer) is 2,496 K or 2,223 C. This calculated temperature is more than 800 C higher than the melting point of any metal alloy (L605 alloy or austenitic stainless steel alloys) that could be selected for the manufacture of cable 33. In addition, such high temperatures in electrical leads would result in significant thermal damage and the melting of plastic components with the tissue incision and retrieval assembly 12. Hence, the present disclosure specifies apparatus and methods that are essential for the conduction of constant current only through low-resistance electrically conductive paths that extends from the current source within circuit board assembly 184 to the location that the cable 33 is in sliding electrical contact with first, second, third and fourth electrically and thermally conductive eyelets 446, 450, 452 and 454, respectively.

By way of example, the low-resistance electrical current flow paths are seen in FIG. 17 as first and second electrically and thermally conductive leads 444 and 448, respectively, that extend between [a] first and second electrically and thermally conductive eyelets 446 and 450, respectively and [b] first proximal lead wire 114 with electrically insulative covering 115 and second proximal lead wire 116 with electrically insulative covering 117, respectively.

In a preferred embodiment and still referring to FIG. 17, first electrically and thermally conductive eyelet 446 and integral first electrically and thermally conductive lead 444 are fabricated using solid, substantially pure silver wire containing at least 99.5% silver and having a diameter of 0.008 to 0.012 inch. Likewise, in the same preferred embodiment, second electrically and thermally conductive eyelet 450 and integral second electrically and thermally conductive lead 448 are fabricated using solid, substantially pure silver wire containing at least 99.5% silver and having a diameter of 0.008 to 0.012 inch. The solid, substantially pure silver wire containing at least 99.5% silver that comprises first and second electrically and thermally conductive eyelets 446 and 450 as well as first and second electrically and thermally conductive leads 444 and 448 minimizes resistive heating while providing a thermally conductive path to withdraw heat that is transferred to the eyelets at point of contact with the resistively heated portions cutting and pursing cables 89 and 94, respectively. Another attribute of 99.5% pure silver wire is its established biocompatibility.

Figure 12:
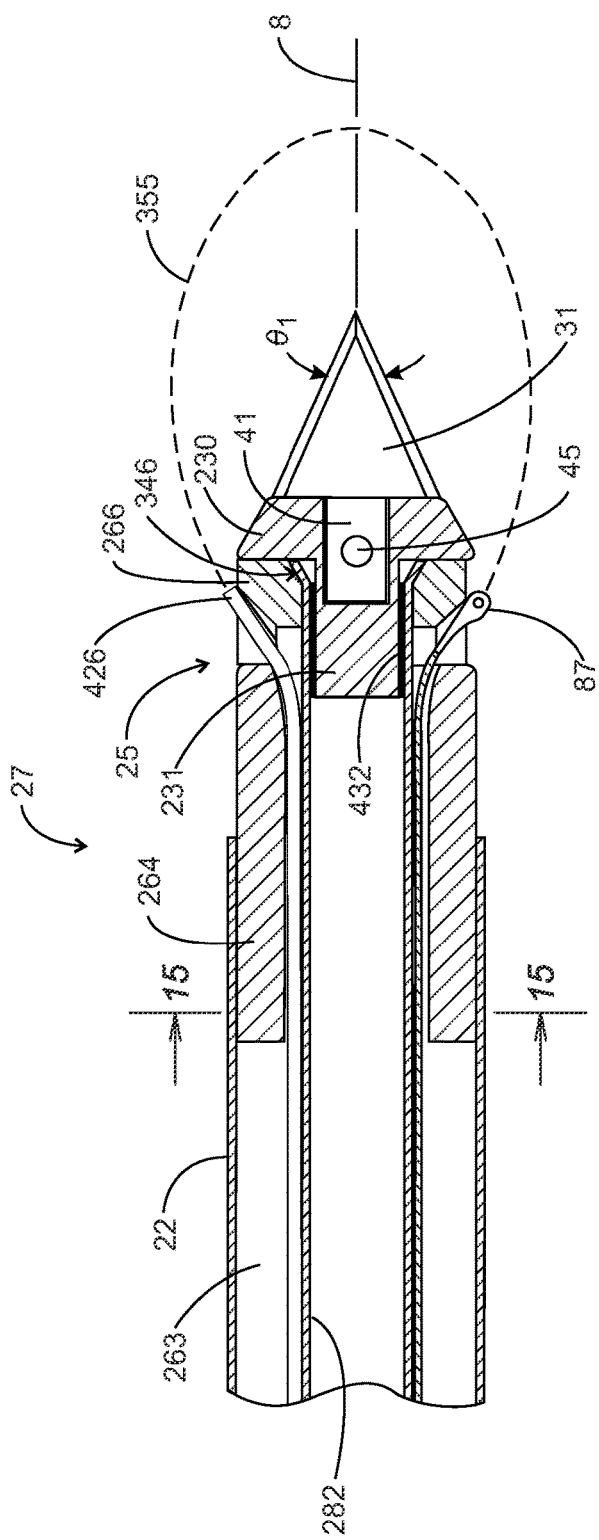
FIG. 12 is a partial sectional view of distal end of single-use tissue incision and retrieval assembly seen in FIG. 2.
Figure 26:
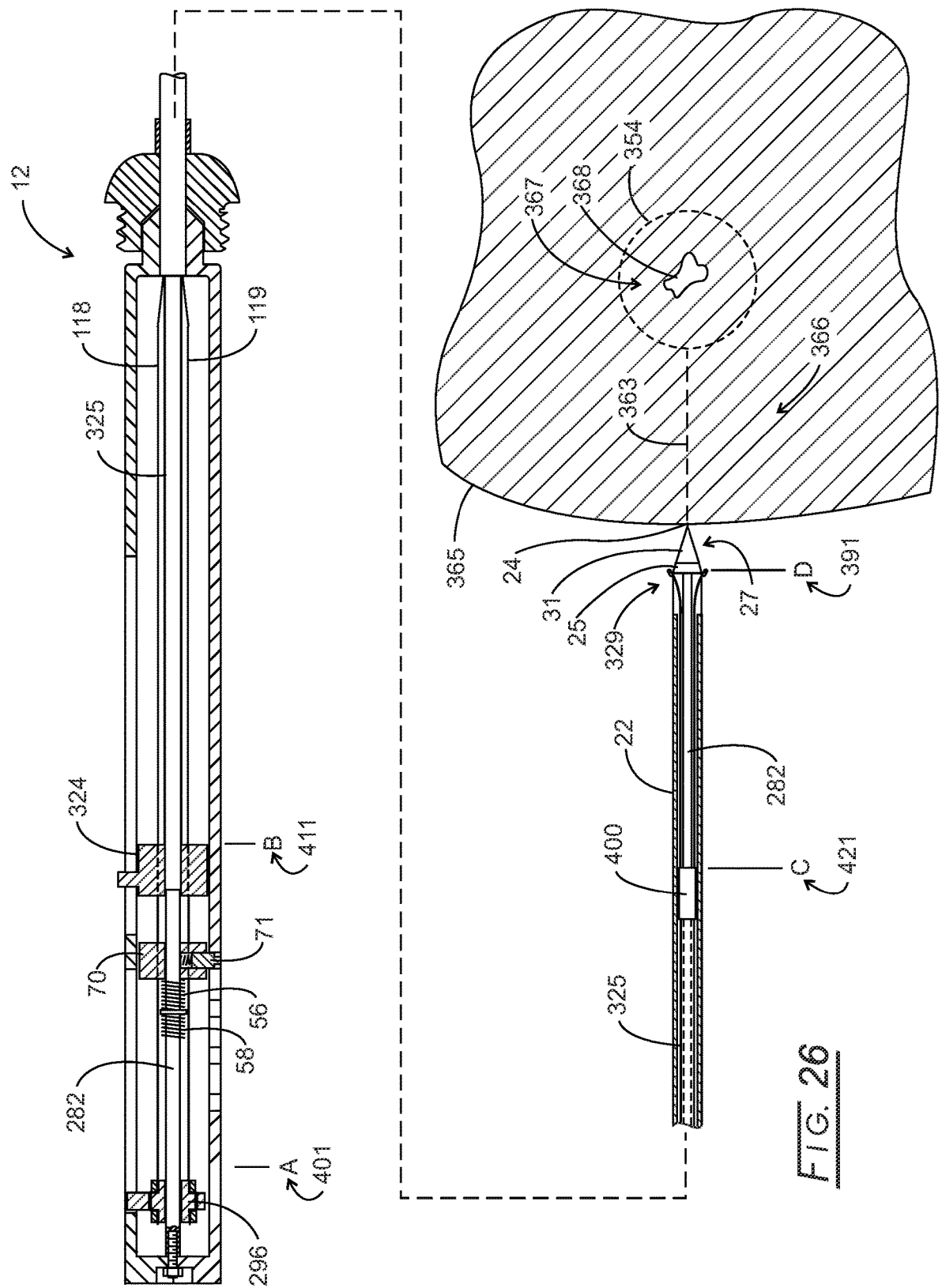
FIG. 26 is a sectional view of single-use tissue cutting and capture assembly seen in FIG. 2 showing positions of drive block, leaf member and extrusion assembly support member, cable mounting hub and cable mounting hub stop prior to insertion into tissue of patient and prior to deployment of tissue cutting and capture assembly.

Still referring to FIG. 17, the solid, substantially pure silver wire (containing at least 99.5% silver) that comprises first and second electrically and thermally conductive leads 444 and 448 extend through and along the full length of first and fourth lumens, 434a and 442a, respectively, of multi-lumen polymeric extrusion member 420a. By way of example, a preferred elastomer for the multi-lumen polymeric extrusion member 420a is Polyamide 12 (also known as Nylon 12) with a medical-grade extrusion resin known as Rilsamid MED Polyamide 12, having a modulus of elasticity of about $12 \times 10^6$ psi and manufactured by Foster Polymers (Putnam, Connecticut). The modulus of elasticity of the silver comprising first and second electrically and thermally conductive leads 444 and 448, being about $10.9 \times 10^6$ psi, adds to the column strength of the multi-lumen polymeric extrusion member 420a. The multi-lumen polymeric extrusion member 420a in combination with first and second electrically and thermally conductive leads 444 and 448 (in the form of solid, substantially pure silver wires) provides the required level of column strength to enable advancement of the first multi-lumen polymeric extrusion assembly 426 without buckling within the unsupported length between the leaf member and extrusion assembly support member and the cannula distal end assembly 25 as seen in FIGS. 12 and 26.

Referring now to FIGS. 9, 11 and 17, first and second proximal lead wires 114 and 116 are preferably flexible, multi-strand, electrically conductive 28-gauge copper wires with an electrically insulative covering 115 and 117, respectively (e.g., polyvinyl chloride insulative covering). The first and second proximal lead wires 114 and 116 extend from the proximal end of the first and second electrically and thermally conductive leads 444 and 448 to first and second electrical contacts 120 and 122 located on the right side and left side, respectively, of single-use support housing 100 as seen earlier in FIG. 8. The first and second contacts 120 and 122 in combination with first and second proximal lead wires 114 and 116, respectively and first and second electrically and thermally conductive leads 444 and 448, respectively, provide electrical current flow paths 399w and 399y, respectively. The electrical current flow paths 399w and 399y represent the pathways within the single-use support housing that supply constant current from constant current source 247 located on circuit board assembly 184 to first and second electrically and thermally conductive eyelets 446 and 450, respectively.

As seen in FIGS. 9, 11 and 17, constant current supplied to first and second electrically and thermally conductive eyelets 446 and 450 that are in electrical communication with first and sixth resistively heated portions of cutting and pursing cables 89 and 94, respectively, through the sliding electrical contact at the interface between each the eyelet and respective resistively heated portion of cutting and pursing cable seen at the distal end of first multi-lumen polymeric extrusion assembly 426 as seen in FIGS. 11 and 17. The interface between [a] first and second electrically and thermally conductive eyelets 446 and 450 and [b] first and sixth resistively heated portions of cutting and pursing cables 89 and 94, respectively, is seen in FIG. 11 at first and second transition boundaries, 396 and 406, respectively. The first and second transition boundaries, 396 and 406 designate the locations at which constant current begins to flow in the resistively heated portions of cutting and pursing cables 89 and 94, respectively, as the cables extend distally to first and second electrically and thermally conductive eyelets 446 and 450, respectively.

Referring now to FIGS. 9, 11, 11A and 21, the flow of constant current in the resistively heated portions of cutting and pursing cables 89-94 is illustrated as first, second and third electrical current flow path segments 399a, 399b and 399c. As seen in the end view at various stages of deployment of tissue capture basket 326 in FIGS. 9 and 11, first electrical current flow path 399a continues from first electrically and thermally conductive eyelet 446 (located at distal end of first multi-lumen polymeric extrusion assembly 426) through first resistively heated portion of cutting and pursing cable 89 that is secured (e.g., knotted) at eyelet 327a of first leaf member 86. First electrical current flow path 399a continues from eyelet 327a of first leaf member 86 through second resistively heated portion of cutting and pursing cable 90 to third electrically and thermally conductive eyelet 452 (located at distal end of second multi-lumen polymeric extrusion assembly 428). At the third electrically and thermally conductive eyelet 452, sliding electrical contact between second resistively heated portion of cutting and pursing cable 90 and third electrically and thermally conductive eyelet 452 at third transition boundary 407 allows electrical current flow path 399a to continue through eyelet 452 to fourth transition boundary 408 and into third resistively heated portion of cutting and pursing cable 91 resulting in the beginning of second electrical current flow path 399b as seen in FIG. 11A. Electrical current flow path 399b begins at the point of sliding electrical contact between third resistively heated portion of cutting and pursing cable 91 and third electrically and thermally conductive eyelet 452 and designated as fourth transition boundary 408 at which electrical contact location current begins to flow in resistively heated portion of cutting and pursing cable 91 as seen in FIG. 11A.

Referring now to FIGS. 9, 11, 11B and 21, as seen in the end view at various stages of deployment of tissue capture basket 326 in FIG. 9, second electrical current flow path 399b continues from third electrically and thermally conductive eyelet 452 (located at distal end of second multi-lumen polymeric extrusion assembly 428) through third resistively heated portion of cutting and pursing cable 91 that is secured (e.g., knotted) at eyelet 327b of second leaf member 87. Second electrical current flow path 399b continues from eyelet 327b of second leaf member 87 through fourth resistively heated portion of cutting and pursing cable 92 to fourth electrically and thermally conductive eyelet 454 (located at distal end of third multi-lumen polymeric extrusion assembly 430). At the fourth electrically and thermally conductive eyelet 454, sliding electrical contact between fourth resistively heated portion of cutting and pursing cable 92 and fourth electrically and thermally conductive eyelet 454 at fifth transition boundary 409 allows electrical current flow path 399b to continue through fourth electrically and thermally conductive eyelet 454 to sixth transition boundary 410 and into fifth resistively heated portion of cutting and pursing cable 93 resulting in the beginning of third electrical current flow path 399c as seen in FIG. 11B. Electrical current flow path 399c begins at the point of sliding electrical contact between fifth resistively heated portion of cutting and pursing cable 93 and fourth electrically and thermally conductive eyelet 454 and designated as sixth transition boundary 410 at which electrical contact location current begins to flow in resistively heated portion of cutting and pursing cable 93 as seen in FIG. 11B.

Still referring now to FIGS. 9, 11, 11B and 21, as seen in the end view at various stages of deployment of tissue capture basket 326 in FIG. 9, third electrical current flow path 399*c* continues from fourth electrically and thermally conductive eyelet 454 (located at distal end of second multi-lumen polymeric extrusion assembly 430) through fifth resistively heated portion of cutting and pursing cable 93 that is secured (e.g., knotted) at eyelet 327*c* of third leaf member 88. Third electrical current flow path 399*c* continues from eyelet 327*c* of third leaf member 88 through sixth resistively heated portion of cutting and pursing cable 94 to second electrically and thermally conductive eyelet 450 (located at distal end of third multi-lumen polymeric extrusion assembly 426) as seen in FIG. 11. At the second electrically and thermally conductive eyelet 450, sliding electrical contact between sixth resistively heated portion of cutting and pursing cable 94 and second electrically and thermally conductive eyelet 450 at second transition boundary 406 allows electrical current flow path 399*c* to continue through second electrically and thermally conductive eyelet 450 and into second electrically and thermally conductive lead 448 resulting in the beginning of sixth electrical current flow path 399*y* as seen in FIGS. 11 and 17. Electrical current flow path 399*y* begins at the point of sliding electrical contact between sixth resistively heated portion of cutting and pursing cable 94 and second electrically and thermally conductive eyelet 450 and designated as sixth transition boundary 406 at which electrical contact location current begins to flow in second electrically and thermally conductive lead 448 as seen in FIGS. 11 and 17.

Returning to FIGS. 4, 6, 8 and 9 in combination with FIGS. 12, 20, 21 and 26-28, the discourse that follows specifies the method of deploying [a] first, second and third leaf members 86, 87 and 88, respectively, [b] first, second and third multi-lumen polymeric extrusion assemblies 426, 428 and 430, respectively and [c] first through sixth resistively heated portions of cutting and pursing cables 89-94, respectively, the latter being supported at the distal ends of the leaf members and extrusion members as described earlier with regard to FIGS. 11, 11A, 11B, 17, 18 and 18A. Referring first to FIG. 4, axially displaceable drive assembly drive member 324 and cable mounting hub 296 disposed within single-use support housing 100 are slideably disposed on support tube 282 that is aligned with longitudinal axis 8 as seen in FIG. 2. By way of example, the proximal end of support tube 282 may be secured to the proximal end face 64 of single-use support housing 100 by the combination of threaded rod 177 swaged within the proximal end of support tube 282 and support tube tensioning nut 63 as seen in FIGS. 4 and 6. As seen in FIGS. 4, 8 and 12, support tube 282 extends the full length, L6 of single-use support housing 100 beginning at the proximal end face 64 of single-use support housing 100 and ending at tip component 266 at the distal end of delivery cannula 22. By way of example, support tube 282 may be drawn and welded stainless steel 304 tubing with an outside diameter of 0.083 inch, inside diameter of 0.063 inch and available from Vita Needle Company (Needham, Massachusetts). By way of further example, the distal end of support tube 282 may be deformed resulting in flared end 346 that retains tip component 266 as seen in FIG. 12.

As specified earlier in this disclosure with reference to FIGS. 3 and 4, drive assembly drive member 324 is advanced forwardly by the drive finger 185 extending from translation nut 182 as it is driven forward by motor-activated drive tube drive member translation assembly 180. As seen in FIG. 3, motor-activated drive tube drive member translation assembly 180 disposed within handpiece 15 is comprised of motor and planetary gear train assembly 170, flexible metallic bellows-shaped coupler 174, lead screw 176, translation nut 182 and thrust bearing 171.

Referring now to FIGS. 4, 5, 20, 21 and 26, as drive assembly drive member 324 is driven forward, drive tube 325, secured to drive assembly drive member 324, induces corresponding and proportionate axial forward displacement of leaf member and extrusion assembly support member 347. By way of example, drive tube 325 may be drawn and welded stainless steel 304 tubing with an outside diameter of 0.109 inch, inside diameter of 0.095 inch and available from Vita Needle Company (Needham, Massachusetts). As seen in FIG. 20, the distal end of drive tube 325 is received in circular opening at proximal end of leaf member and extrusion assembly support member 347 to effect forward corresponding advancement of leaf member and extrusion assembly support member 347 as drive tube 325 is advanced forwardly by motor-activated drive tube drive member translation assembly 180. As seen in FIGS. 20A and 21, [a] first, second and third leaf members 86, 87 and 88, respectively and [b] first, second and third multi-lumen polymeric extrusion assemblies 426, 428 and 430, respectively, are alternately disposed on the perimeter of leaf member and extrusion assembly support member 347. By way of example, leaf member and extrusion assembly support member 347 may be an electrically insulative, commonly injection-molded polymer such as polycarbonate. The first, second and third leaf members 86, 87 and 88, respectively, may be adhesively bonded within first, second and third leaf member support cavities 315*a*, 315*b* and 315*c*, respectively, using an adhesive such as cyanoacrylate. The first, second and third multi-lumen polymeric extrusion assemblies 426, 428 and 430, respectively, may be adhesively bonded within first, second and third cable conduit assembly cavities 317*a*, 317*b* and 317*c*, respectively, as seen in FIG. 20A, using an adhesive such as cyanoacrylate.

As seen in FIGS. 16 and 21, retaining member 349 is included within each leaf member support cavity 315 that matches corresponding leaf member retaining notch 361 to ensure secure attachment between leaf members 86-88 and leaf member and extrusion assembly support member 347. The retaining member 349 present in each first, second and third leaf member support cavities 315*a*, 315*b* and 315*c* ensures that the adhesive bond between first, second and third leaf members 86, 87 and 88, respectively and leaf member and extrusion assembly support member 347 can withstand the longitudinal forces required to withdraw first, second and third leaf members 86, 87 and 88, respectively, through the cannula distal end assembly 25 during the assembly process, as seen in FIG. 12.

By way of example, first, second and third leaf members 86, 87 and 88, respectively, may be electro-chemically machined from a thin stainless steel sheet (e.g., full-hard stainless steel Type 304) having a thickness, t1 of about 0.002 inch to 0.005 inch. The first, second and third leaf members 86, 87 and 88, respectively, are identical in thickness and shape, having a widthwise extent, $W_3$ of about 0.060 inch to 0.080 inch and lengthwise extent, L9 as shown in FIG. 16 for first leaf member 86. The first, second and third leaf members 86, 87 and 88 are covered by a thin, electrically insulative coating (e.g., chemically vapor deposited Parylene HT applied by Specialty Coating Systems, Indianapolis, Indiana). The preferred Parylene HT electrically insulative coating is capable of withstanding temperatures of up to at least 400 C and prevents unwanted electrical current flow between the leaf members during the application of electrical power. Preferably, the thickness of the electrically insulative coating applied to all exterior surfaces of the first, second and third leaf members leaf members, 86, 87 and 88, respectively, is in the range from 0.00015 inch to 0.0005 inch, preferably about 0.0002 inch.

Figure 10:
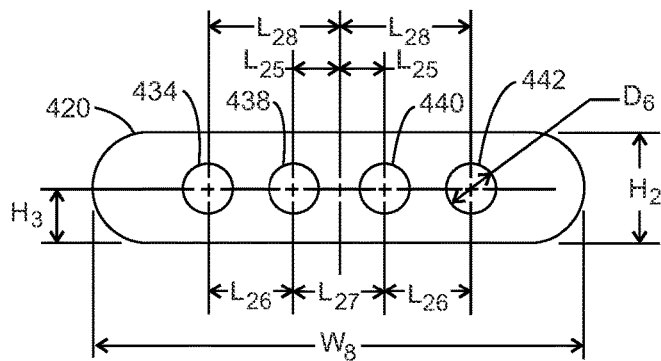
FIG. 10 is a sectional view taken through a multi-lumen polymeric extrusion shown in FIG. 9.

Referring now to FIGS. 10, 12, 15, 15A, 15B, 15C and 21, the leaf member and multi-lumen polymeric extrusion assembly 400 is shown in greater detail in cross-section form at the forward region of cannula 27. A detailed cross-sectional view of multi-lumen polymeric extrusion member 420 is seen in FIG. 10 including dimensional references for first, second, third and fourth lumens 434, 438, 440 and 442, respectively, as well as the distance between the lumens and the overall dimensions of the multi-lumen extrusion member 420. In a preferred embodiment, multi-lumen polymeric extrusion member 420 an extruded polymer such as Polyamide 12 (also known as Nylon 12). By way of example, the polymer may be a medical-grade extrusion resin known as Rilsamid MED Polyamide 12, having a modulus of elasticity of about $12 \times 10^6$ psi and manufactured by Foster Polymers (Putnam, Connecticut). By way of example, multi-lumen extrusion member 420 seen in FIG. 10 was extruded by Nordson Medical, Design and Development LLC located in Marlborough, Massachusetts.

Still referring to FIG. 15 that represents the cross-sectional view as seen in FIG. 12, first, second and third leaf members 86, 87 and 88, respectively, alternating with first, second and third multi-lumen polymeric extrusion assemblies 426, 428 and 430, respectively, are slideably disposed within the annular space defined by the exterior surface of support tube 282 and the interior surface of confinement sleeve tip 264. As seen in FIGS. 12 and 15, the proximal end of confinement sleeve tip 264 is inserted within and supported by the distal end of delivery cannula 22. By way of example, delivery cannula 22 may be stainless steel 304 tubing having an outside diameter of 0.259 inch and inside diameter of 0.238 inch and commercially available from the Vita Needle Company (Needham, Massachusetts). Also, by way of example, confinement sleeve tip 264 may be injection molded using a polymer such as polycarbonate. As seen in FIGS. 12, 22 and 23, tip component 266 may be injection molded using a polymer such as polycarbonate or may alternatively be a powder metal injection molded component.

As seen in FIGS. 15 and 15A, the first and sixth tensionable portions of cutting and pursing cables 118 and 119 are slideably disposed within the interior of first multi-lumen polymeric extrusion assembly 426 at second and third lumens 438a and 440a, respectively, within multi-lumen polymeric extrusion member 420a. Also, first and second electrically and thermally conductive leads 444 and 448, respectively, are located within the interior of first multi-lumen polymeric extrusion assembly 426 at first and fourth lumens 434a and 442a, respectively, within multi-lumen polymeric extrusion member 420a.

Likewise, as seen in FIGS. 15 and 15B, the second and third tensionable portions of cutting and pursing cables 19 and 23 are slideably disposed within the interior of second multi-lumen polymeric extrusion assembly 428 at second and third lumens 438b and 440b, respectively, within multi-lumen polymeric extrusion member 420b. Also, first and second legs of electrically and thermally conductive wires 460 and 462, respectively, that support third eyelet 452 (as seen in FIG. 11A) are located within the interior of second multi-lumen polymeric extrusion assembly 428 at first and fourth lumens 434b and 442b, respectively, within multi-lumen polymeric extrusion member 420b.

Likewise, as seen in FIGS. 15 and 15C, the fourth and fifth tensionable portions of cutting and pursing cables 29 and 30 are slideably disposed within the interior of third multi-lumen polymeric extrusion assembly 430 at second and third lumens 438c and 440c, respectively, within multi-lumen polymeric extrusion member 420c. Also, third and fourth legs of electrically and thermally conductive wires 464 and 466, respectively, that support fourth eyelet 454 (as seen in FIG. 11B) are located within the interior of third multi-lumen polymeric extrusion assembly 430 at first and fourth lumens 434c and 442c, respectively, within multi-lumen polymeric extrusion member 420c.

Referring to the cross-sectional view in FIG. 12, wherein only leaf member 87 and multi-lumen polymeric extrusion member 426 are seen, as first, second and third leaf members 86, 87 and 88, respectively (as seen in perspective view in FIG. 21 and cross sectional view in FIG. 15) in combination with first, second and third multi-lumen polymeric extrusion members 426, 428 and 430, respectively (as seen in perspective view in FIG. 21 and cross sectional view in FIG. 15) are advanced within interior channel 263 of delivery cannula 22 by the previously specified motor-activated drive tube drive member translation assembly 180 (as seen in FIG. 3), the distal ends of the three leaf members and the three multi-lumen polymeric extrusion members follow a locus of movement line 355. The completion of advancement of as first, second and third leaf members 86, 87 and 88, respectively, in combination with first, second and third multi-lumen polymeric extrusion members 426, 428 and 430, respectively, along the locus of movement line 355 defines the tissue capture basket 326 seen in FIG. 25 as well as the incised target tissue volume 354 located within the tissue capture basket 326. Alternatively, as seen in FIG. 12, the locus of movement line 355 defining tissue capture basket 326 can be seen in the end view of the tissue capture basket 326 in FIG. 9 at four different stages of expansion. The four different stages of expansion seen in FIG. 9 are the result of the advancement of the first, second and third leaf members 86, 87 and 88, respectively, along with first, second and third multi-lumen polymeric extrusion members 426, 428 and 430, respectively. Upon achieving the fourth and maximum stage of expansion, the tissue capture basket 326 begins to contract and continues through the three stages in reverse order (viz., stages labeled with suffixes c, b and a).

In a preferred construction of the tissue incision and retrieval assembly 12 of the present disclosure, first, second and third individual cables 33a, 33b and 33c of equal length (seen in cross-sectional view in FIG. 9A) comprise the first through sixth tensioning portions of cutting and pursing cables 118, 19, 23, 29, 30 and 119, respectively and the first through sixth resistively heated portions of cutting and pursing cables 89-94, respectively. In this preferred construction, as seen in FIG. 9, the first, second and third leaf members 86, 87 and 88, respectively, alternate with first, second and third multi-lumen polymeric extrusion assemblies 426, 428 and 430, respectively, to form a hexagonal-shaped tissue capture basket 326 at each stage of expansion and contraction of the distal ends of the leaf members and multi-lumen polymeric extrusion assemblies. Hereinafter, this alternative construction is referred to a "six-cable tissue excision and extraction system".

In the discourse that follows, reference is made to first, second and third individual cables 33a, 33b and 33c. Although first, second and third individual cables 33a, 33b and 33c are not shown, their constituent first, second and third tensioning portions of the cutting and pursing cables and/or first, second and third resistively heated portions of cutting and pursing cable are shown.

For example and referring to FIGS. 4, 9, 17, 18, 18A 19, first individual and cable 33a comprises, sequentially, first tensioning portion of cutting and pursing cable 118, first and second resistively heated portions of cutting and pursing cables 89 and 90, respectively and second tensioning portion of cutting and pursing cable 19. The first individual cable 33a begins the first tensioning portion of cutting and pursing cable 118 starting at electrically insulative cable mounting hub 296 (secured by first and second electrically insulative sleeves 284 and 286 as seen in FIG. 19) that is located at the proximal end of single-use support housing 100, continues forwardly to enter lumen 438a at proximal end of first multi-lumen polymeric extrusion assembly 426 to enter through aperture of first electrically and thermally conductive eyelet 446. Beyond first electrically and thermally conductive eyelet 446, first individual cable 33a continues to the eyelet 327a of first leaf member 86 as first resistively heated portion of cutting and pursing cable 89 as seen in FIG. 9. Beyond eyelet 327a of first leaf member 86, first individual cable 33a continues as second resistively heated portion of cutting and pursing cable 90 (as seen in FIG. 9) until first individual cable 33a reaches the aperture of third electrically and thermally conductive eyelet 452 (as seen in FIG. 18). Beyond third electrically and thermally conductive eyelet 452, first individual cable 33a continues through lumen 438b along the full length of second multi-lumen polymeric extrusion assembly 428 and continues as second tensionable portion of cutting and pursing cable 19 until it terminates at electrically insulative cable mounting hub 296 (secured by first and second electrically insulative sleeves 284 and 286 as seen in FIG. 19), the cable mounting hub 296 located at the proximal end of single-use support housing 100.

In like manner and referring now to FIGS. 4, 9, 18, 18A and 19, second individual cable 33b comprises, sequentially, third tensioning portion of cutting and pursing cable 23, third and fourth resistively heated portions of cutting and pursing cables 91 and 92, respectively and fourth tensioning portion of cutting and pursing cable 29. The second individual cable 33b begins the first tensioning portion of cutting and pursing cable 23 starting at electrically insulative cable mounting hub 296 (secured by first and second electrically insulative sleeves 284 and 286 as seen in FIG. 19) that is located at the proximal end of single-use support housing 100, continues forwardly to enter lumen 440b at proximal end of second multi-lumen polymeric extrusion assembly 428 to enter through aperture of third electrically and thermally conductive eyelet 452. Beyond third electrically and thermally conductive eyelet 452, the second individual cable 33b continues to the eyelet 327b of second leaf member 87 as third resistively heated portion of cutting and pursing cable 91 as seen in FIGS. 9 and 18. Beyond eyelet 327b of second leaf member 87, second individual cable 33b continues as fourth resistively heated portion of cutting and pursing cable 92 (as seen in FIG. 9) until second individual cable 33b reaches the aperture of fourth electrically and thermally conductive eyelet 454 (as seen in FIG. 18A). Beyond fourth electrically and thermally conductive eyelet 454, second individual cable 33b continues through lumen 438c along the full length of third multi-lumen polymeric extrusion assembly 430 and continues as fourth tensionable portion of cutting and pursing cable 29 until it terminates at electrically insulative cable mounting hub 296 (secured by first and second electrically insulative sleeves 284 and 286 as seen in FIG. 19), the cable mounting hub 296 located at the proximal end of single-use support housing 100.

In like manner and referring now to FIGS. 4, 9, 17, 18A and 19, third individual cable 33c comprises, sequentially, fifth tensioning portion of cutting and pursing cable 30, fifth and sixth resistively heated portions of cutting and pursing cables 93 and 94, respectively and sixth tensioning portion of cutting and pursing cable 119. The third individual cable 33c begins the first tensioning portion of cutting and pursing cable 30 starting at electrically insulative cable mounting hub 296 (secured by first and second electrically insulative sleeves 284 and 286 as seen in FIG. 19) that is located at the proximal end of single-use support housing 100, continues forwardly to enter lumen 440c at proximal end of third multi-lumen polymeric extrusion assembly 430 to enter through aperture of third electrically and thermally conductive eyelet 454. Beyond third electrically and thermally conductive eyelet 454, the third individual cable 33c continues to the eyelet 327c of third leaf member 88 as fifth resistively heated portion of cutting and pursing cable 93 as seen in FIGS. 9 and 18A. Beyond eyelet 327c of third leaf member 87, third individual cable 33c continues as sixth resistively heated portion of cutting and pursing cable 94 (as seen in FIGS. 9 and 17) until third individual cable 33c reaches the aperture of second electrically and thermally conductive eyelet 450 (as seen in FIG. 17). Beyond second electrically and thermally conductive eyelet 450, third individual cable 33c continues through lumen 440a along the full length of first multi-lumen polymeric extrusion assembly 426 and continues as sixth tensionable portion of cutting and pursing cable 119 until it terminates at electrically insulative cable mounting hub 296 (secured by first and second electrically insulative sleeves 284 and 286 as seen in FIG. 19), the cable mounting hub 296 located at the proximal end of single-use support housing 100.

By way of example and without limitation, one alternative construction of the tissue incision and retrieval assembly 12 of the present disclosure, first and second individual cables 33a and 33b of equal length comprise the first through fourth tensioning portions of cutting and pursing cables and first through fourth resistively heated portions of cutting and pursing cables. In this alternative construction, first and second leaf members alternate with first and second multi-lumen polymeric extrusion assemblies to form a square-shaped tissue capture basket at each stage of expansion and contraction of the distal ends of the leaf members and multi-lumen polymeric extrusion assemblies. Hereinafter, this alternative construction is referred to a "four-cable tissue excision and extraction system". Other than comprising only two leaf members (in place of three) and two multi-lumen polymeric extrusion assemblies (in place of three) as described above for the preferred six-cable tissue excision and extraction system, the construction of the four-cable tissue excision and extraction system is similar to that described in the preceding paragraphs for the preferred embodiment.

Turning briefly to FIGS. 12-14 and 25, surgically sharp blade 31 is seen mounted within blade support 230 and secured at base of blade support 231 with locking pin 45 that extends through a mounting hole 47 located on either side of base of blade support 231 as well as blade shank hole 43 located in shank of blade 41. As seen earlier with regard to tissue incision and retrieval system 10 seen in FIG. 1, surgically sharp blade 31 is mounted at forward end of cannula 27 to enable the advancement of delivery cannula 22 through soft tissue through incision of the soft tissue, the advancement proceeding along the line of the longitudinal axis 8 of delivery cannula 22 in order that cannula distal end assembly 25 is in confronting adjacency to target tissue volume 354 as seen in FIG. 25.

Figure 14:
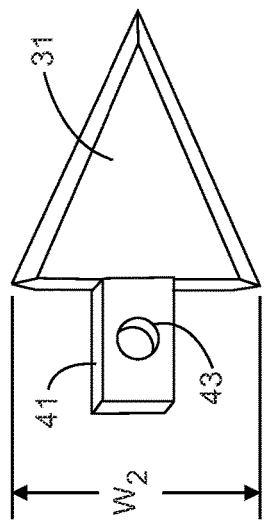
FIG. 14 is a perspective view of blade seen in FIGS. 12 and 13.
Figure 13:
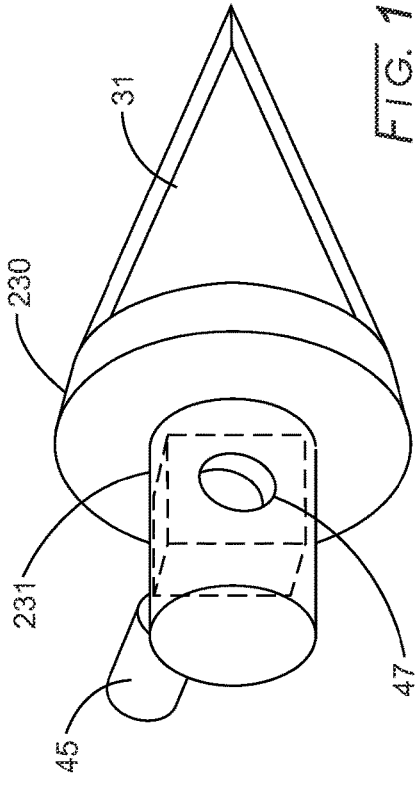
FIG. 13 is a perspective and exploded view of tip of single-use tissue incision and retrieval assembly seen in FIG. 2.

By way of example, surgically sharp blade 31 seen in FIG. 14 may be manufactured by stamping unsharpened blade blanks similar to profile seen in FIG. 14. The stamping is used to form blade blanks from unhardened or annealed stainless steels sheets such as martensitic stainless steel 420 or GIN-5 stainless steel available from Hitachi Metals America, Ltd. (Arlington Heights, Illinois). Following stamping operation, blade blanks are heat treated to a hardness level of preferably at least 55 Rockwell C scale. The stainless steel sheets preferably have a thickness in the range from 0.020 to 0.030 inch. Following heat treatment and hardening of blade blanks, the blade blanks are sharpened using mechanical grinding and honing processes and/or electrochemical sharpening and honing.

By way of example and returning to FIGS. 12 and 13, tip component 266 may be manufactured by injection molding a high-strength polymeric material such as polyetherimide (e.g., Ultem 1100 resin) commercially available from SABIC (Huntersville, North Carolina). Alternatively, tip component 266 seen in FIGS. 12 and 13 may be manufactured by metal injection molding (MIM) a material like stainless steel 304 or stainless steel 17-7PH to provide a tip component 266 having greater mechanical strength characteristics as compared with injection molded polymers.

Since the mechanism of cutting of tissue using an electrically heated wire or cable avoids any flow of electrical current into the adjacent tissue but rather only the conduction of heat into adjacent tissue during tissue cutting, the resulting depth of thermal injury at the surface of the captured tissue specimen is limited to less than about 0.001" to 0.002". In contrast, electrosurgical cutting of tissue with a wire or cable in prior art devices requires the flow of electrical current from the wire or cable into and through the tissue being incised wherein an electrical arc is formed in the gap between the wire or cable and the tissue as a result of application of a high voltage difference between the wire or cable and the tissue, typically at a level of greater than 1000 volts (peak-to-peak) at a frequency of at least 300 kHz. In the case of electrosurgical cutting to excise and capture a volume of tissue, as specified in U.S. Pat. No. 6,471,659 and incorporated herein by reference, the essential flow of electrical current into and through adjacent tissue to achieve tissue cutting may cause unwanted heating of adjacent tissue well beyond the path of cutting resulting in thermal damage to portions of the excised volume of captured tissue. The thermal damage to portions of the excised volume of captured tissue are disadvantageous in that the damaged portions of the captured tissue specimen, intended for subsequent examination by a pathologist, are compromised and limit the available portions of the capture tissue specimen suitable for such examination (e.g., assessment of the boundary between malignant and healthy tissue).

Referring to FIG. 26, a partial sectional view presented in connection with FIG. 8 is reproduced wherein tissue incision and retrieval assembly 12 is seen with blade 31 positioned at skin surface of patient 365 prior to advancement of delivery cannula 22 along its path of insertion 363. By way of example, the surgically sharp blade 31 attached to the cannula distal end assembly 25 is subsequently used to incise healthy tissue 366 during the advancement of delivery cannula 22 of tissue incision and retrieval assembly 12 along path of insertion 363. The advancement of delivery cannula 22 of tissue incision and retrieval assembly 12 may, by example, be performed by practitioner with the aid of real-time ultrasound imaging guidance, MRI guidance or stereotactic radiographic guidance (not shown) based on image-based detection of location of target lesion such as suspicious potentially malignant lesion 368 seen in FIG. 26.

As seen in FIG. 26A, the delivery cannula 22 of tissue incision and retrieval assembly 12 is advanced along path of insertion 363 (previously seen in FIG. 26) until the cannula distal end assembly 25 is just proximal and adjacent to target tissue volume 354 containing, for example, suspicious potentially malignant lesion 368. Once the cannula distal end assembly 25 of tissue incision and retrieval assembly 12 is just proximal and adjacent to target tissue volume 354, the incision of healthy tissue 366 and capture of target tissue volume 354 containing, for example, suspicious potentially malignant lesion 368, commences. As seen in FIG. 26A, cable mounting hub 296, drive assembly drive member 324 as well as leaf member and multi-lumen polymeric extrusion assembly 400 are shown in their initial positions A, B and C as seen at 401, 411 and 421, respectively. The initial positions A, B and C correspond to the positions of these component prior to the start of tissue cutting and capture after the tissue cutting and capture assembly 329 has been positioned adjacent to target tissue volume 354.

Figure 27:
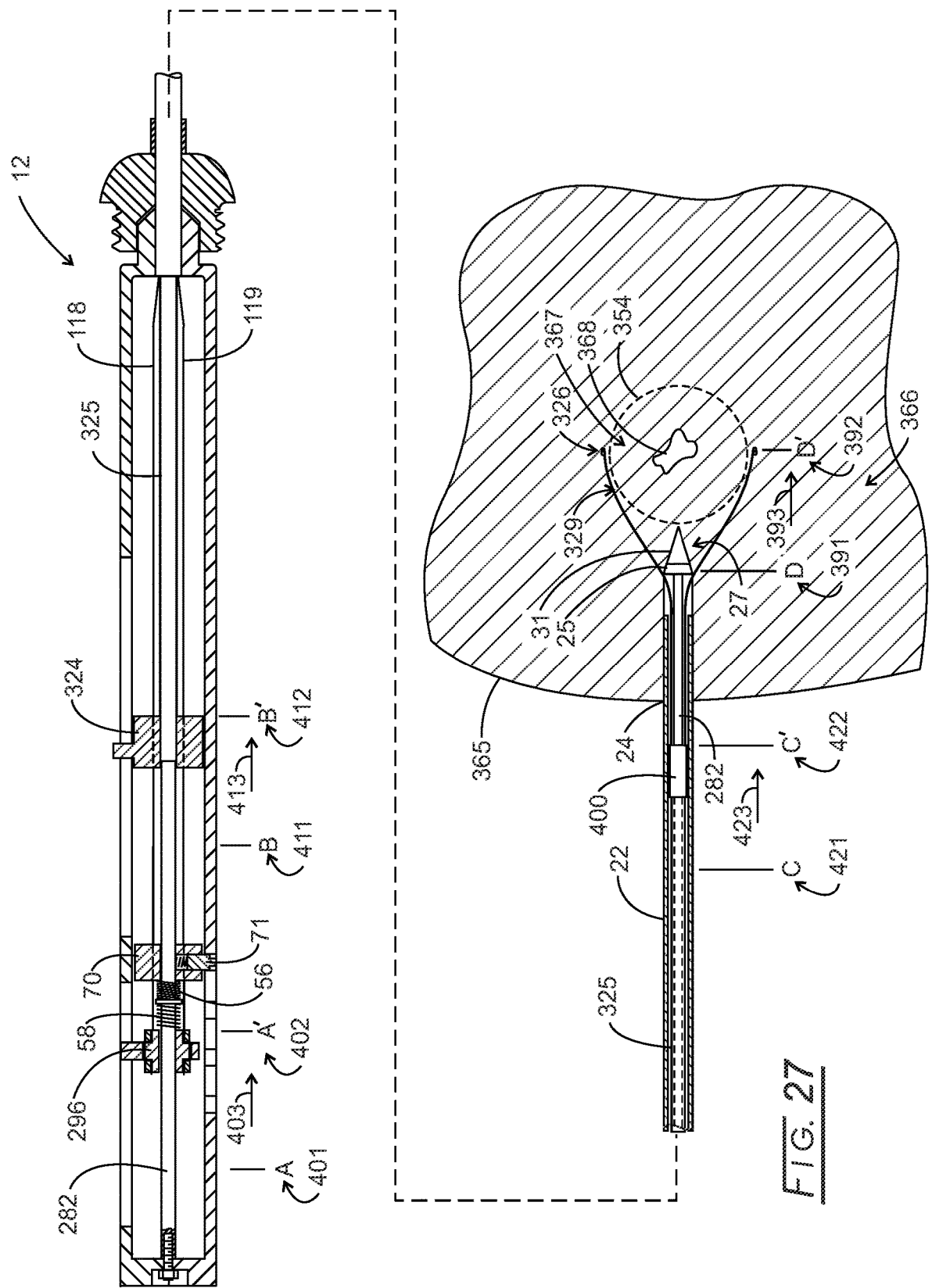
FIG. 27 is a sectional view of single-use tissue cutting and capture assembly seen in FIG. 2 showing positions of drive block, leaf member and extrusion assembly support member, cable mounting hub and cable mounting hub stop after insertion into tissue of patient adjacent to target tissue volume and at the maximum opening of tissue cutting and capture assembly.

Referring next to FIG. 27, a partial sectional view presented in connection with FIGS. 4 and 8 is reproduced wherein, following commencement of the tissue cutting and capture process as described above, drive finger 185 mounted on translation nut 182 advances the position of the drive assembly drive member 324 from position B to position B' as seen at 411 and 412, respectively, in the direction indicated by first movement direction of drive assembly drive member 324 as seen at arrow 413. The advancement of the position of the drive assembly drive member 324 from position B to position B' as seen at 411 and 412, respectively, and associated advancement of drive tube 325 induces the advancement of leaf member and multi-lumen polymeric extrusion assembly 400 from position C to position C' as seen at 421 and 422, respectively, indicated by first movement direction of leaf member and multi-lumen polymeric extrusion assembly 400 as seen at arrow 423. In addition, the advancement of the position of the drive assembly drive member 324 from position B to position B' as seen at 411 and 412, respectively, induces the advancement of electrically insulative cable mounting hub 296 from position A to A' as seen at 401 and 402, respectively, as indicated by first movement direction of cable mounting hub 403 as a result of the associated advancement of the first through sixth tensionable portions of cutting and pursing cables 118, 19, 23, 29, 30 and 119, respectively, that are secured to the cable mounting hub 296 by first and second electrically insulative sleeves 284 and 286 as seen in FIG. 19 and discussed previously.

Referring now to FIGS. 9, 21, 26A and 27, tissue cutting and capture assembly 329 has advanced from it its initial position D within cannula distal end assembly 25 to a partially tissue capture basket 326 at a position D' representing the maximum opening of the tissue cutting and capture assembly 329 as seen at 391 and 392, respectively, as indicated by first movement direction arrow 393.

Referring now to FIGS. 4, 6 and 27, at the position at which cable mounting hub 296 abuts and is direct contact with first and second compression springs 56 and 58, respectively, that abut electrically insulative cable mounting hub stop 70. Upon cable mounting hub 296 advancing to the position of first and second compression springs 56 and 58 that abut electrically insulative cable mounting hub stop 70, first through sixth tensioning portions of cutting and pursing cables 118, 19, 23, 29, 30 and 119, respectively, become taught (i.e., apply tension to the distal ends of the first, second and third leaf members 86, 87 and 88 as well as the distal ends of multi-lumen polymeric extrusion assemblies 426, 428 and 430, respectively) thereby initiating the process of pursing down the deployed tissue basket 326.

Figure 28:
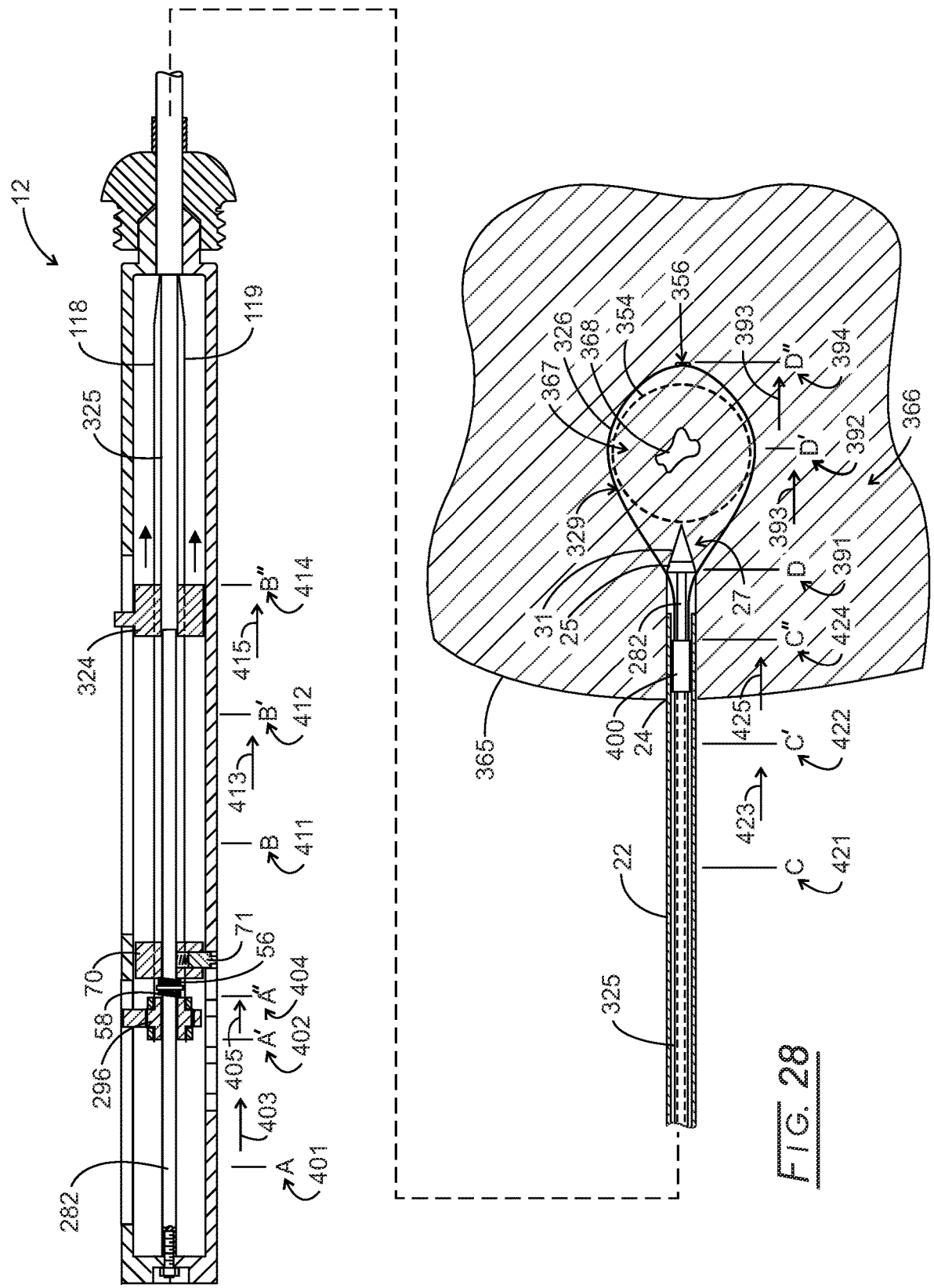
FIG. 28 is a sectional view of single-use tissue cutting and capture assembly seen in FIG. 2 showing positions of drive block, leaf member and extrusion assembly support member, cable mounting hub and cable mounting hub stop after insertion into tissue of patient adjacent to target tissue volume and at the completion of deployment and purse down of tissue cutting and capture assembly.

Referring next to FIGS. 3, 4, 6 and 28, a partial sectional view presented in connection with FIG. 8 is reproduced wherein, following attainment of the maximum opening of the tissue cutting and capture assembly 329, drive finger 185 mounted on translation nut 182 continues to advance the position of the drive assembly drive member 324 from position B' to position B" as seen at 412 and 414, respectively, in the direction indicated by second movement direction of drive assembly drive member 324 as seen at arrow 415. Once the maximum opening of the capture basket has been attained as seen at position D' in FIG. 27 as defined by first through sixth tensioning cables 118, 19, 23, 29, 30 and 119, respectively, becoming taught, then the combination of the further advancement of drive assembly drive member 324 from position B' to position B" as seen at 412 and 414, respectively and the associated advancement of leaf member and multi-lumen polymeric extrusion assembly 400 from C' to position C" as seen at 422 to 424, respectively, causes the pursing down of tissue cutting and capture assembly 329 until a single pursed down point 356 is reached. In a preferred embodiment, constant current supply 247 within circuit board assembly 184 continuously measures voltage difference between first and second constant current connector pins 51 and 53, respectively. A measured voltage difference between the first and second constant current connector pins 51 and 53, respectively, that is below a pre-selected lower limit value (e.g., 2.0 volts) indicates that the distal ends of leaf members and distal ends of multi-lumen polymeric extrusion assemblies have been pursed down to the maximum possible extent as illustrated in FIG. 28 at single purse down point 356. Once the measured voltage decreases below a pre-selected lower limit value, the application of constant current being applied to the first through sixth resistively heated portions of cutting and pursing cables 89-94, respectively, ends and the tissue incision and capture process is determined to be complete and capture "Complete" indicator light 52 is illuminated on handpiece assembly 15 as described earlier with regard to FIG. 1. Simultaneously, the voltage applied to motor 170a ends. Also simultaneously, the audible tone being generated by speaker 200 within circuit board assembly 184 of internal energy source and control system 181, as seen in FIG. 3, to alert the operator that constant current is being applied is discontinued.

A seen in FIG. 28, the advancement and purse down of tissue cutting and capture assembly 329 circumscribes the target tissue volume 354 containing, for example, suspicious potentially malignant lesion 368. Preferably, the region between the perimeter surface of the suspicious potentially malignant lesion 368 and the circumscribing boundary of target tissue volume 354 contains a margin or boundary layer of healthy tissue 367. The first, second and third leaf members 86, 87 and 88, respectively, in combination with first, second and third multi-lumen polymeric extrusion assemblies 426, 428 and 430, respectively, secured at their distal ends at a single purse down point 356 envelop and retain target tissue volume 354 within tissue capture basket 326 so that delivery cannula and retained target tissue volume can be withdrawn from the healthy tissue 366 of the patient following the same path of insertion 363 as seen in FIG. 26.

Returning to FIG. 28, once the tissue capture assembly 329 forming a basket around the contained target tissue volume 354 is withdrawn, a scissors or other cutting device may be used to cut one or more of the first through sixth resistively heated portions of cutting and pursing cable 89-94 at the single purse point 356 thereby allowing one or more of the first, second and third leaf members 86-88, respectively and one or more of the first, second and third multi-lumen polymeric extrusion members to open thereby releasing the captured target tissue volume 354 from the tissue cutting and capture assembly 329. Following the extraction of the target tissue volume 354 from the tissue cutting and capture assembly 329, the target tissue volume is placed in a specimen container, immersed in a volume of fixative agent such as 3.7% formaldehyde in water, the volume being at least ten times the volume of the specimen. The specimen remains in the fixative agent for a period preferably sufficient to ensure complete penetration of the target tissue volume 354. By way of example, duration of immersion in fixative agent may be about five hours or more depending on the size of the target tissue volume, the duration of immersion in the fixative agent increasing with the size of target tissue volume 354. Following fixation of the target tissue volume 354 it is typically sectioned for subsequent histomorphologic diagnosis by a pathologist. In this regard, see Hewitt, S., et. al., Tissue Handling and Specimen Preservation in Surgical Pathology. Archives of Pathology & Laboratory Medicine 2008; 132: 1929-1935.

As seen in FIG. 27, the fixed operator selectable position of electrically insulative cable mounting hub stop 70, as determined by the position of capture size selector 71, determines the extent of the enlargement of tissue capture basket 326. The extent of the enlargement of tissue capture basket 326 is also seen in the end view of the tissue capture basket 326 at the fourth and largest stage of enlargement of the first, second and third leaf members 86d, 87d and 88d, respectively, first, second and third multi-lumen polymeric extrusion members 426d, 428d and 430d, respectively, and first through sixth resistively heated portions of cutting and pursing cables 89-94, respectively, as seen in FIG. 9.

Turning now to FIGS. 4, 6A, 7, 25 and 27, the apparatus and method for the operator selection of the maximum diameter, $D_{10}$ of the target tissue volume 354 is seen in greater detail. As specified in the preceding specification, the fixed position of the electrically insulative cable mounting hub stop 70 determines the point at which the first through sixth tensionable portions 118, 19, 23, 29, 30 and 119, respectively, become taught as the cable mounting hub 296 abuts the electrically insulative cable mounting hub stop 70 and preferably compression springs 56 and 58. The restraining forces applied by the taught first through sixth tensionable portions 118, 19, 23, 29, 30 and 119, respectively, induces the pursing down of the distal ends of first, second and third leaf members 86d, 87d and 88d, respectively, first, second and third multi-lumen polymeric extrusion members 426d, 428d and 430d, respectively, thereby inducing the first through sixth resistively heated cutting and pursing cables 89-94, respectively, to follow the path of cutting 340 seen in FIG. 25.

As seen in FIGS. 4, 6A, 7 and 25, the fixed position of electrically insulative cable mounting hub stop 70 can selected for a range of operator selectable possible fixed positions. As seen in the top view in FIG. 7 of the lower half of single-use support housing 100, first through fourth operator selectable electrically insulative cable mounting hub stop position notches 66-69, respectively, are arranged along the longitudinal axis 8 of support tube 282 at distances from the starting position of cable mounting hub 296 that correspond to the range of selectable maximum diameters, $D_{10}$ of the tissue capture basket 326. By way of example and as seen in FIGS. 7 and 25, the distances of $L_{21}$, $L_{22}$, $L_{23}$ and $L_{24}$ between the cable mounting hub 296 and the operator selectable fixed position of electrically insulative cable mounting hub stop 70 correspond to maximum diameter $D_{10}$ of tissue capture basket 326. Maximum diameters, $D_{10}$ of 15, 20, 25 and 30 millimeters, respectively, for target tissue volume 354 as designated by numerical target tissue volume diameter labels 61 as seen in FIG. 7.

By way of example, as seen in FIG. 6A in combination with FIGS. 7 and 25, operator can select required maximum diameter, $D_{10}$ of target tissue volume 354 by manually depressing capture size selector 71 against compression spring 59 so that shoulder of capture size selector 71 is temporarily displaced below the inner wall surface of lower half of single-use support housing 272. Depressing capture size selector 71 against compression spring 59 thereby allows the capture size selector 71 to be repositioned to an alternative operator selectable electrically insulative cable mounting hub stop position notch 66, 67, 68 or 69 corresponding to the maximum diameter, $D_{10}$ of target tissue volume 354 selected by the operator.

Also, as seen in the cross-sectional view FIG. 6A, electrically insulative cable mounting hub stop 70 is slideably positioned on support tube 282 and is slideably positioned within the inner walls of upper and lower halves of single-use support housings 270 and 272. The full thickness of the electrically insulative cable mounting hub stop 70 incorporates first through sixth holes 72, 73, 74, 75, 77 and 78, respectively, to allow passage of first through sixth tensionable portions of cutting and pursing cables 118, 19, 23, 29, 30 and 119, respectively.

The range of preferred dimensions for the various components seen in FIGS. 1A-25 are listed below where all dimensions are in units of inches and are labeled as shown in the referenced figures.

| | |
|---|---|
| $L_1$ = 8.0 to 12.0 | $D_1$ = 0.23 to 0.30 |
| $L_2$ = 5.0 to 7.0 | $D_4$ = 0.20 to 0.27 |
| $L_3$ = 3.5 to 6.5 | $D_5$ = 0.006 to 0.011 |
| $L_4$ = 0.12 to 0.26 | $D_6$ = 0.010 to 0.014 |
| $L_5$ = 0.2 to 0.3 | $D_7$ = 0.70 to 0.85 |
| $L_6$ = 11.0 to 13.5 | $D_8$ = 0.075 to 0.095 |
| $L_7$ = 0.1 to 0.2 | $D_9$ = 0.06 to 0.08 |
| $L_8$ = 0.4 to 0.6 | $D_{10}$ = 0.4 to 1.4 (10 mm to 35 mm) |
| $L_9$ = 2.8 to 3.1 | $D_{11}$ = 0.25 to 0.28 |
| $L_{10}$ = 0.5 to 0.6 | $D_{12}$ = 0.4 to 0.5 |
| $L_{11}$ = 0.15 to 0.30 | $D_{13}$ = 0.7 to 0.9 |
| $L_{12}$ = 3.1 to 3.5 | $D_{14}$ = 1.2 to 1.3 |
| $L_{13}$ = 0.5 to 0.6 | $D_{15}$ = 0.0010 to 0.0015 |
| $L_{14}$ = 0.25 to 0.35 | $D_{16}$ = 0.0030 to 0.0085 |
| $L_{15}$ = 0.052 to 0.062 | $t_1$ = 0.0020 to 0.0050 |
| $L_{18}$ = 0.85 to 1.10 | $t_2$ = 0.050 to 0.120 |
| $L_{20}$ = 0.30 to 0.45 | $W_1$ = 1.0 to 1.5 |
| $L_{21}$ = 0.43 to 0.50 | $W_3$ = 0.020 to 0.035 |
| $L_{22}$ = 0.57 to 0.67 | $W_4$ = 0.060 to 0.080 |
| $L_{23}$ = 0.71 to 0.84 | $W_5$ = 0.065 to 0.085 |
| $L_{24}$ = 0.84 to 1.10 | $W_6$ = 0.085 to 0.115 |
| $L_{25}$ = 0.009 to 0.012 | $W_8$ = 0.080 to 0.110 |
| $L_{26}$ = 0.018 to 0.022 | $H_1$ = 1.5 to 2.5 |
| $L_{27}$ = 0.018 to 0.022 | $H_2$ = 0.020 to 0.026 |
| $L_{28}$ = 0.027 to 0.032 | $H_3$ = 0.010 to 0.013 |
| $K_1$ = 0.3 to 0.7 pounds/inch | $H_4$ = 0.040 to 0.070 |
| $K_2$ = 1.0 to 3.0 pounds/inch | $\Theta_1$ = 50° to 90° |
| $LS_1$ = 0.3 to 0.5 | $\Theta_2$ = 35° to 50° |
| $LS_2$ = 0.5 to 1.2 | |

Turning now to FIGS. 1, 4, 24 and 26A, an example of the applied constant current level 374 and the total electrical resistance 373 of the combined resistively heated portions of cutting and pursing cables 89-94 is presented in graphical form as a function of elapsed time. Upon the manual depression of the start tissue incision and capture switch 39 by operator, the motor and planetary gear assembly 170 seen in FIG. 4 is briefly energized by an applied DC voltage (e.g., 6.0 volts applied for 300 milliseconds) resulting in the brief advancement of the translation nut 182 and drive finger 185 and corresponding brief advancement of drive assembly drive member 324 as seen at 390 in FIG. 24. The brief advancement of drive assembly drive member 324 induces a corresponding advancement of leaf member and multi-lumen extrusion assembly 400 so that the resistively heated portions of cutting and pursing cables 89-94 are raised above the surface of the cannula distal end assembly 25 (e.g., by a distance of 0.030 to 0.040 inch) and in thermal contact with healthy tissue 366.

Figure 24:
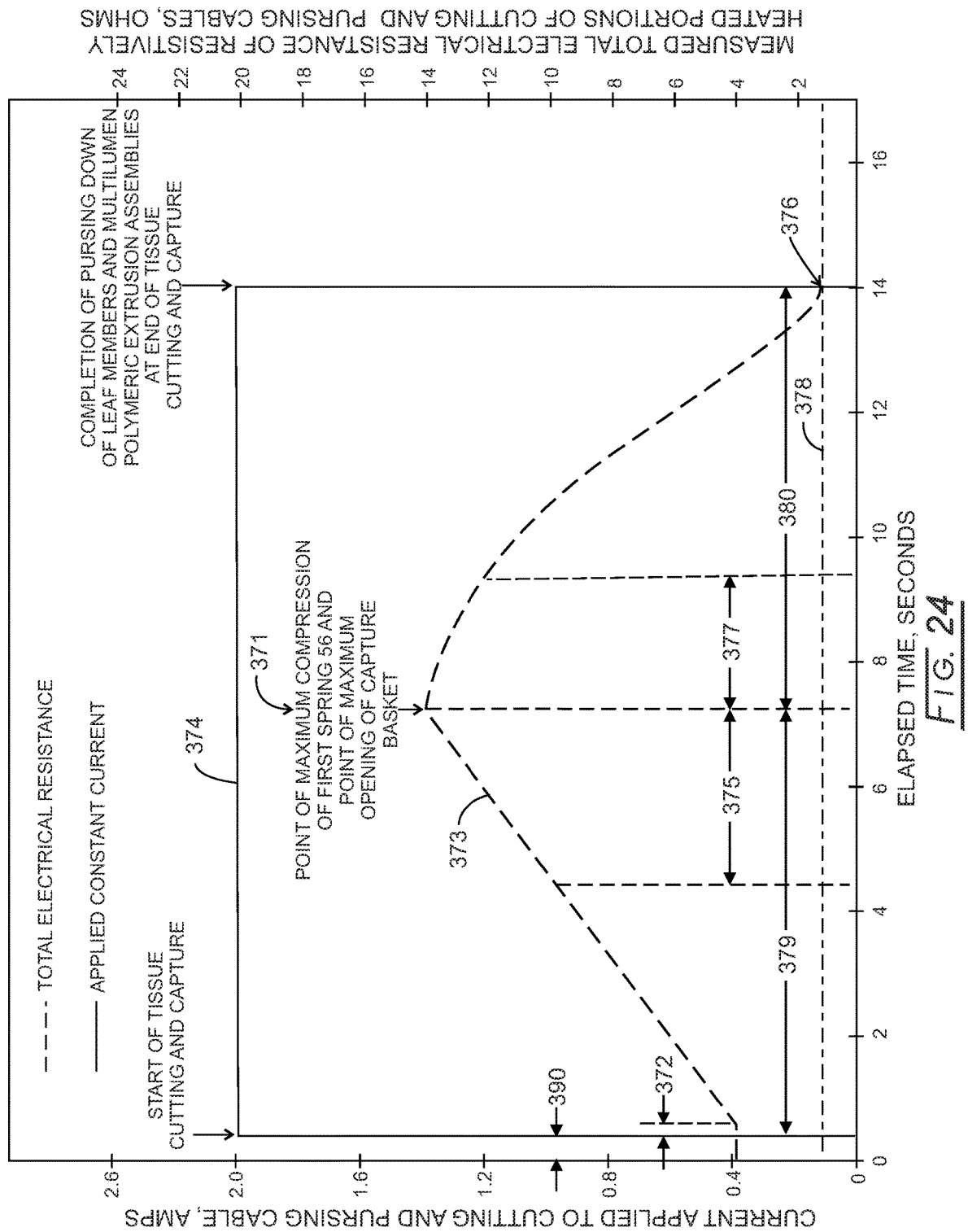
FIG. 24 is a graph relating time with level of applied constant current to resistively heated portion of cutting and capture cable as well as levels of cutting cable resistance during deployment of the tissue cutting and capture assembly according to the invention.

By way of a continuing example and referring to FIGS. 1, 4, 6, 9A, 24, 26A and 27, the applied DC voltage to motor and planetary gear assembly 170 is briefly suspended and the constant current 374 is applied to the resistively heated portions of cutting and pursing cables 89-94 (e.g., at a pre-determined level of 2.00 amps at 100 kHz corresponding to the diameter of cable 33 and preferred heat flux level of 220 watts/cm$^2$) while the resistively heated portions of cutting and pursing cables are stationary resulting in pre-heating period 372 as seen in FIG. 24. As seen in FIG. 24, the duration of the pre-heating period 372 may, for example, be 100 milliseconds. As seen in the example graph shown in FIG. 24, the pre-selected level of constant current 374 (e.g., 2.00 amps at 100 kHz) continues to be applied until time at which tissue cutting and capture ends 376 as seen in FIG. 24 at, for example, an elapsed time of about 14 seconds. In the example graph of FIG. 24, a first compression period 375 is seen during which first compression spring 56 is depressed to the maximum extent and its solid height (i.e., height at which no spaces exist between adjacent spring coils). As seen in FIGS. 24 and 27, the point in time at which first compression spring 56 reaches its solid height defines the time at which the maximum diameter of the tissue capture basket 326 as seen in FIG. 27. The period of the expansion phase 379 of tissue capture basket 326 is seen in FIG. 24. Also, the point in time at which first compression spring 56 reaches its solid height corresponds to the point in time at which the first through sixth tensionable portions of cables 118, 19, 23, 29, 30 and 119, respectively, becoming taught.

Once the first through sixth tensionable portions of cables 118, 19, 23, 29, 30 and 119, respectively, becoming taught, then the pursing down of the distal ends of the first, second and third leaf members 86-88, respectively, as well as the distal ends of the first, second and third multi-lumen polymeric extrusion assemblies 426, 428 and 430, respectively, commences. As seen in FIG. 24, a second compression period 377 corresponds to the period during which a second spring 58 is being depressed to achieve a more preferred spherical shape of the target tissue volume 354 as seen earlier in FIG. 25. The period during pursing down 380 of the tissue capture basket 326 is shown in FIG. 24 and continues until the measured total electric resistance 373 of the first through sixth resistively heated portions of the cutting and pursing cables 89-94, respectively, decreases below a pre-determined lower-limit total electric resistance level 378 (e.g., a value in the range from 1.0 to 2.0 ohms). The time at which the measured total electric resistance 373 decreases below a pre-determined lower-limit total electric resistance level 378 (as measured within circuit board assembly 184 seen in FIG. 3) corresponds to the time at which tissue cutting and capture ends 376 as seen in FIG. 24. The time at which tissue cutting and capture ends 376 coincides with the suspension of applied constant current, applied voltage to motor 170*a* and audible tone generated within handpiece assembly 15 as well as the illumination of the capture "Complete" indicator light 52 as seen in FIG. 1. Following the illumination of the capture "Complete" indicator light 52, the delivery cannula 22 with the tissue cutting and capture assembly 329 as seen in FIG. 28 is withdrawn from the patient by the operator.

Figure 30B:
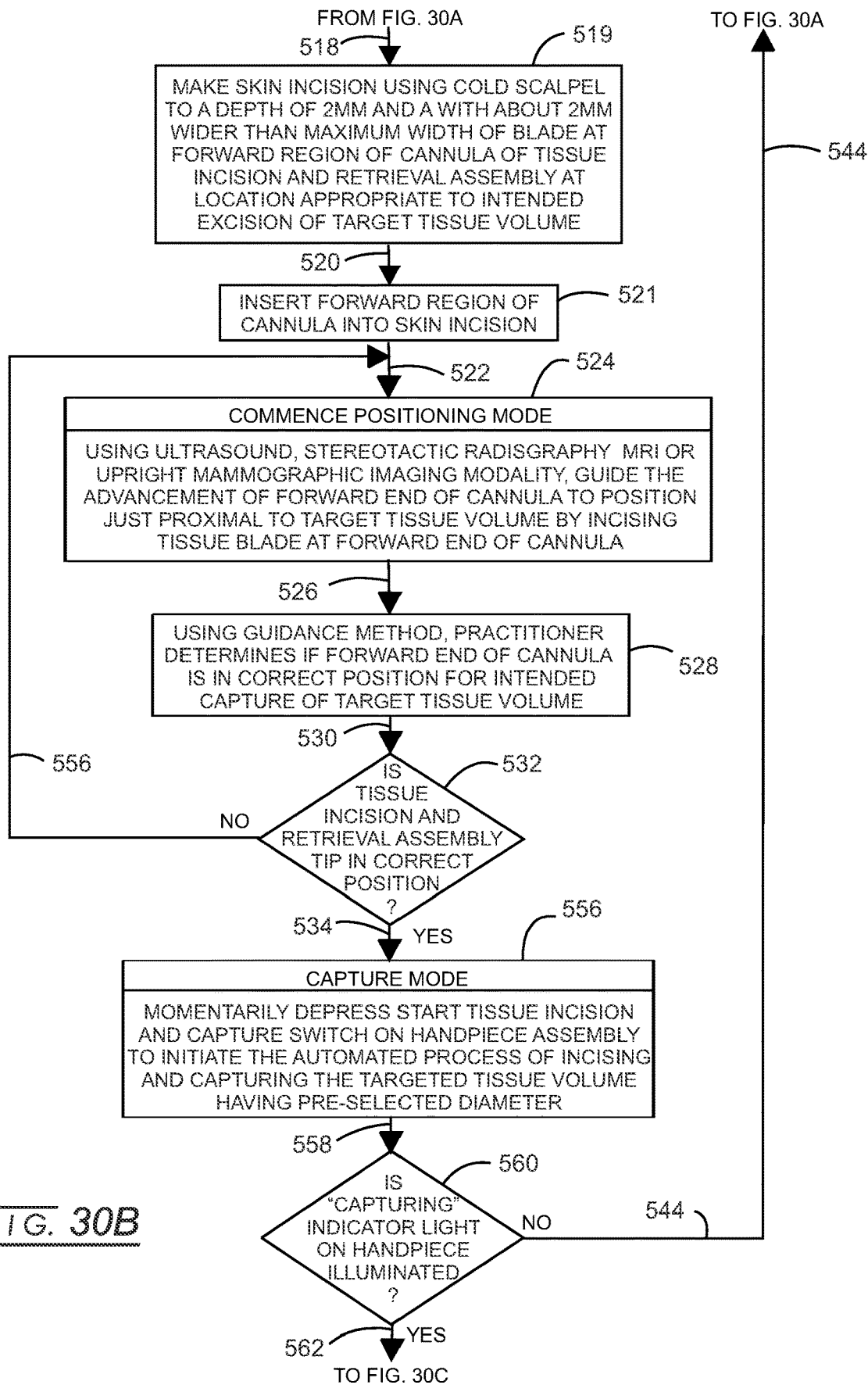

The set of FIGS. 30A-30C combine, as labeled thereon, to provide a flow chart describing the operation of the instant system. In the discourse to follow, the term tissue incision and retrieval system 10 is comprised of a single-use tissue incision and retrieval assembly 12 and reusable handpiece assembly 15 as seen in FIGS. 1, 1A and 2. The term "controller" refers to internal energy source and control system 181 comprising rechargeable battery 183 and circuit board assembly 184. By way of example, the circuit board assembly 184 comprises [a] microprocessor and programmed logic to control tissue incision and capture functions performed by handpiece assembly 15 (not shown), [b] constant current source 247, [c] constant voltage source (not shown) for energizing motor 170*a*, [d] first switch sensor 48, [e] second switch sensor 49, [f] first light emitting diode 44, [g] second light emitting diode 50, [h] third light emitting diode 54, [i] first constant current source connector pin 51 and [j] second constant current source connector pin 53. Cueing "Ready" indicator light 42, "Capturing" indicator light 46 and "Complete" indicator light 52 representing operational modes as well as on/off initialization switch 40 and start tissue incision/capture switch 39 are accessible on the top portion of handpiece assembly 15 as seen in FIG. 1.

Looking to FIGS. 1, 2, 7, 8, 26 and 30A, preparation in advance of the procedure, as represented at block 496, provides for the recharging of the internal battery within handpiece assembly 15 using handpiece battery charger 9. At the start of a procedure, practitioner selects desired size (i.e., maximum diameter) of capture for intended target tissue volume 354 using capture size selector located on surface single-use support housing 100 as represented at line 498 and block 500. Practitioner selection is made with respect to the predetermined size of the tissue volume to be removed. In general, the resistively heated portion of cutting and pursing cable and leaf members will extend through healthy tissue 366 surrounding a targeted suspicious and potentially malignant lesion 368, as seen in FIGS. 27 and 28. By way of example, if the maximum dimensional extent of suspicious and potentially malignant lesion 368 is determined to be 10 mm (0.4 inch) based on prior examination using ultrasound and/or radiographic imaging, then practitioner may select a capture size of 20 mm (0.8 inch) to provide a boundary layer of healthy tissue 367 surrounding the suspicious and potentially malignant lesion 368 as seen in FIGS. 26, 26A, 27 and 28. This selection of a larger capture size avoids complications of spreading potentially malignant cells and the like upon removal of the suspicious and potentially malignant lesion 368 since the suspicious and potentially malignant lesion is surrounded by a boundary layer of healthy tissue 367. Also, the verification of the presence of a boundary layer of healthy tissue 367 around the entire periphery of the targeted suspicious and potentially malignant lesion 368, as determined at pathological examination of the excised tissue sample, represents the complete removal of the targeted suspicious and potentially malignant lesion 368 and may avoid the need for further surgical removal of tissue at the site of the targeted tissue volume 354.

Once practitioner selects desired size of target tissue capture, practitioner inserts tissue incision and retrieval assembly 12 into handpiece assembly 15, as represented at line 502 and block 504. Next, practitioner momentarily depresses on/off and initialization switch 40 on handpiece assembly 15 and visually confirms if the indicator light 42 (e.g., yellow light) adjacent to the label "Ready" on the handpiece assembly is illuminated, as represented at line 506 and block 508. Where the "Ready" indicator light 42 is not illuminated, the activity described at block 512 fails and the procedure reverts as represented at line 513 to line 544 and block 546, the practitioner having been pre-instructed that a non-functional handpiece assembly 15 is at hand and the procedure reverts to selecting another handpiece assembly 15 to replace the non-functional handpiece 15, as represented at line 548 and block 550. Following the replacement of the non-functional handpiece 15, practitioner inserts sterile tissue incision and retrieval assembly 12 into handpiece assembly 15 where the handpiece assembly is optionally enveloped within single-use, transparent and flexible sterile sheath 109, as represented at line 552 and block 504. Where the "Ready" indicator light 42 is illuminated, the activity described at block 512 proceeds to the next step in the procedure.

Referring now to FIGS. 1A, 26, 26A, 30A and 30B, practitioner next administers local anesthetic agent (e.g., lidocaine) at skin level and within region of intended excision of target tissue volume 354, as represented at line 514 and block 516. For example, this step should be performed at least five minutes before the start of the biopsy procedure to assure perfusion of the tissue surrounding the target tissue volume 354 with the anesthetic agent. Waiting periods of at least five minutes also avoids the entrapment of a bolus of anesthetic liquid along the path of the tissue cutting and capture procedure.

Next, practitioner makes a incision at skin site 24 using a cold scalpel to a depth of 2 mm to 4 mm and a width about 2 mm wider than the maximum width of blade 31 located at forward region of cannula 27 (e.g., an incision width of about 8 mm) at the location appropriate to the intended excision of target tissue volume 354, as represented at line 518 and block 519. Practitioner next advances surgically sharp blade 31 at the forward region of cannula 27 into incision at skin site 24 to a depth of 2 mm to 4 mm, as represented at line 520 and block 521. The positioning of the forward end of the cannula 27 commences using an ultrasound, stereotactic radiography, MRI or upright mammographic imaging modality to guide the advancement of the forward end of the cannula 27 to a position just proximal to the target tissue volume 354, incising healthy tissue 366 using blade 31 at tip of tissue incision and retrieval assembly 12, as seen in FIG. 26A and as represented at line 522 and block 524.

Referring now to FIGS. 1A, 26A and 30B, practitioner determines, using the guidance method, if forward end of cannula 27 is in the correct position for the intended capture of target tissue volume 354, as represented at line 526 and block 528. If the forward end of cannula 27 is not in the correct position for the intended capture of target tissue volume 354, practitioner uses the guidance method to re-position forward end of the cannula 27 to correct position just proximal to the target tissue volume 354, as represented at line 556 and returning to line 522 and block 524. If the forward end of cannula 27 is in the correct position for the intended capture of target tissue volume 354, the procedure proceeds to the next step. In the next step, as seen in FIGS. 27 and 28, target tissue volume 354 is incised from healthy tissue 366 by the first through sixth resistively heated portions of the cutting and pursing cables 89-94, respectively, and circumscribed and contained within tissue capture basket 326.

Referring now to FIGS. 1A, 25, 26A, 27, 28 and 30B, practitioner momentarily depresses start tissue incision and capture switch 39 on handpiece assembly 15 to initiate the automated process of incising and capturing target tissue volume 354 having diameter, $D_{10}$, the diameter pre-selected by operator (see block 500), as represented at line 534 and block 556. Capturing Indicator light 46 (e.g., green light) next to "Capturing" label on handpiece assembly 15 should be illuminated confirming the start of the capturing step in the procedure. Where the "Capturing" indicator light 46 is not illuminated, the activity described at block 560 fails and the procedure reverts as represented at line 544 and block 546, the practitioner having been pre-instructed that a non-functional handpiece assembly 15 is at hand and the procedure reverts to selecting another handpiece assembly 15 to replace the non-functional handpiece 15, as represented at line 548 and block 550. Following the replacement of the non-functional handpiece 15, practitioner re-inserts sterile tissue incision and retrieval assembly 12 into handpiece assembly 15 where the handpiece assembly is optionally enveloped within single-use, transparent and flexible sterile sheath 109, as represented at line 552 and block 504.

Referring now to FIGS. 1A, 3, 4, 26A, 27, 28 and 30C, where the "Capturing" indicator light 46 is illuminated, as represented at line 562 and block 564, the entry into the tissue capture mode starts a two-stage automated sequence. At stage one, motor 170a within handpiece assembly 15 is briefly energized by the application of the predetermined voltage level (e.g., 6.0 volts DC) for a pre-determined period of about 0.3 second as described in connection with FIGS. 3, 4 and 26A. This brief energizing of motor 170a advances motor-activated drive tube drive member translation assembly 180 with a corresponding brief advancement of the distal ends of first, second and third leaf members 86-88, respectively, and distal ends of first, second and third multi-lumen polymeric extrusion members 426, 428 and 430, respectively. Brief advancement of distal ends of the leaf members and distal ends multi-lumen polymeric extrusion members assures that the supported first through sixth resistively heater portions of cutting and pursing cables, 89-94, respectively, are advanced a short distance (e.g., 0.050") into adjacent healthy tissue 366 as seen in FIG. 26A, as represented in block 564.

At stage two, still referring to FIGS. 1A, 3, 4, 26A, 27, 28 and 30C, internal energy source and control system 181 in handpiece assembly 15 applies a pre-determined level of voltage to motor 170a. Simultaneously, a fixed, pre-determined level of constant current (e.g., a fixed constant current level in the range from 1.2 to 2.0 amps at a frequency of 100 kHz) is applied to first through sixth resistively heater portions of cutting and pursing cables, 89-94, respectively, by internal energy source and control system 181 in handpiece assembly 15, thereby commencing the start of the tissue cutting and capture of the target tissue volume 354. Throughout the period during which constant current is applied to the first through sixth resistively heater portions of cutting and pursing cables, 89-94, respectively, the total series resistance, $R_{Total}$ of the first through sixth resistively heated portions of cutting and pursing cables, 89-94, respectively, is continuously monitored. Also, throughout the period during which constant current is applied to the first through sixth resistively heater portions of cutting and pursing cables, 89-94, respectively, an audible tone is generated within handpiece assembly 15 to provide a cue to the operator that the tissue cutting and capture process is continuing, as represented at line 574 and block 576 in FIG. 30C.

Still referring to FIGS. 1A, 3, 4, 26A, 27, 28 and 30C, the application of a pre-determined voltage to motor 170a with the simultaneous application of a pre-determined level of constant current to the first through sixth resistively heated portions of cutting and pursing cable, 89-94, respectively, continues until the pursing down of the first through sixth resistively heated portions of cutting and pursing cable 89-94, respectively, is completed. During this interval of time, the total series resistance, $R_{Total}$ of the first through sixth resistively heated portions of cutting and pursing cables, 89-94, respectively, is continuously measured and compared with a pre-programmed minimum total resistance value, $R_{min}$ (e.g., 1.0 to 2.0 ohms) by internal energy source and control system 181 within handpiece assembly 15, as represented at line 578 and 580. If the measured total series resistance, $R_{Total}$ is not less than the pre-programmed minimum total resistance value, $R_{min}$, then the application of a pre-determined voltage to motor 170a with the simultaneous application of a pre-determined level of constant current to the first through sixth resistively heated portions of cutting and pursing cable, 89-94, respectively, continues as represented at line 582 to line 574 and block 576.

Still referring to FIGS. 1A, 3, 4, 26A, 27, 28 and 30C, if the measured total series resistance, $R_{Total}$ is less than the pre-programmed minimum total resistance value, $R_{min}$, (see query in block 580) then the cutting of healthy tissue 366 by first through sixth resistively heated portions of cutting and pursing cables, 89-94, respectively, and formation of a tissue capture basket 326 that circumscribes target tissue volume 354 is determined to be complete, as represented at Line 590 and block 592. Also, the point in time that the measured total series resistance, $R_{Total}$ is less than the pre-programmed minimum total resistance value, $R_{min}$, corresponds to the point in time that the distal ends of first, second and third leaf members 86-88, respectively, and distal ends of first, second and third multi-lumen polymeric extrusion members 426, 428 and 430, respectively, reach a single pursed down point 356 as seen in FIG. 28. At this point in time, the capture complete indicator light 52 on handpiece assembly 15 is also illuminated adjacent to label "Complete". Also, at this point in time, application of the pre-determined voltage to motor 170a and simultaneous application of a pre-determined level of constant current to the first through sixth resistively heated portions of cutting and pursing cable, 89-94, respectively, are both terminated, as represented at line 590 and 592.

Referring now to FIGS. 1A, 26, 28 and 30C, upon an affirmative determination that tissue cutting and capture assembly 329 has completely circumscribed target tissue volume 354, practitioner removes the delivery cannula 22 along with the tissue capture basket 326 containing the target tissue volume 354, following the original path of insertion 363 to exit the healthy tissue 366 of patient at incision site 24, as represented at line 594 and block 636. During this removal, some stretching of the tissue and skin at incision site 24 typically will be encountered with little or no disfigurement ensuing.

Referring 1A, 9A, 28 and 30C, as represented at line 638 and block 644, the captured target tissue volume 354 (i.e., tissue specimen) containing suspicious and potentially malignant lesion 368 is next removed from tissue capture basket 326 by cutting cable 33 on both sides of an eyelet 327 at distal end of one or more first, second or third leaf member 86, 87 or 88, respectively, using a small scissors. Place extracted target tissue volume 354 in a container with immersion in a fixative solution (e.g., fixative agent such as 3.7% formaldehyde in water) in preparation for subsequent diagnostic examination by a pathologist, as represented at line 646 and block 648. Next, target tissue volume 354 submerged in fixative solution with the container is transported to pathology laboratory, as represented at line 650 and block 652.

An optional arrangement is represented at line 654 and block 656. The latter block provides for placing a radio-opaque and/or echogenic marker in the tissue at the site from which the target tissue volume 354 is removed and verifying the position thereof using radiography or ultrasonography.

Then, as represented at line 658 and block 660, the incision at skin site 24 is closed using appropriate conventional closure techniques.

Since certain changes may be made in the above method, system and apparatus without departing from the scope of the present disclosure herein involved, it is intended that all matter contained in the above description or shown in the accompanying drawings shall be interpreted as illustrative and not in a limiting sense. For example, throughout the disclosure presented herein, the first through sixth resistively heated portions of cutting and pursing cables 89-94, respectively, containing multiple wires as seen in FIG. 9A could be replaced by resistively heated portions of cutting and pursing wires, i.e., comprising a single wire of electrically conductive metal (e.g., titanium or titanium alloy wire).

The invention claimed is:

1. Apparatus for incising and retrieving a tissue volume of given peripheral extent having a tissue incision and retrieval assembly (12) and a handpiece assembly (15), the tissue incision and retrieval assembly (12), comprising:

a delivery cannula (22) having an outer surface surmounting an interior channel and extending from a proximal end portion along a longitudinal axis (8) to a forward region (27) having a distal end positionable in confronting adjacency with a tissue volume;

a leaf member and multi-lumen polymeric extrusion assembly (400) comprising a tissue cutting and capture assembly (329) including a minimum of three members;

one or more leaf members and one or more multi-lumen polymeric extrusion assemblies positioned within the delivery cannula interior channel at the forward region having a forward portion extending to a forwardly disposed resistively heated portions of cutting and pursing cables energizable only on those portions of cable distal to electrical and thermally conductive eyelets supplying constant current to the resistively heated portions of cutting and pursing cables and in contact with tissue to define a leading edge portion of tissue cutting and capture assembly (329) and including at least two tensionable portions of cutting and pursing cables (118, 119) extending from resistively heated portion of cutting and pursing cables and into the inner channel (263) of delivery cannula (22), the leading edge portion of tissue cutting and capture assembly (329) being extendable from the delivery cannula laterally outwardly and forwardly toward an outer peripheral dimension having a predetermined diametric extent effective to provide a circumspective positioning about a tissue volume (324) peripheral extent and subsequently extendable while being drawn in contraction toward the longitudinal axis by tensioning portions of cutting and pursing cables to form a tissue capture basket (326) enveloping the tissue volume; a single-use support housing (100) having forward and rearward portions and coupled in supporting relationship with the delivery cannula at the proximal end portion;

a tissue cutting and capture assembly (329) extending from driving engagement with a drive assembly drive member (324) and drivably movable along the longitudinal axis by actuator and transfer assemblies mounted within handpiece assembly (15) comprising motor and planetary gear assembly (170), flexible metallic bellow-shaped coupler (174), lead screw (176), thrust bearing (171) and motor-activated drive tube drive member translation assembly (180);

an elongate support tube (282) that extends symmetrically along longitudinal axis (8) for engagement with cannula distal end assembly (25) at forward end of cannula (27) and whose proximal end is secured to the proximal end face (64) of support housing (100);

a drive tube (325) attached proximally to drive assembly drive member (324) and attached distally to leaf member and extrusion assembly support member (347) and slideably disposed on support tube within support housing;

an electrically insulative cable mounting hub (296) slideably disposed on support tube within support housing; and a cable mounting hub stop (70) secured to a pre-selected position on support tube;

the drive tube drive member drivably movable by drive finger (185) to effect a motorized driving of the tissue cutting and capture assembly (329) along the longitudinal axis (8) from an initial position (411) to a position at the end of cutting and capture (414); and a terminal assembly comprising first and second electrical contacts in the single-use support housing for connection to the current source (247) at corresponding first and second electrical terminals in the handpiece assembly (15) for energization of the restively heated portions of the cutting and pursing cables.

2. The apparatus of claim 1, wherein tensioning portions of cutting and pursing cables within the tissue incision and retrieval assembly (12) are secured to an electrically insulative cable mounting hub (296), a cable mounting hub stop (70) and drive finger (185) extending from motor-activated drive tube drive member translation assembly (180) engagable therewith, the cable mounting hub (296) being drivingly movable by the tensioning portions of cutting and pursing cables along the longitudinal axis in correspondence with the motor-activated drive tube drive member translation assembly, from an initial position (401) into engagement with the cable mounting hub stop member (402) to define the tissue cutting and capture assembly forward portion leading edge peripheral dimension of predetermined maximum diametric extent and to effect the subsequent contraction thereof by the motor-actuated drive tube drive member translation assembly.

3. The apparatus of claim 1, wherein the cable is a single wire of electrically conductive metal.

4. The apparatus of claim 3, wherein the wire is a single wire of stainless steel, nickel, nickel alloy, titanium or titanium alloy having a diameter of between about 0.002 to about 0.005 inch.

5. The apparatus of claim 1, including a forwardly disposed cutting blade assembly supporting a surgically sharp blade (31) supported at the delivery tip for initial positioning of the delivery cannula tip in confronting adjacency with the tissue volume.

6. The apparatus of claim 1, wherein the cable comprises a multiplicity of electrically conductive metal wires, each wire having a diameter of between about 0.0008 to about 0.002 inch.

7. The apparatus of claim 6, wherein the electrically conductive metal wires are an austenitic stainless steel alloy or an alloy containing cobalt, tungsten, chromium and nickel.

8. The apparatus of claim 1, wherein capture advancement ears (134) is affixed to the drive assembly drive member (324) and extends outwardly to an extent wherein it is abuttingly engagable in driven relationship with the drive finger (185) supported by a translation nut (182) disposed on a motor activated drive tube drive member translation assembly (180).

9. The apparatus of claim 1, wherein the handpiece assembly includes internal energy source and control system (181), battery (183) and circuit board assembly (184) incorporating microprocessor and programmed logic to control tissue incision and capture functions performed by handpiece assembly (15), constant current source (247), constant voltage source for energizing motor and speaker (200).

10. The apparatus of claim 1, wherein the tissue cutting and capture assembly forward portion comprises:
two or more flexible leaf members, each leaf member having an eyelet (327) at the distal end of the leaf member a width, a thickness and one or more polymeric multi-lumen extrusion assemblies.

11. The apparatus of claim 10, wherein each leaf member is formed of metal and each leaf member is covered by an electrically insulative coating having a thickness in a range from 0.00015 to about 0.0005 inch.

12. The apparatus of claim 10, wherein the distal end of the leaf member incorporates an eyelet dimensioned to receive the cutting and pursing cable.

13. Apparatus for incising and retrieving a tissue volume of given peripheral extent having a tissue incision and retrieval assembly (12) and a handpiece assembly (15), the tissue incision and retrieval assembly (12), comprising:
a delivery cannula having an outer surface surmounting an interior channel and extending from a proximal end portion along a longitudinal axis to a forward region having a distal end positionable in confronting adjacency with a tissue volume;
a tissue cutting and capture assembly (329) driven by two or more leaf members and one or more multi-lumen polymeric extrusion assemblies positioned within an interior channel (263) of delivery cannula (22) having a forward portion extending to a forwardly disposed resistively heated portion of an cutting and pursing cable and being extendible from the delivery cannula toward an outer peripheral dimension having a predetermined diametric extent effective to provide a circumspective positioning about a tissue volume (354) and subsequently extendable while being drawn in contraction toward the longitudinal axis by tensioning portions of cutting and pursing cables to form a tissue capture basket (326) enveloping the tissue volume;
a single-use support housing having forward and rearward portions and coupled in supporting relationship with the delivery cannula at the proximal end portion;
a drive assembly drive member (324) including a drive tube (325) extending from driving engagement with the leaf member and multi-lumen polymeric extrusion assembly (400) within the delivery cannula interior channel into the support housing (100) and having the drive assembly drive member with drive block advancement ear (134) fixed to the drive assembly drive member in driving relationship, the drive assembly drive member being movable along the longitudinal axis from an initial position (411) to a position at the end of a cutting and capture position (414);
the handpiece assembly (15) comprising:
a motor-actuated drive tube drive member translation assembly (180) including an elongate rotational lead screw (176) located in parallel relationship with the drive assembly drive member, fixed for rotation at the forward portion of a handpiece assembly (15) and extending rearwardly therefrom to a self-aligning bellows-shaped coupler (174) having a forward driving connection portion coupled therewith and a rearward driven connection portion;
a motor and planetary gear assembly (170) having a rotational drive output coupled in driving relationship with the bellows-shaped coupler (174) rearward driven connection portion, the motor and planetary gear assembly being mounted in self-aligning confinement within the support housing assembly and retained from rotational movement by a torque stop component (172), having non-rotational freedom of movement extending from the bellows-shaped coupler (174) and being actuatable to drive the lead screw from the bellows-shaped coupler (174); a drive tube drive member translation assembly mounted in driven relationship with the rotational lead screw having a home position in association therewith and having an engaging portion engagable in driving relationship with the drive assembly drive member (324) to effect movement of the drive assembly drive member along the longitudinal axis (8) when the motor and planetary gear assembly is actuated; and
a terminal assembly responsive to an applied control input for effecting the application of substantially constant current to the leading edge port of the tissue cutting and capture assembly.

14. The apparatus of claim 13, wherein the drive tube drive member translation assembly (180) is movable by the lead screw to advance the drive assembly drive member (324) from an initial position (411) to a position at the end of the tissue cutting and capture (414) when the motor and planetary gear assembly is actuated.

* * * * *